US012243378B2

(12) United States Patent
Urban et al.

(10) Patent No.: US 12,243,378 B2
(45) **Date of Patent: *Mar. 4, 2025**

(54) ELECTRONIC GAMING MACHINE HAVING A VARIABLE POSITION GAMING DISPLAY AND A FLEXIBLE GAMING DISPLAY RESPONSIVE TO GAMING CONDITIONS

(71) Applicant: Aristocrat Technologies, Inc. (ATI), Las Vegas, NV (US)

(72) Inventors: Bruce Urban, Las Vegas, NV (US); Rajendrasinh Jadeja, Las Vegas, NV (US); Roberto Coppola, Las Vegas, NV (US); Craig Paulsen, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/195,444

(22) Filed: May 10, 2023

(65) Prior Publication Data

US 2023/0316856 A1 Oct. 5, 2023

Related U.S. Application Data

(63) Continuation of application No. 17/681,188, filed on Feb. 25, 2022, now Pat. No. 11,688,231, which is a (Continued)

(51) Int. Cl.
*G07F 17/32* (2006.01)

(52) U.S. Cl.
CPC ...... *G07F 17/3216* (2013.01); *G07F 17/3213* (2013.01)

(58) Field of Classification Search
CPC ............. G07F 17/3213; G07F 17/3211; G07F 17/3216; G07F 17/3227; G07F 17/3267; G07F 17/3269
See application file for complete search history.

(56) References Cited

U.S. PATENT DOCUMENTS

| | | | |
|---|---|---|---|
| D497,166 | S | 10/2004 | Vick |
| D501,854 | S | 2/2005 | Vick |

(Continued)

FOREIGN PATENT DOCUMENTS

| | | | |
|---|---|---|---|
| DE | 3347156 | A1 | 7/1985 |
| EP | 544155 | B1 | 6/1993 |

(Continued)

OTHER PUBLICATIONS

Office Action dated Jun. 28, 2021 for U.S. Appl. No. 16/893,404 (pp. 1-13).

(Continued)

*Primary Examiner* — Justin L Myhr
(74) *Attorney, Agent, or Firm* — Weaver Austin Villeneuve & Sampson LLP

(57) ABSTRACT

A gaming machine, system and method providing variable position display capable of display movement and an extendable screen responsive to gaming conditions. The gaming machine includes a cabinet, a variable position display, an extendable display screen, and a controller. The variable position display rotates, tilts, pans, or some combination of translation, rotation, tilting and panning, in relation to the cabinet and in response to at least one or more predefined gaming conditions. The controller initiates a movement sequence movement of the variable position display, from a first position to a second position, and initiates the game program tailored to retractably extend the extendable display screen with respect to the cabinet relatively to the movement of the variable position display, and present the game and game outcomes of the game on the variable position display in the second position.

20 Claims, 58 Drawing Sheets

Related U.S. Application Data continuation of application No. 16/893,404, filed on Jun. 4, 2020, now Pat. No. 11,263,865.

(60) Provisional application No. 62/889,922, filed on Aug. 21, 2019, provisional application No. 62/858,758, filed on Jun. 7, 2019.

(56) References Cited

U.S. PATENT DOCUMENTS

| | | | | |
|---|---|---|---|---|
| 7,775,888 | B2 | 8/2010 | Wudtke | |
| D646,337 | S | 10/2011 | Kelly | |
| 8,118,681 | B2 | 2/2012 | Mattice | |
| 8,485,881 | B2 | 7/2013 | Griswold | |
| 8,974,297 | B2 | 3/2015 | Massing | |
| D768,629 | S | 10/2016 | Bae | |
| 9,652,929 | B2 | 5/2017 | Cornell | |
| 10,186,681 | B2 | 1/2019 | Kang | |
| 10,515,509 | B2 | 12/2019 | Fridrich | |
| D893,630 | S | 8/2020 | Urban | |
| D920,324 | S | 5/2021 | Warren | |
| D939,502 | S | 12/2021 | Lee | |
| 2004/0053671 | A1 | 3/2004 | Nordman | |
| 2005/0049028 | A1 | 3/2005 | Gornez | |
| 2005/0277468 | A1 | 12/2005 | Fitzsimons | |
| 2008/0113821 | A1 | 5/2008 | Beadell | |
| 2008/0268944 | A1 | 10/2008 | Wudtke | |
| 2011/0212785 | A1 | 9/2011 | Gura | |
| 2012/0208645 | A1* | 8/2012 | Rodriguez | G07F 17/3216 463/46 |
| 2012/0220353 | A1 | 8/2012 | Massing | |
| 2013/0184078 | A1 | 7/2013 | Brunell | |
| 2018/0276942 | A1 | 9/2018 | Whelan | |
| 2019/0050964 | A1 | 2/2019 | Jang | |
| 2019/0364185 | A1* | 11/2019 | Bai | G03B 30/00 |
| 2020/0035061 | A1 | 1/2020 | Froy | |

FOREIGN PATENT DOCUMENTS

| | | | |
|---|---|---|---|
| JP | 2005323770 | A | 11/2005 |
| JP | 2018011821 | A | 1/2018 |

OTHER PUBLICATIONS

Office Action (Notice of Allowance and Fees Due (PTOL-85)) dated Nov. 29, 2021 for U.S. Appl. No. 16/893,404 (pp. 1-8).

Office Action (Non-Final Rejection) dated Nov. 2, 2022 for U.S. Appl. No. 17/681,188 (pp. 1-7).

Office Action (Notice of Allowance and Fees Due (PTOL-85)) dated Feb. 14, 2023 for U.S. Appl. No. 17/681,188 (pp. 1-8).

* cited by examiner

ELECTRONIC GAMING MACHINE HAVING A VARIABLE POSITION GAMING DISPLAY AND A FLEXIBLE GAMING DISPLAY RESPONSIVE TO GAMING CONDITIONS

RELATED APPLICATIONS

The present application is a continuation of and claims priority to U.S. patent application Ser. No. 17/681,188, filed Feb. 25, 2022, which issued on Jun. 27, 2023, as U.S. Pat. No. 11,688,231, which claims priority to U.S. patent application Ser. No. 16/893,404, filed Jun. 4, 2020, which issued on Mar. 1, 2022, as U.S. Pat. No. 11,263,865, which claims priority to U.S. Provisional Application No. 62/858,758, filed Jun. 7, 2019, which is related to U.S. Design application No. 29/690,840, filed May 10, 2019, and claims priority to U.S. Provisional Application No. 62/889,922, filed Aug. 21, 2019, all of which are hereby incorporated by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In existing gaming systems, feature games, secondary or bonus games, may be triggered for players in addition to the base game. A feature game gives players an additional opportunity to win prizes, or the opportunity to win larger prizes, than would otherwise be available in the base game. Feature games can also offer altered game play to enhance player enjoyment.

The popularity of such gaming machines with players is heavily dependent on the entertainment value of the machine relative to other gaming options and the player's gambling experience. Operators of gaming businesses therefore strive to provide the most entertaining, engaging, and exciting machines to attract customers to use the machines while also providing a machine that allows the player to enjoy their gambling experience. Accordingly, there is a continuing need for gaming machine manufacturers to develop new games in order to maintain or increase player enjoyment.

Gaming machine designers typically are constrained by a fixed, or relatively fixed, cabinet, including the display, geometry of a gaming machine. In particular, the geometry of a specific cabinet may provide specific physical limitations due to hardware constraints such as, for example, cabinet size, cabinet configuration, number of displays, display size(s), display orientation(s), display resolutions, display aspect ratios, processors, memories, input/output devices, and other hardware.

Additionally, developers typically hard code a set screen configuration and orientation (e.g., portrait or landscape) for given game content. Further, game content may also be specifically designed to take advantage of a given cabinet configuration, which may impart a special game feel in terms of visual and sound effects. For players of gaming machines, the special game feel is an essential element for delivering an entertaining and exciting experience that fosters increased or repeated game play, and in turn, may increase revenue for the game machine operator.

Hard-coding game content for a specific cabinet configuration may limit the use of that game for other cabinet configurations or form factors. As such, when game content is moved to another cabinet configuration or type, with its own unique cabinet configuration or form factor, the game content may lose some degree of aesthetic appeal, functionality and/or game feel due to image scaling and other factors associated with differing configurations. More specifically, for example, when game content for a landscape configured cabinet type is transferred to a portrait configured cabinet type, there may be a loss of around two thirds of actual pixels (i.e., when a 1920×3240 screen configuration made of three (3) 1920×1080 vertically stacked landscape screens is transferred to a 1080×1290 screen configuration). Or, put another way, every four pixels on the landscape configuration may be reduced to one pixel on the portrait configuration. This would result in a loss of image fidelity due to image scale reduction, which normally would be perceived by a player or user of the gaming machine.

Such a limitation affects the ability of game content developers to design, and operators to employ, a single instance of game content across different cabinet types. Solutions for operating multiple instances of game content on a variable cabinet type, or multi-cabinet game builds, are not known to have been commercially employed due to complexities arising from a wide range of differing configurations for game contents requiring different hardware configurations, like different number of screens, screen sizes, screen orientations, screen resolutions, aspect ratios, processors, memories, input/output devices, and other hardware. Moreover, developers tend to optimize game content and game software to the hardware of a specific cabinet configuration or type. In turn, there is decreased utilization of multiple instances of game content on a cabinet type.

Such cabinet-specific design strategy also affects the ability of game developers to provide game excitement and different game dimensions for a player in a single game build where the game display may take different orientations through moving sequences before, during or after game play. Specifically, when game developers design game content based on a cabinet type, development of the game function, features and feel may be constrained to the cabinet configuration or type. Thus, for example, when a game is developed to be played on a portrait display, game developers are limited to design certain game functions, features and/or game feel for the game on a portrait display, but typically cannot at the same time employ functions, features and/or game feel for the game that may be better experienced at some other position (e.g., on a landscape) in a single game build.

Similarly, single game builds for a fixed cabinet configuration may also lessen the ability of game players to choose or fully experience a game, particularly where the game offers features, functions or game feels depending on the cabinet configurations or types. Specifically, some game developers design games with different game instances to be played on different cabinet configuration or types; and, due to certain physical and game attributes, and sometimes game floor designs, like cabinet types are generally arranged adjacent to each other.

Thus, for example, if a game player plays a game designed for one cabinet with a landscape display, while the game is simultaneously offered on a different cabinet with a portrait display which offers different game effects and feel, the game player cannot experience the game in the portrait display without leaving the cabinet. When a player leaves one game cabinet for another, there is always a chance that the player may not play any other games, which may translate into a loss of revenue.

From the player's perspective at a single gaming machine, being limited to one display configuration (e.g., landscape view) at time, does not allow a player to try to maximize features, functionality and game feel possible at a single game cabinet.

Additionally, gaming establishment designers are also constrained by factors such as sights, smells, sounds, numbers and types of gaming machines, and jurisdiction requirements. For example, casino operators are generally responsible for managing their casino floors to provide clear visibility to gaming machines while balancing sight lines to ensure patrons can see facilities such as restaurants, restrooms, cages, and/or exits. As such, gaming machines in the sight lines would have to satisfy some specific governing dimensional principles.

Consequently, availability of game contents at the gaming machines in the sight lines may be limited by a given cabinet configuration, which may impart a special game feel in terms of visual and sound effects. For players of gaming machines, the special game feel is an essential element for delivering an entertaining and exciting experience that fosters increased or repeated game play, and in turn, may increase revenue for the game machine operator. Thus, with limited availability of game contents, these gaming machines in the sight lines may bring in less revenue than desired.

SUMMARY

An aspect of the present disclosure provides a gaming machine having a variable position game display, a gaming system having a variable position display and a method of operating a gaming machine with a variable position game display. The gaming machine, system and method of operating a gaming machine with a variable position display permits a single game build for a single gaming machine independent of the position of variable position display.

In one aspect, a gaming machine may have a main cabinet and a variable position display coupled to the main cabinet via a display mount structure capable of one or more of translation, rotation, tilting, panning or some combinations of translation, rotation, tilting and panning, of the variable position display in relation to the main cabinet. In another aspect, the gaming machine may comprise a cluster of gaming machines or bank of gaming machines comprising one or more variable position displays.

More specifically, an aspect of an electronic gaming machine comprises a gaming cabinet; a display mounting structure mounted to the gaming cabinet, a variable position display mounted to the display mounting structure and operable to display a game, a player interface operable to play the game, and a controller comprising a processor and memory, the memory stores a game program and movement sequence. When executed, the memory causes the game controller to at least initiate, in response to one or more predefined gaming conditions, the movement sequence causing the display mounting structure, movement of the variable position display, from a first position to a second position while in a spaced apart relationship from the cabinet to permit the movement sequence, and initiate, in response to movement of the variable position display to the second position, the game program tailored to at least present a game and game outcomes of the game on the variable position display in the second position.

In some aspects, the gaming machine may include a controller that detects a game instance, detects a first display position and drives the display mount structure to position one or more variable position displays from a first display position to a second display position based on a gaming event.

In some aspects, the gaming machine may include a controller that drives the display mount structure to translate, rotate, tilt or some combination of translation, rotation or tilting, the variable position display based on one or more gaming conditions.

In some aspects, the variable position display may translate toward, away or vertically parallel with the main cabinet. The variable position display may also rotate through 360 or more degrees of rotation, and through smaller increments, e.g., 90 degrees, between at a first orientation and a second orientation with respect to the main cabinet. The variable position display may tilt toward or away from the gaming cabinet.

In an aspect, the display mount structure may also be operatively connected to a track arranged with the main cabinet that allows the variable position display to translate vertically or horizontally.

In the various aspects, the display mount structure may, for example, take the form of a structure comprising a telescoping structure (e.g., a sequence of nested structures that can be extended or retracted) or an articulating arm that is also capable of rotating the variable position display. The telescoping structure or articulating arm may include a locking and unlocking system.

In an aspect, the gaming machine may include an orientation detecting device to detect a position or orientation of the variable position display, generate a position or orientation signal, and adjust game instance based on the orientation signal.

In some aspects, two or more variable position displays on a gaming machine move, e.g., synchronously or asynchronously, and orient in response to a gaming event.

In yet other aspects, one or more variable position displays from at least two gaming machines move, e.g., synchronously or asynchronously, and orient in response to a gaming event.

In yet other aspects, a variable position display may be moved in response to a game event occurring on another gaming machine or portable and/or remote gaming device.

Some aspects synchronize the movement sequence of the variable position displays between or among gaming machines or portable and/or remote gaming devices.

In other aspects, the variable position display move and orient in a predefined movement sequence.

Another aspect of the present disclosure provides a gaming machine having a rollable and adjustable display, and a method of operating a gaming machine with a rollable and adjustable display. The gaming machine, system and method of operating a gaming machine with an extendable display permits a single game build for a single gaming machine independent of the position of variable position display.

In one aspect, a gaming machine may have a main cabinet, a main display on the main cabinet, an auxiliary display device housing mounted on the main cabinet proximate to the main display, and storing an extendable display, and a controller having a processor and memory storing instructions, which, which executed, cause the processor to at least protrude, project, extend or stick out from the auxiliary display device housing to form an enlarged display with the main display.

More specifically, an aspect of an electronic gaming system comprises a gaming cabinet, a gaming cabinet, a main display, an auxiliary display device housing mounted to the gaming cabinet, and having an auxiliary display operable to extend through the auxiliary display device housing and to display game contents, and a controller comprising a processor and memory, the memory storing a movement sequence and a game program, which, when executed, causes the processor to at least: initiate, in response to one or more predefined conditions, the movement sequence causing the auxiliary display to be unrolled and extend through from the auxiliary display device housing from a first position to a second position relative to the auxiliary display device housing, and initiate, in response to movement of the auxiliary display to the second position, the game program tailored to at least present a game and game outcomes of the game on the display in the second position.

In some aspects, the electronic gaming system may include a controller that detects a game instance, unrolls the display, and drives or extend the unrolled display from a first display position to a second display position with respect to an auxiliary device based on a gaming event.

In some aspects, the controller detects a game instance, unrolls the auxiliary display, and drives or extends the auxiliary display unrolled from the first display position to the second display position based on a gaming event.

In some aspects, the electronic gaming system further comprises a mounting structure, and wherein the controller drives the auxiliary display along the mounting structure to deploy the auxiliary display based on one or more gaming conditions.

In some aspects, the auxiliary display is a telescoping display operable to protrude the gaming cabinet based on a gaming event.

In some aspects, the electronic gaming system further comprises a second auxiliary display stored in the auxiliary display device housing.

In some aspects, the auxiliary display, the main display, and the second auxiliary display form a nested gaming display in response to a gaming event.

In some aspects, the auxiliary display extends through the auxiliary display device housing in a first direction, and the second auxiliary display extends through the auxiliary display device housing in a second direction that is different from the first direction.

In some aspects, the auxiliary display is operable to extend through from the auxiliary display housing in response to a game event occurring on another gaming machine or portable and/or remote gaming device.

In some aspects, the auxiliary display is also capable of one or more of translation, rotation, tilting, panning or some combinations of translation, rotation, tilting and panning, of the variable position display in relation to the main cabinet.

In some aspects, the electronic gaming system further comprises a cluster of gaming machines or bank of gaming machines comprising one extendable display covering the cluster of gaming machines.

Still another aspect of the present disclosure provides a gaming machine having a main cabinet, a display mounting structure, a variable position display capable of display movement responsive to gaming conditions, and a game controller. The variable position display may rotate, tilt, pan, or some combination of translation, rotation, tilting and panning, in relation to the main cabinet and in response to at least one or more predefined gaming conditions. The game controller initiates a movement sequence causing the display mounting structure to move from a first position to a second position and initiates a game program tailored to at least present a game and game outcomes of the game on the variable position display in the second position. Additionally, or alternatively, a display screen may be positioned to slide down or move up based on the predefined gaming conditions (e.g., bonus and/or secondary features). In some embodiments, the display screen may be positioned behind the variable position display. The variable position display can be rotated to align with the screen. Contents can then be displayed on both the display screen and the variable position display. A sling-shot button may be used to trigger rotation of the variable position display and/or movement of the display screen.

Figure 1:
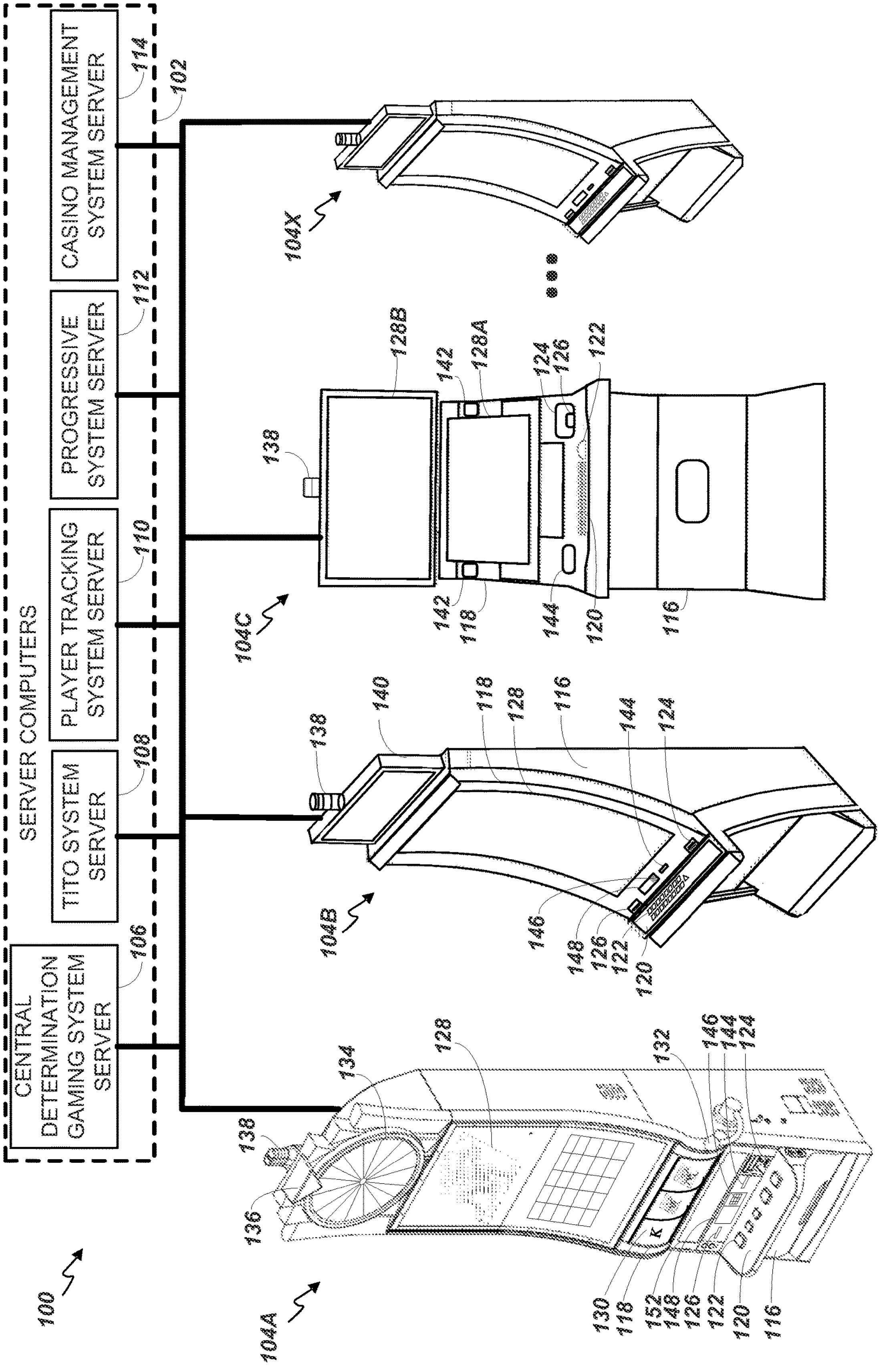
FIG. 1 is an exemplary diagram showing several EGMs networked with various gaming related servers.

The foregoing summary, as well as the following detailed description of certain embodiments of the present disclosure, will be better understood when read in conjunction with the appended drawings. For the purpose of illustrating the disclosure, certain embodiments are shown in the drawings. It should be understood, however, that the present invention is not limited to the arrangements and instrumentality shown in the attached drawings.

DETAILED DESCRIPTION

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
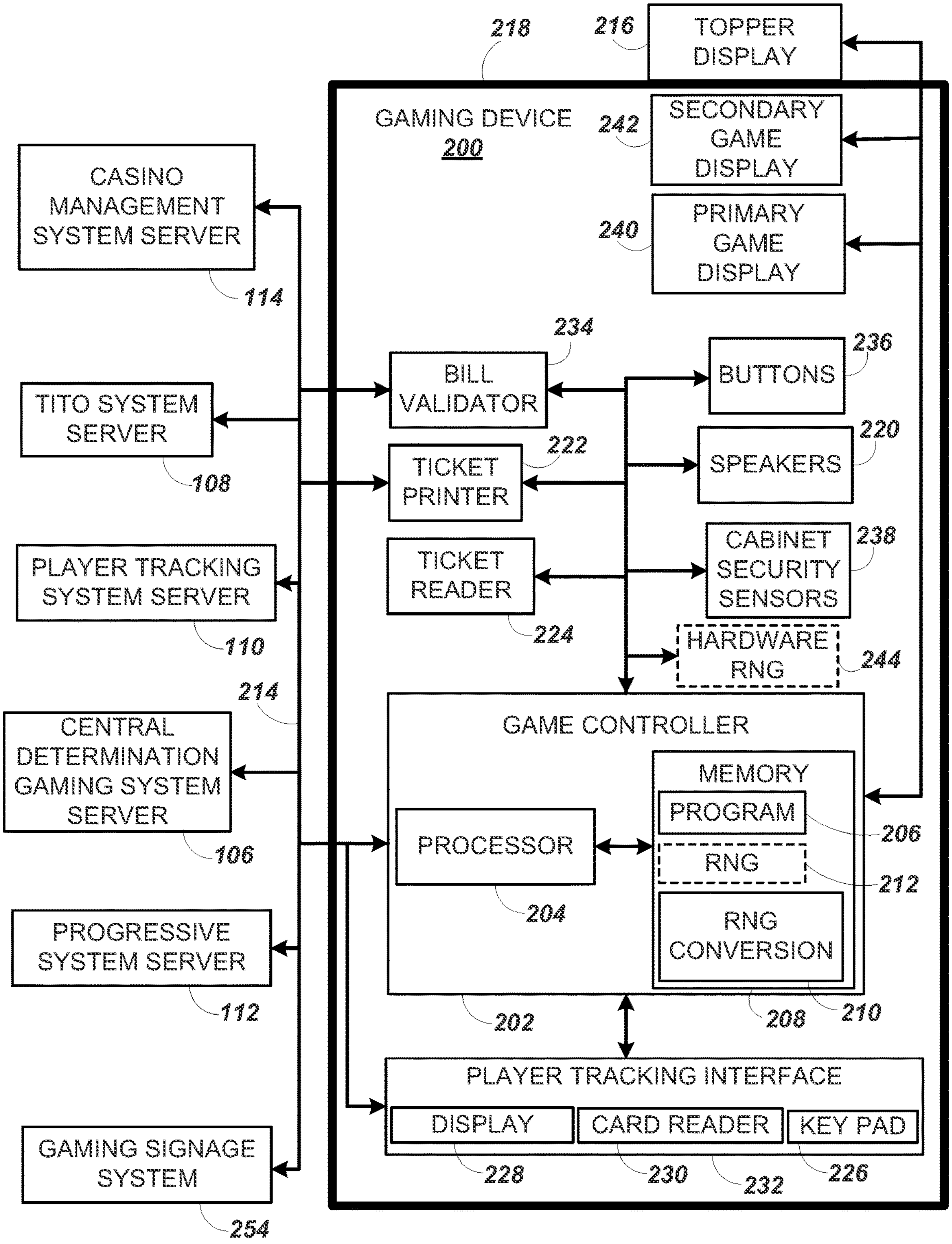
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including the RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2A. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
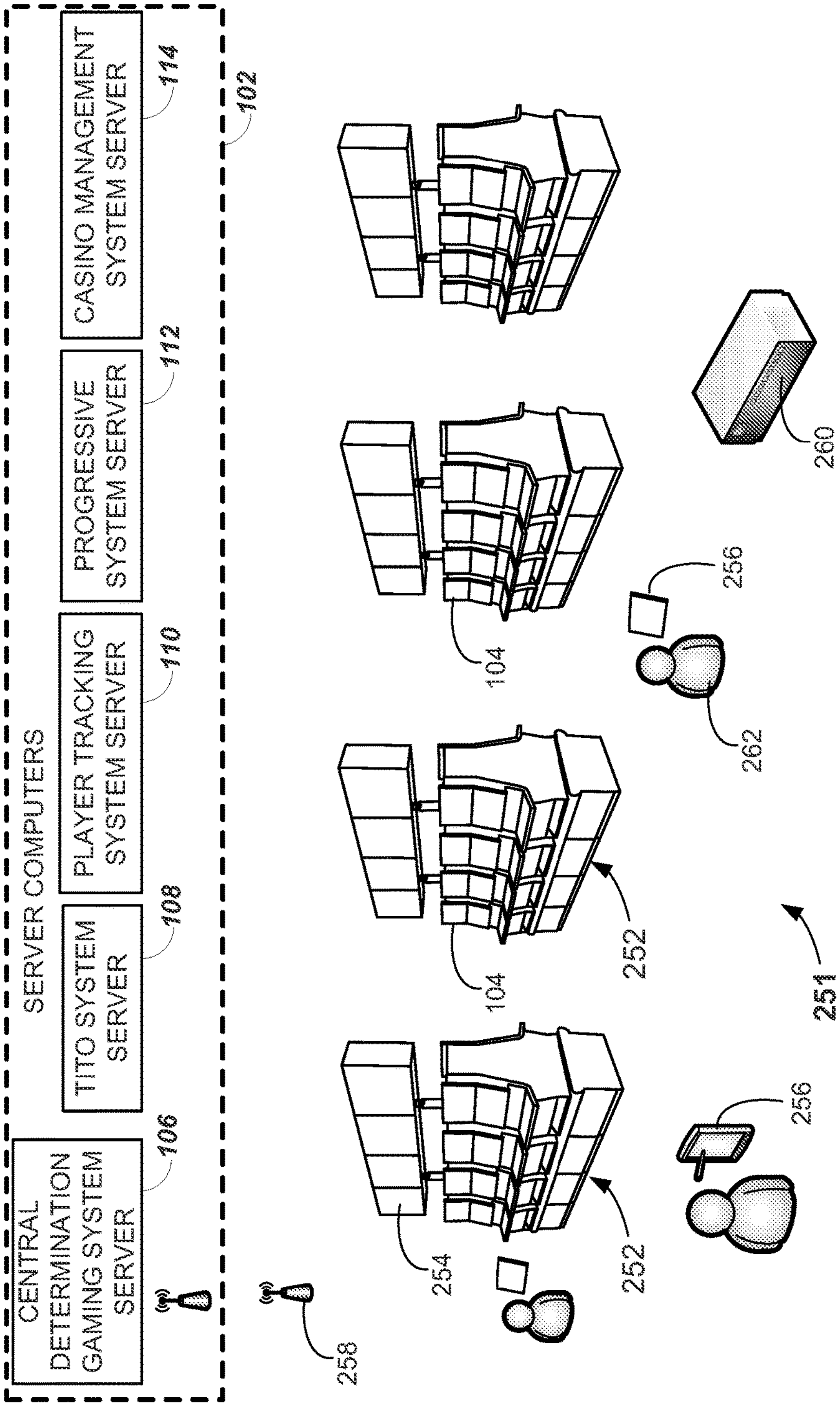
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
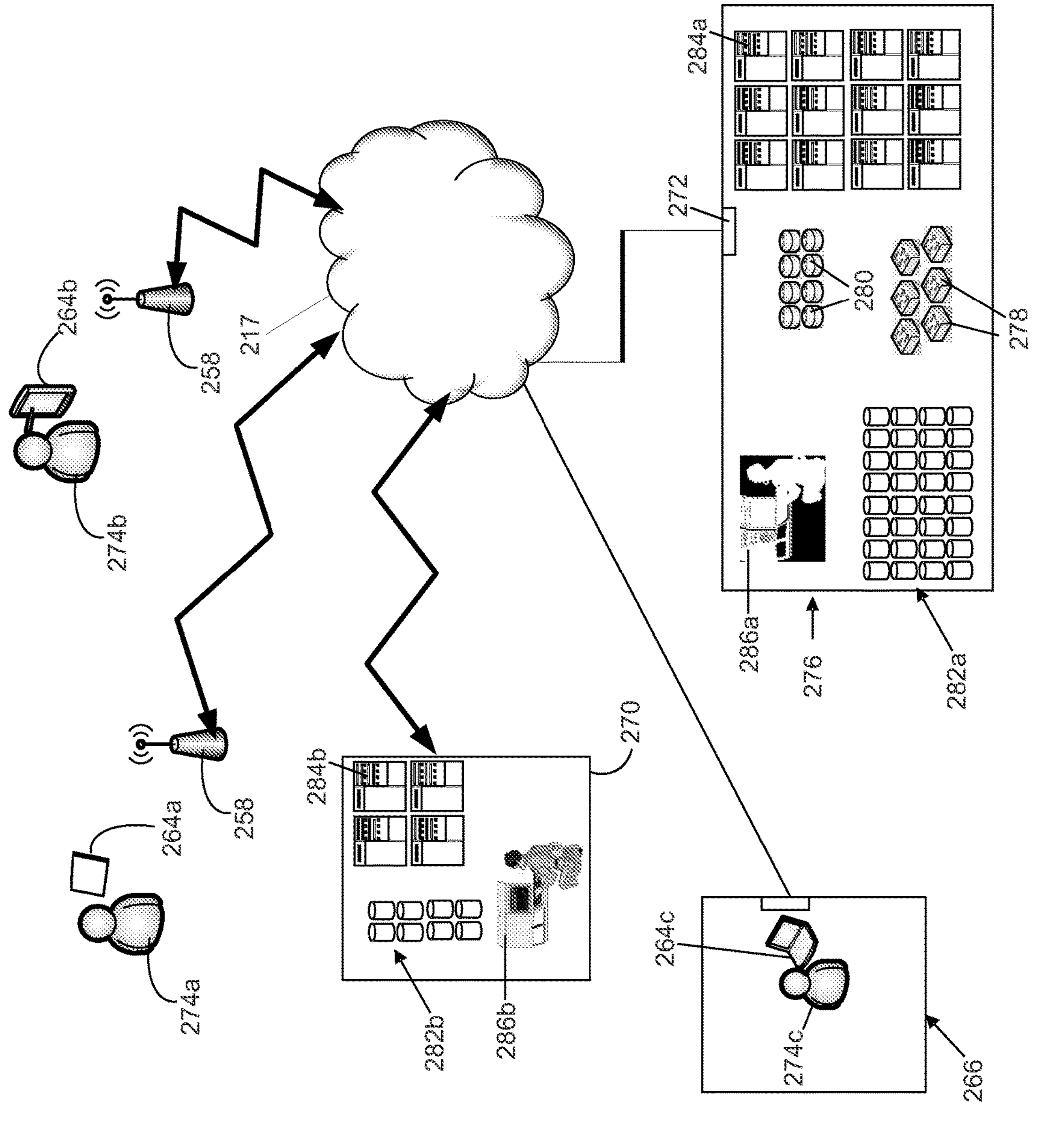
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 217. The networks 217 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 217. The gaming data center 276 is capable of communication with the networks 217 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 217. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 217. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 2D:
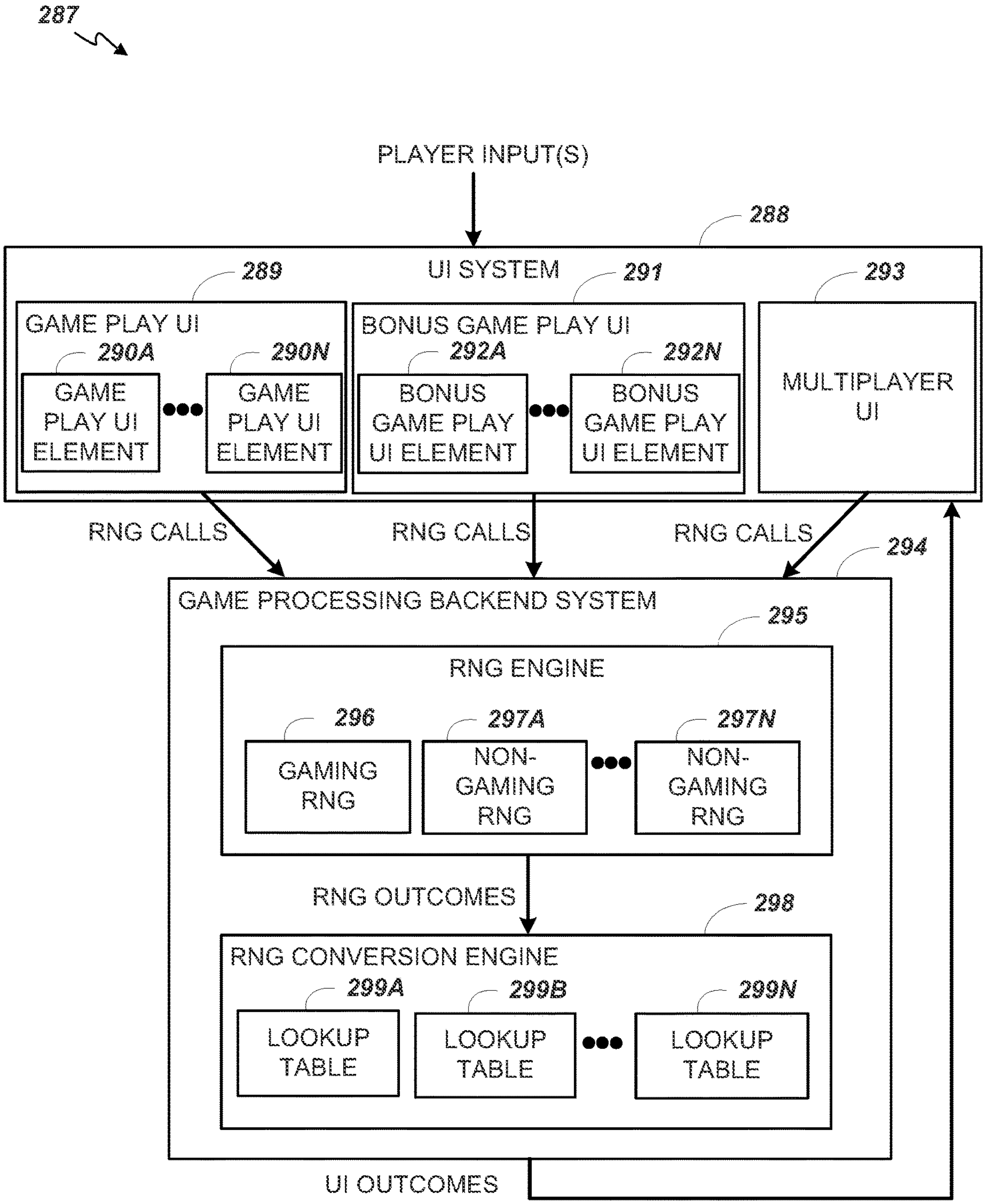
FIG. 2D illustrates, in block diagram form, an implementation of a game processing architecture algorithm that implements a game processing pipeline for the play of a game in accordance with various implementations described herein.

FIG. 2D illustrates, in block diagram form, an implementation of a game processing architecture 287 that implements a game processing pipeline for the play of a game in accordance with various implementations described herein. As shown in FIG. 2D, the gaming processing pipeline starts with having a UI system 288 receive one or more player inputs for the game instance. Based on the player input(s), the UI system 288 generates and sends one or more RNG calls to a game processing backend system 294. Game processing backend system 294 then processes the RNG calls with RNG engine 295 to generate one or more RNG outcomes. The RNG outcomes are then sent to the RNG conversion engine 298 to generate one or more game outcomes for the UI system 288 to display to a player. The game processing architecture 287 can implement the game processing pipeline using a gaming device, such as gaming devices 104A-104X and 200 shown in FIGS. 1 and 2A, respectively. Alternatively, portions of the gaming processing architecture 287 can implement the game processing pipeline using a gaming device and one or more remote gaming devices, such as central determination gaming system server 106 shown in FIG. 1.

The UI system 288 includes one or more UIs that a player can interact with. The UI system 288 could include one or more game play UIs 289, one or more bonus game play UIs 291, and one or more multiplayer UIs 293, where each UI type includes one or more mechanical UIs and/or graphical UIs (GUIs). In other words, game play UI 289, bonus game play UI 291, and the multiplayer UI 293 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 2D as an example, the different UI elements are shown as game play UI elements 290A-290N and bonus game play UI elements 292A-292N.

The game play UI 289 represents a UI that a player typically interfaces with for a base game. During a game instance of a base game, the game play UI elements 290A-290N (e.g., GUI elements depicting one or more virtual reels) are shown and/or made available to a user. In a subsequent game instance, the UI system 288 could transition out of the base game to one or more bonus games. The bonus game play UI 291 represents a UI that utilizes bonus game play UI elements 292A-292N for a player to interact with and/or view during a bonus game. In one or more implementations, at least some of the game play UI element 290A-290N are similar to the bonus game play UI elements 292A-292N. In other implementations, the game play UI element 290A-290N can differ from the bonus game play UI elements 292A-292N.

FIG. 2D also illustrates that UI system 288 could include a multiplayer UI 293 purposed for game play that differs or is separate from the typical base game. For example, multiplayer UI 293 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 295 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 2D does not explicitly depict that multiplayer UI 293 includes UI elements, multiplayer UI 293 could also include one or more multiplayer UI elements.

Based on the player inputs, the UI system 288 could generate RNG calls to a game processing backend system 294. As an example, the UI system 288 could use one or more application programming interfaces (APIs) to generate the RNG calls. To process the RNG calls, the RNG engine 295 could utilize gaming RNG 296 and/or non-gaming RNGs 297A-297N.

Gaming RNG 296 could corresponds to RNG 212 or hardware RNG 244 shown in FIG. 2A. As previously discussed with reference to FIG. 2A, gaming RNG 296 often performs specialized and non-generic operations that comply with regulatory and/or game requirements. For example, because of regulation requirements, gaming RNG 296 could correspond to RNG 212 by being a cryptographic RNG or pseudorandom number generator (PRNG) (e.g., Fortuna PRNG) that securely produces random numbers for one or more game features. To securely generate random numbers, gaming RNG 296 could collect random data from various sources of entropy, such as from an operating system (OS) and/or a hardware RNG (e.g., hardware RNG 244 shown in FIG. 2A). Alternatively, non-gaming RNGs 297A-297N may not be cryptographically secure and/or be computationally less expensive. Non-gaming RNGs 297A-297N can, thus, be used to generate outcomes for non-gaming purposes. As an example, non-gaming RNGs 297A-297N can generate random numbers for generating random messages that appear on the gaming device.

The RNG conversion engine 298 processes each RNG outcome from RNG engine 295 and converts the RNG outcome to a UI outcome that is feedback to the UI system 288. With reference to FIG. 2A, RNG conversion engine 298 corresponds to RNG conversion engine 210 used for game play. As previously described, RNG conversion engine 298 translates the RNG outcome from the RNG 212 to a game outcome presented to a player. RNG conversion engine 298 utilizes one or more lookup tables 299A-299N to regulate a prize payout amount for each RNG outcome and how often the gaming device pays out the derived prize payout amounts. In one example, the RNG conversion engine 298 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 294 sends the UI outcome to the UI system 288. Examples of UI outcomes are symbols to display on a video reel or reel stops for a mechanical reel. In one example, if the UI outcome is for a base game, the UI system 288 updates one or more game play UI elements 290A-290N, such as symbols, for the game play UI 289. In another example, if the UI outcome is for a bonus game, the UI system could update one or more bonus game play UI elements 292A-292N (e.g., symbols) for the bonus game play UI 291. In response to updating the appropriate UI, the player may subsequently provide additional player inputs to initiate a subsequent game instance that progresses through the game processing pipeline.

Figure 3A:
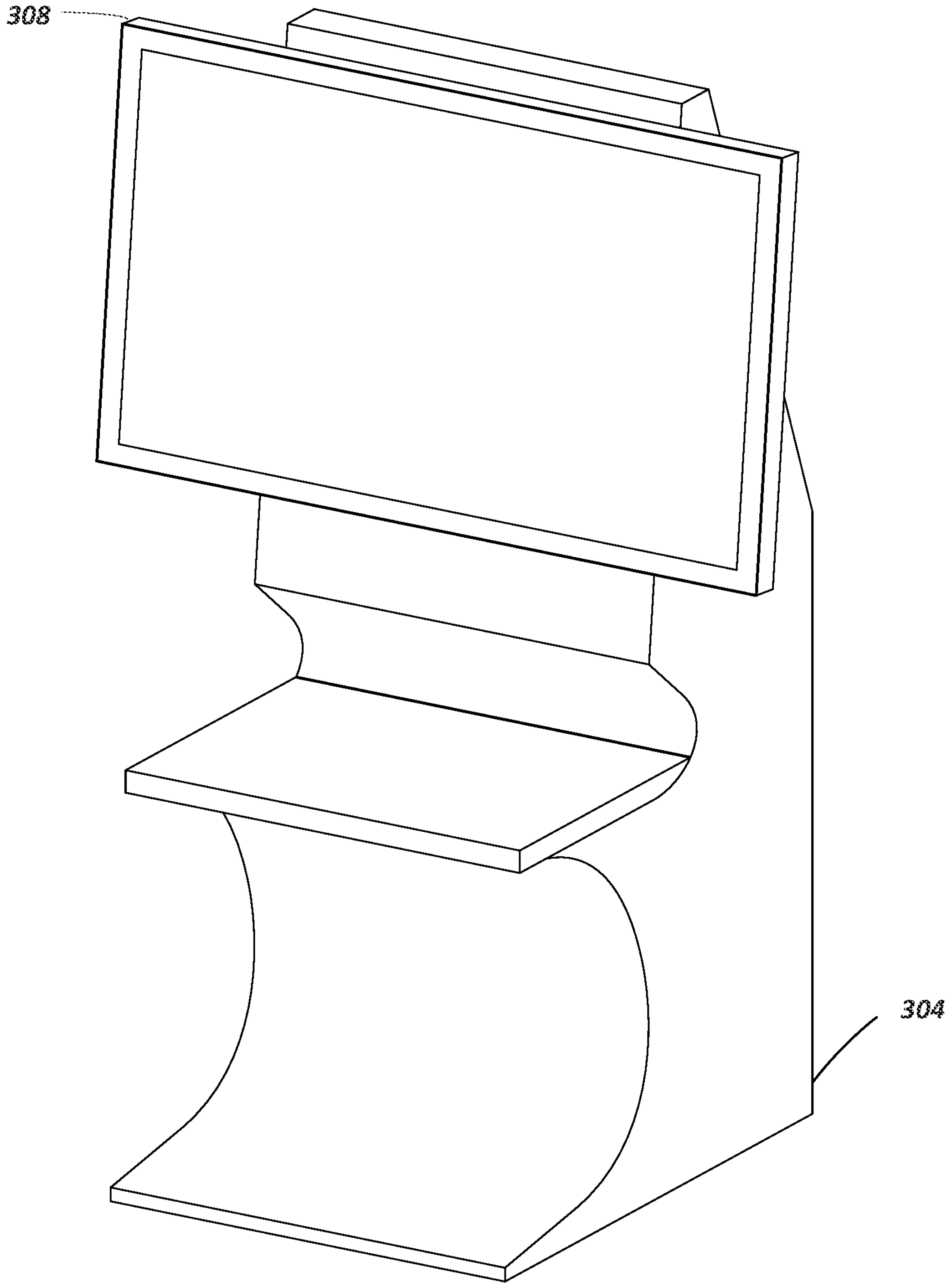
FIG. 3A illustrates an aspect of a first gaming cabinet having a variable position display in a first position.

FIG. 3A illustrates an aspect of a first gaming cabinet 304 having a first variable position display 308 in a first orientation (i.e., landscape) in relation to the first gaming cabinet 304. The first gaming cabinet 304 may include some or all of the features similar to those illustrated and described for gaming devices 104A-104C of FIG. 1, with the exception of the apparent respective depiction of gaming devices 104A-104C as fixed position displays. Further, FIG. 3A illustrates a first variable position display 308 coupled to the first gaming cabinet 304 by a display mount structure 350 (not fully viewable in FIGS. 3A-3F). Display mount structure 350 is arranged to move the first variable position display 308 via one or more of translation, rotation, tilting, panning or some combinations of translation, rotation, tilting and panning, in relation to the first cabinet 304. The shape of the first variable position display 308 may conform to the shape of an adjacent gaming cabinet. For example, in this embodiment, the shape of the first variable position display 308 may be flat to conform to a flat shaped adjacent first gaming cabinet 304.

Figure 8:
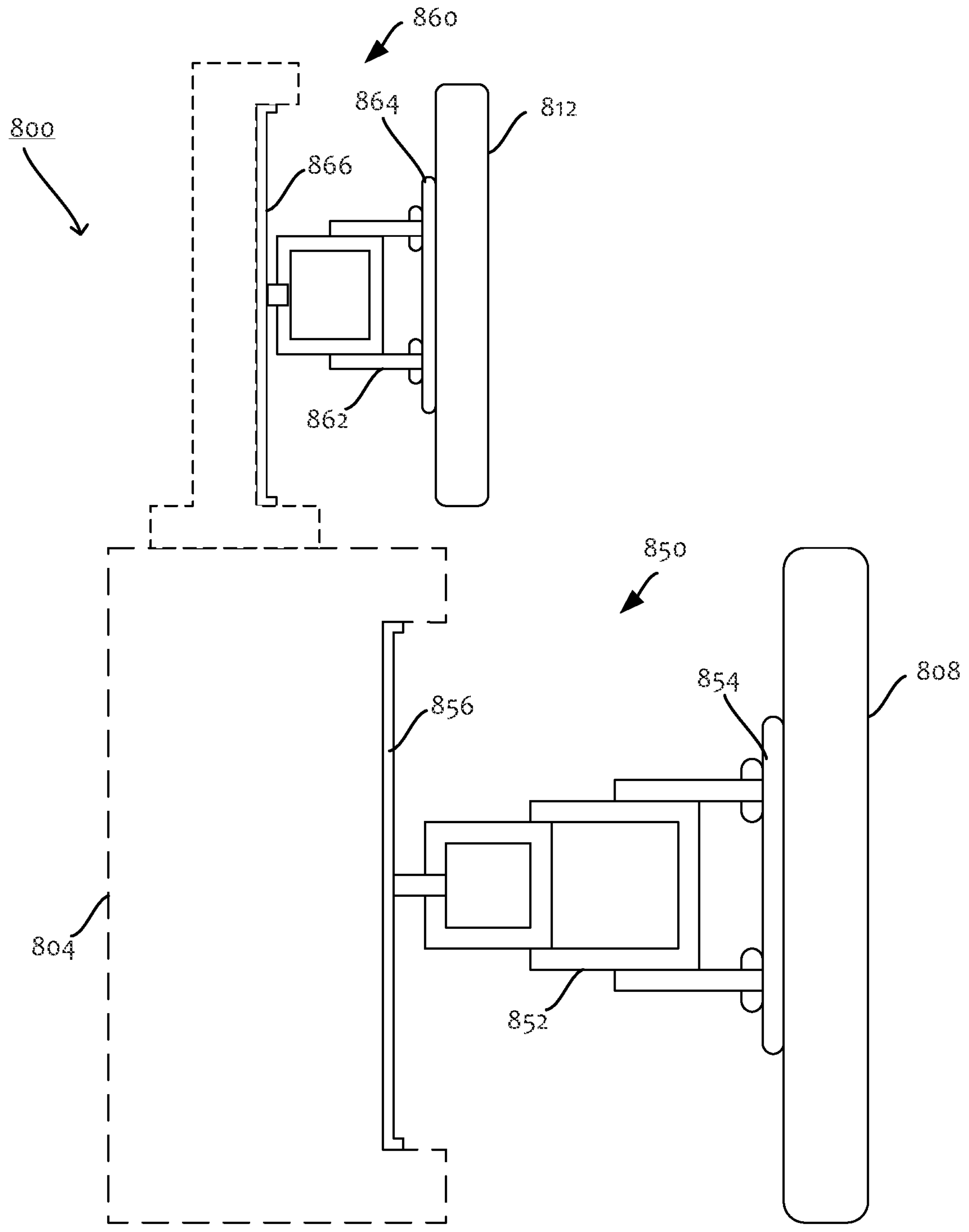
FIG. 8 illustrates an aspect of a display mount structure of a gaming cabinet having a variable position display and top box display.

One illustration of the display mount structure 350 is depicted as display mount structure 850 in the FIG. 8. Other configurations of the display mount structure 850 are contemplated as long as the movement of the variable position display 308 can be carried out relative to the first game cabinet 304 as contemplated herein. The movement and orientation of the first variable position display 308 may be manual, automatic or in some combination of manual or automatic. For example, the first variable position display 308 may move, in response to detection of one or more gaming conditions, manually by the player, e.g., for player game preferences or game parameters, or automatically, e.g., in response to player game preferences or game parameters.

More specifically, in some aspects, the first variable position display 308 may, in response to detection of one or more gaming conditions, automatically translate away from the first gaming cabinet 304 and rotate, where the rotation of the first variable position display 308 may involve unidirectional or bidirectional rotations. Aspects of the first variable position display 308 move the first variable position display 308 to facilitate rotation without interference of the first gaming cabinet 304. Such movement without interference may include translating the first variable position display 308 away from the first gaming cabinet 304 and any other movements in response to detection of one or more gaming conditions.

In some other aspects, the movement of the first variable position display 308 before, during, or after game play, may involve synchronous movement of the first variable position displays 308 in relation to the other gaming cabinets 304 in a cluster or bank of gaming cabinets. In still other aspects, the movement of the first variable position display 308 before, during or after game play may involve asynchronous movement of the first variable position display 308 in relation to the other gaming cabinets 304 in a cluster or bank of gaming cabinets.

Figure 3B:
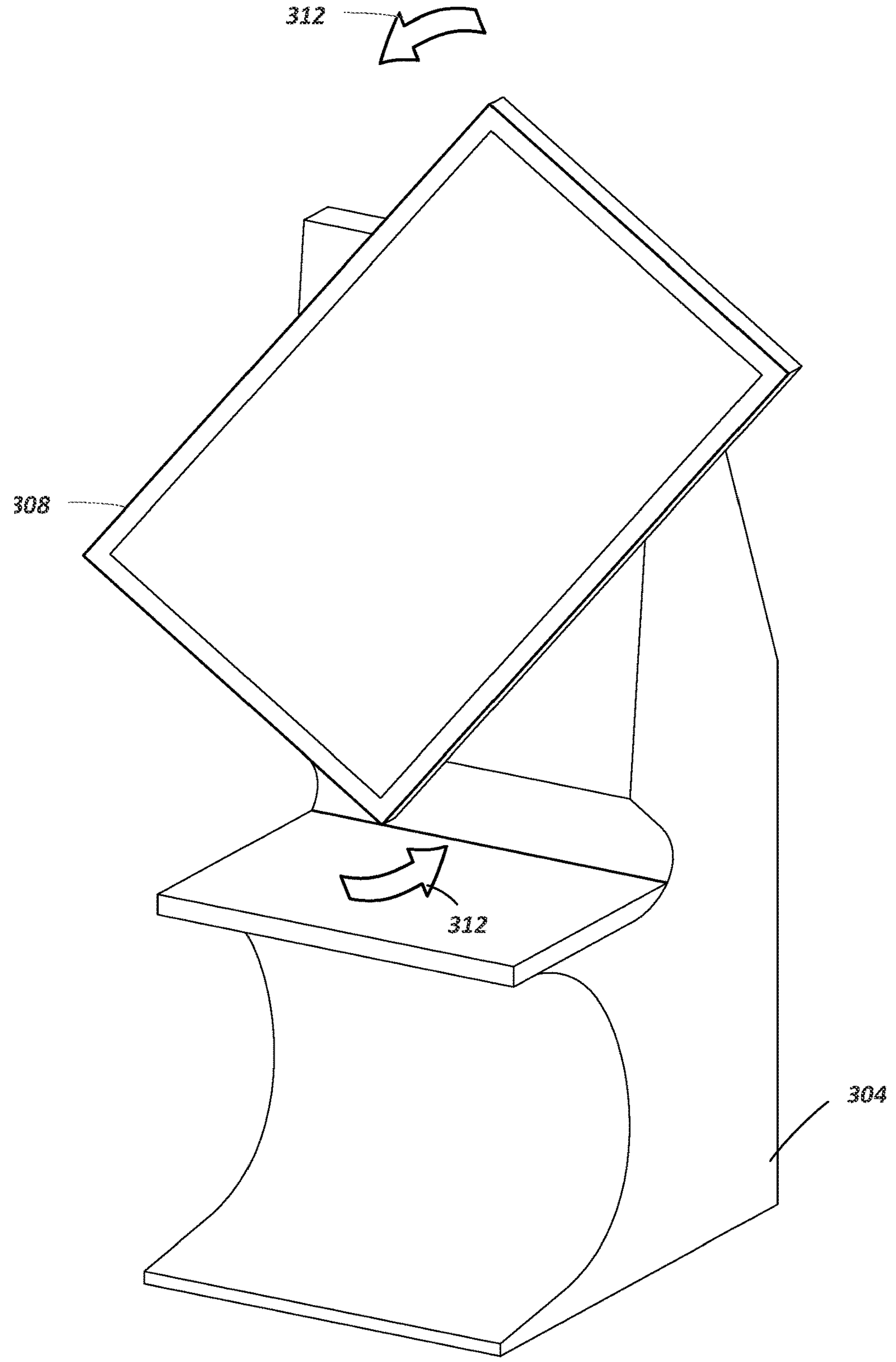
FIG. 3B illustrates the first gaming cabinet of FIG. 3A during a first movement process.

FIG. 3B illustrates the first gaming cabinet 304 of FIG. 3A during the movement of the first variable position display 308. As shown in FIG. 3B, the first variable position display 308 may rotate (e.g., here, counterclockwise from a player's or user's viewpoint when looking at the screen for game play, as depicted by arrows 312), and may orient the first variable position display 308 to a new orientation for game play, e.g., from the landscape view into a portrait mode, in response to detection of one or more gaming conditions. During movement, the graphical user interface may display content in the orientation of the display, in an orientation convenient to the player and/or may be visually responsive to the movement.

Figure 3C:
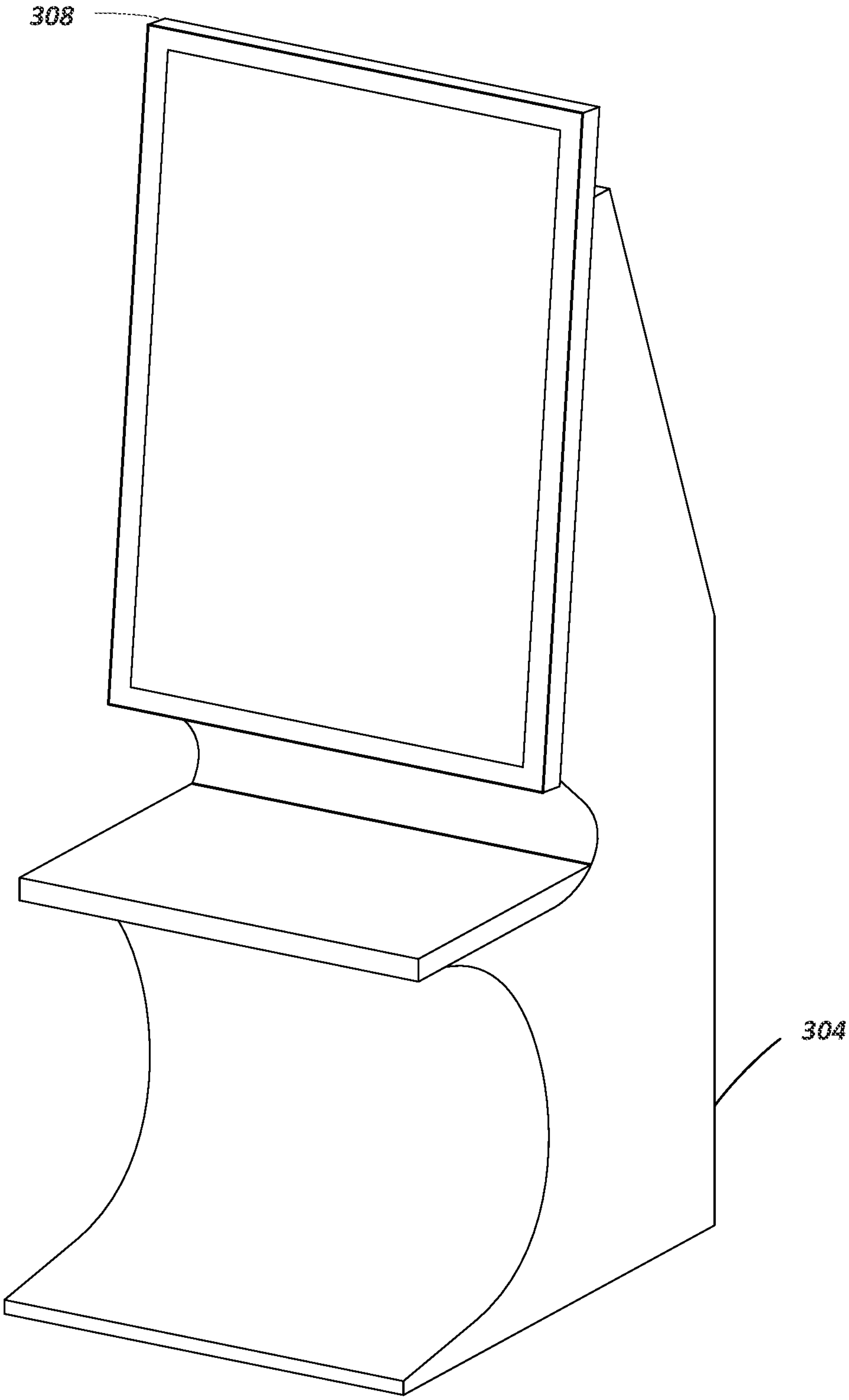
FIG. 3C illustrates the first gaming cabinet after the first movement process of FIG. 3B with the variable position display to a second position.

FIG. 3C illustrates the first gaming cabinet 304 after the first variable position display 308 rotates to a new orientation, e.g., to the portrait view. The first variable display position 308 of FIGS. 3A-3C can be points during a game where the player may conduct gaming activities, or may be part of a programmed sequence of movement while the player waits to conduct gaming activities or after the game activities have concluded or before they have started.

Figure 3D:
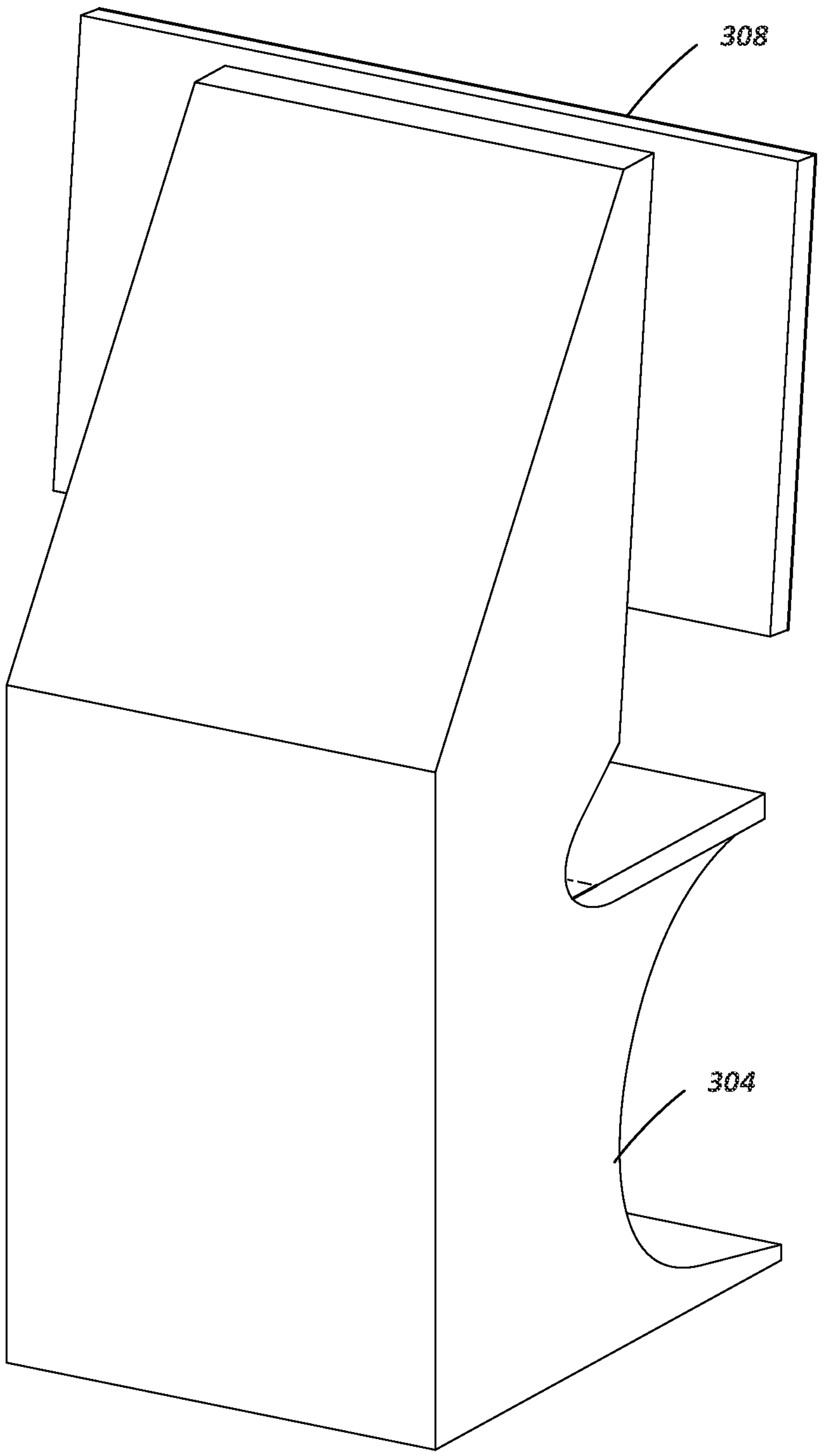
FIG. 3D illustrates a rear view of the first cabinet of FIG. 3A.
Figure 3E:
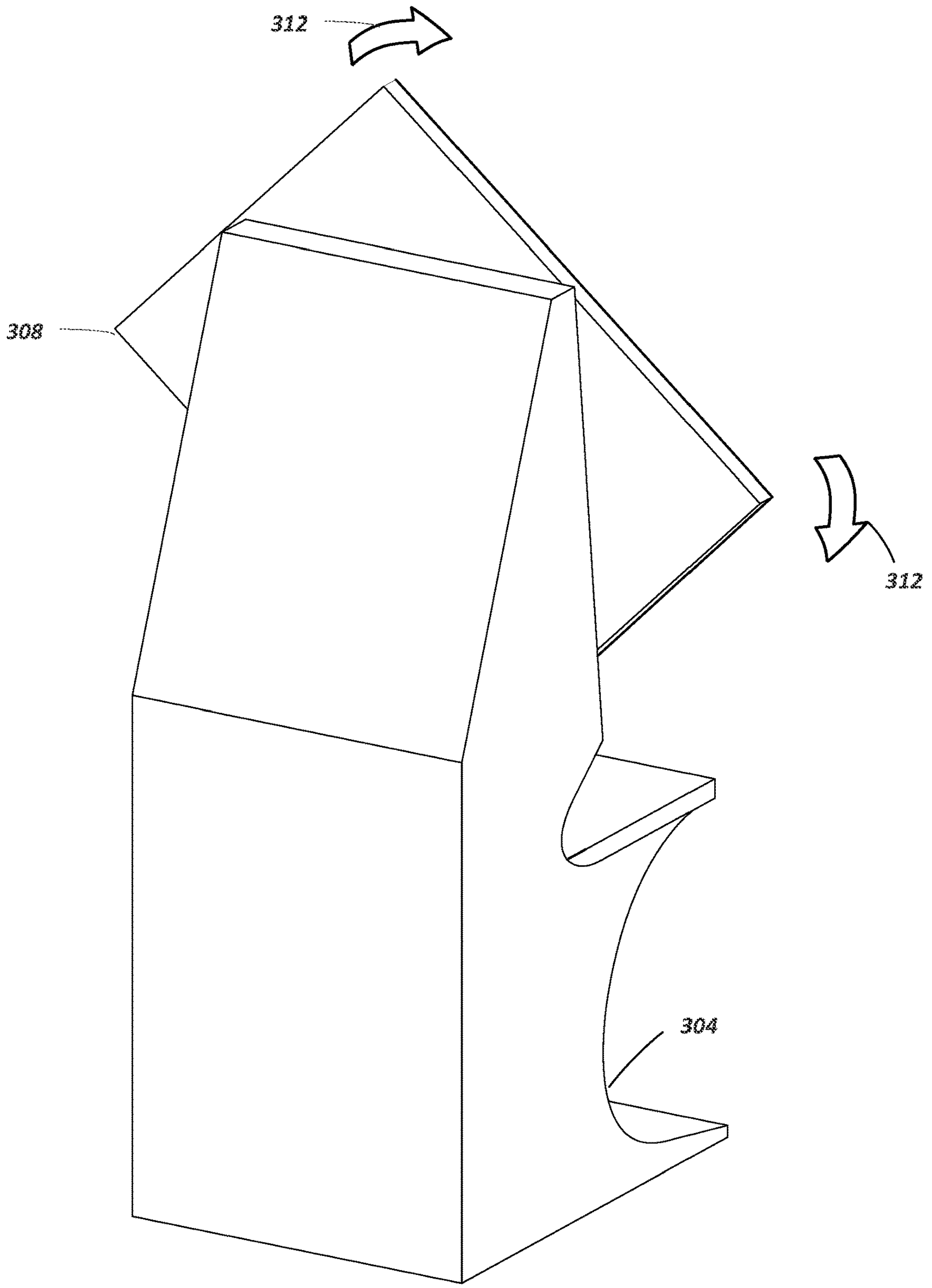
FIG. 3E illustrates a rear view of the first gaming cabinet during the first movement process of FIG. 3B.
Figure 3F:
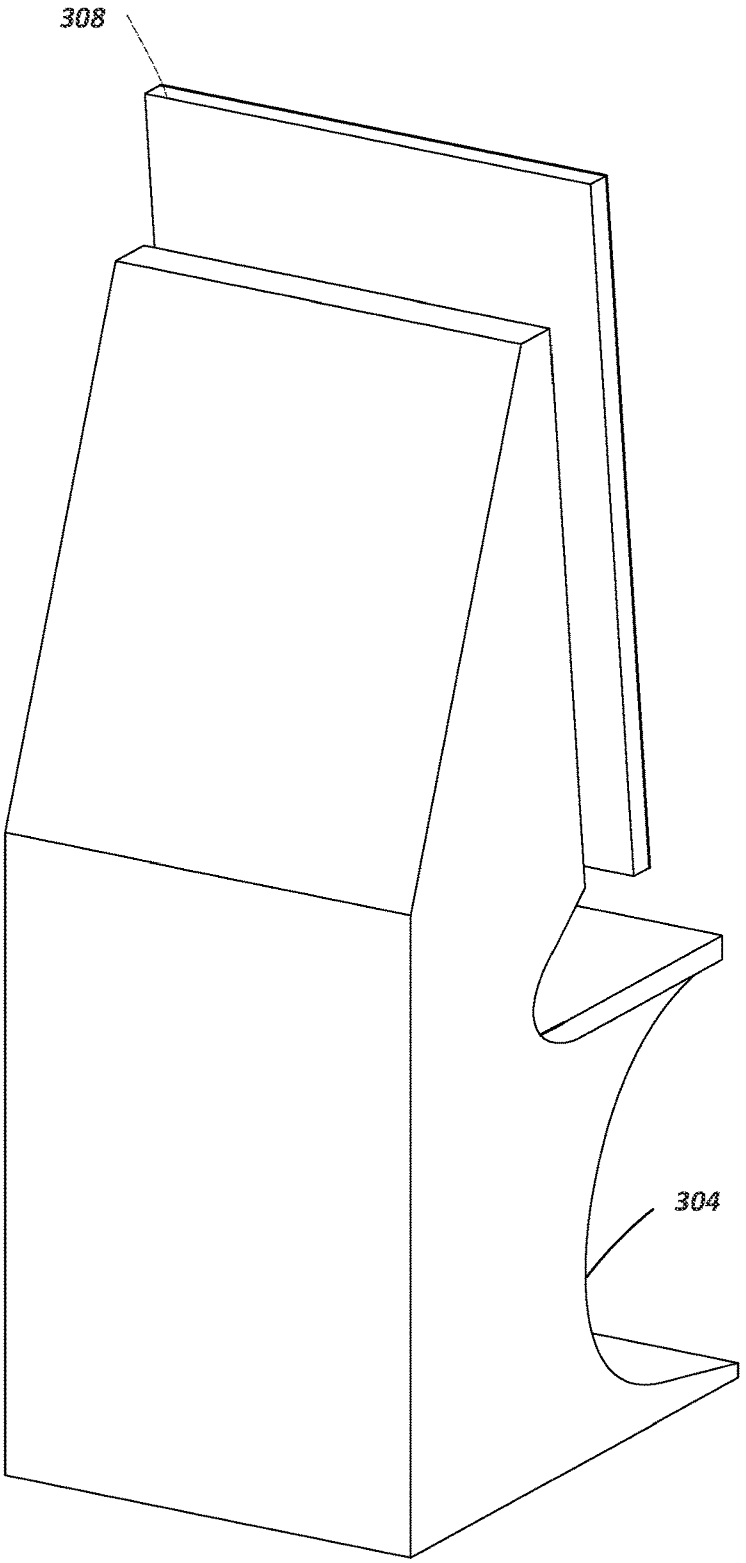
FIG. 3F illustrates a rear view of the first gaming cabinet after the first movement process of FIG. 3B with the variable position display in a second position.

FIG. 3D illustrates a rear view of the first gaming cabinet 304 of FIG. 3A, prior to movement of the first variable position display 308. FIG. 3E illustrates a rear view of the first gaming cabinet 304 during movement of the first variable position display 308 (e.g., here, counterclockwise from a player's or user's viewpoint when looking at the screen for game play, as depicted by arrows 312), where the first gaming cabinet in FIG. 3B is configured to cause little or no interference. FIG. 3F illustrates a rear view of the first gaming cabinet 304 after movement of the first variable position display 308, which, if viewed as a continuous movement process starting from FIG. 3A to 3C, illustrates from the starting position of the first variable position display 308 in FIG. 3A to an intermediate position in FIG. 3B to a final position in FIG. 3C to the portrait view. This embodiment has a variable position display 308 that has little to no interference with the first gaming cabinet 304. The first variable position display 308 may be further moved such that the first variable position display 308 is fully retracted against or in close clearance proximity to the first game cabinet 304.

The movement of the first variable position display 308 is not limited to a single movement sequence. The movement of the first variable position display 308 can combine several movement sequences before, during or after start of game play. Additionally, the movement sequence of the first variable position display 308 may coincide or depend on with player play of a game, such that the first variable position display 308 moves and orients while a game is played by a player or in response to the players game play decisions.

Figure 4A:
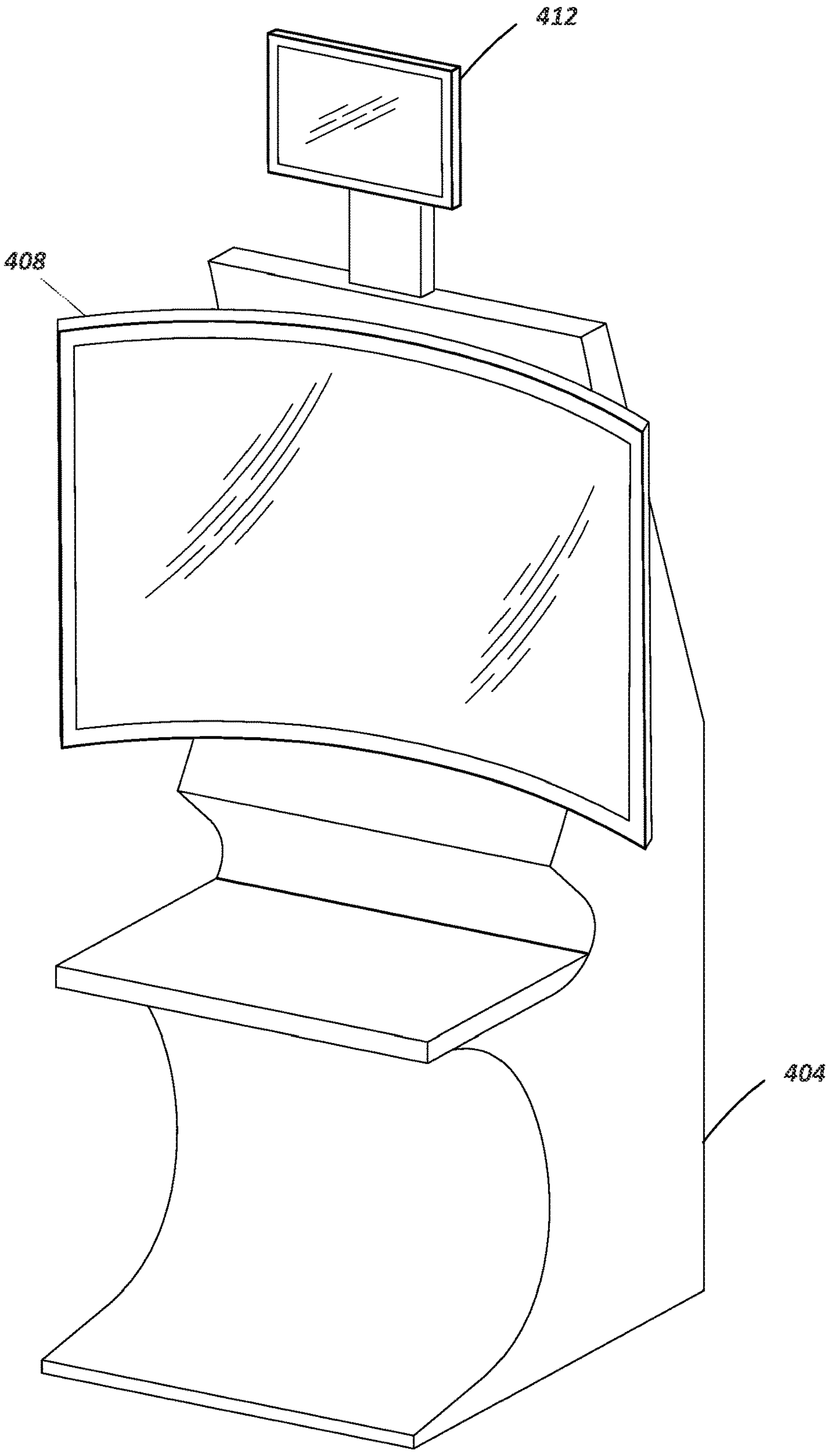
FIG. 4A illustrates an aspect of a second cabinet having a curved, variable position display in a landscape view and a top box display in a first position.

FIG. 4A illustrates an aspect of a second gaming cabinet 404 having a curved, variable position display 408 in a first position (e.g., landscape view) and a top box display 412 in a first topper position (e.g., landscape view). The second gaming cabinet 404 may include some or all of the features similar to those illustrated and described for gaming devices 104A-C of FIG. 1, with the exception of the apparent respective depiction of gaming devices 104A-104C as fixed position displays. The curved, variable position display 408 is coupled to the second gaming cabinet 404 by a display mount structure 450 (not fully viewable in FIG. 4A-4F) that is arranged to move the curved, variable position display 408 via one or more of translation, rotation, tilting, panning or some combinations of translation, rotation, tilting and panning, in relation to the second gaming cabinet 404. The curved shape of the curved, variable position display 408 may conform to a curved shape of an adjacent main gaming cabinet. For example, in other aspects, the curved shape of the curved, variable position display 408 may be curved to conform to a curved shaped adjacent main gaming cabinet.

One illustration of the display mount structure 450 is depicted as display mount structure 850 in the FIG. 8. Other configurations of the display mount structure 850 are contemplated as long as the movement of the variable position display 408 can be carried out relative to the first game cabinet 404 as contemplated herein. The movement and orientation of the first variable position display 408 may be manual, automatic or in some combination of manual or automatic. For example, the first variable position display 408 may move, in response to detection of one or more gaming conditions, manually by the player, e.g., for player game preferences or game parameters, or automatically, e.g., in response to player game preferences or game parameters.

The top box display 412 may be coupled to the top of the second gaming cabinet 404 by a topper display mount structure 460 (not fully viewable in FIGS. 4A-4F) that may allow the top box display 412 to move (alone or with the curved, variable position display 408) the topper box display via one or more of translation, rotation, tilting, panning or some combination of translation, rotation, tilting and panning, in relation to the second gaming cabinet 404 or the curved, variable position display 408. The top box display 412 may also be a fixed display that does not move. One illustration of the topper display mount structure 460 for the top box display 412 is depicted in the FIG. 8 as the topper display mount structure 860 for top box display 812.

For example, the top box display 412 may move in response to detection of one or more gaming conditions, manually by the player, e.g., for player game preferences or game parameters, or automatically, e.g., in response to player game preferences or game parameters. By way of further example, in some aspects, the curved, variable position display 408, in response to detection of one or more gaming conditions, may automatically translate away from the second gaming cabinet 404 and rotate, where the rotation of the curved, variable position display 408 may involve unidirectional or bidirectional rotations with top box display 412.

In some other aspects, the movement of the curved, variable position display 408 before, after, or during game play, may involve synchronous movement of the curved, variable position displays 408 in relation to the other gaming cabinets 404 in a bank of gaming cabinets. In still other aspects, the movement of the curved, variable position display 408 before, during or after game play, may involve asynchronous movement of the curved, variable position display 408 in relation to the other gaming cabinets 404 in a bank of gaming cabinets.

In yet further aspects, when the curved, variable position display 408 and the top box display 412 are both arranged to translate, rotate, tilt, pan or some combinations of translation, rotation, tilting and panning. Such movement and/or orientation of the curved, variable position display 408 and the top box display 412 may be one or more synchronous or asynchronous, and manual or automatic movement. The movement and/or orientation may stop for game play anywhere in the range of motion permitted by the display mount structure 450 or topper display mount structure 460.

In still other aspects, an asynchronous movement process may include some combinations of translation, rotation, tilting and panning, that allows the curved, variable position display 408 and the top box display 412 to move differently with respect to either the second gaming cabinet 404, or with each other. By way of another example, an asynchronous movement process may translate, rotate, tilt and pan the curved, variable position display 408 and the top box display 412 in different directions and/or at different rates of movement. In another example, an asynchronous movement may translate, rotate, tilt and pan the curved, variable position display 408 and the top box display 412 to move in the same direction, but time the move of the curved, variable position display 408 before the top box display 412 or at different rates of movement relative to one another. Conversely, a synchronous movement process may include translating, rotating, tilting and panning the curved, variable position display 408 and the top box display 412 in the same direction and at the same rate of movement (e.g., in unison).

Figure 4B:
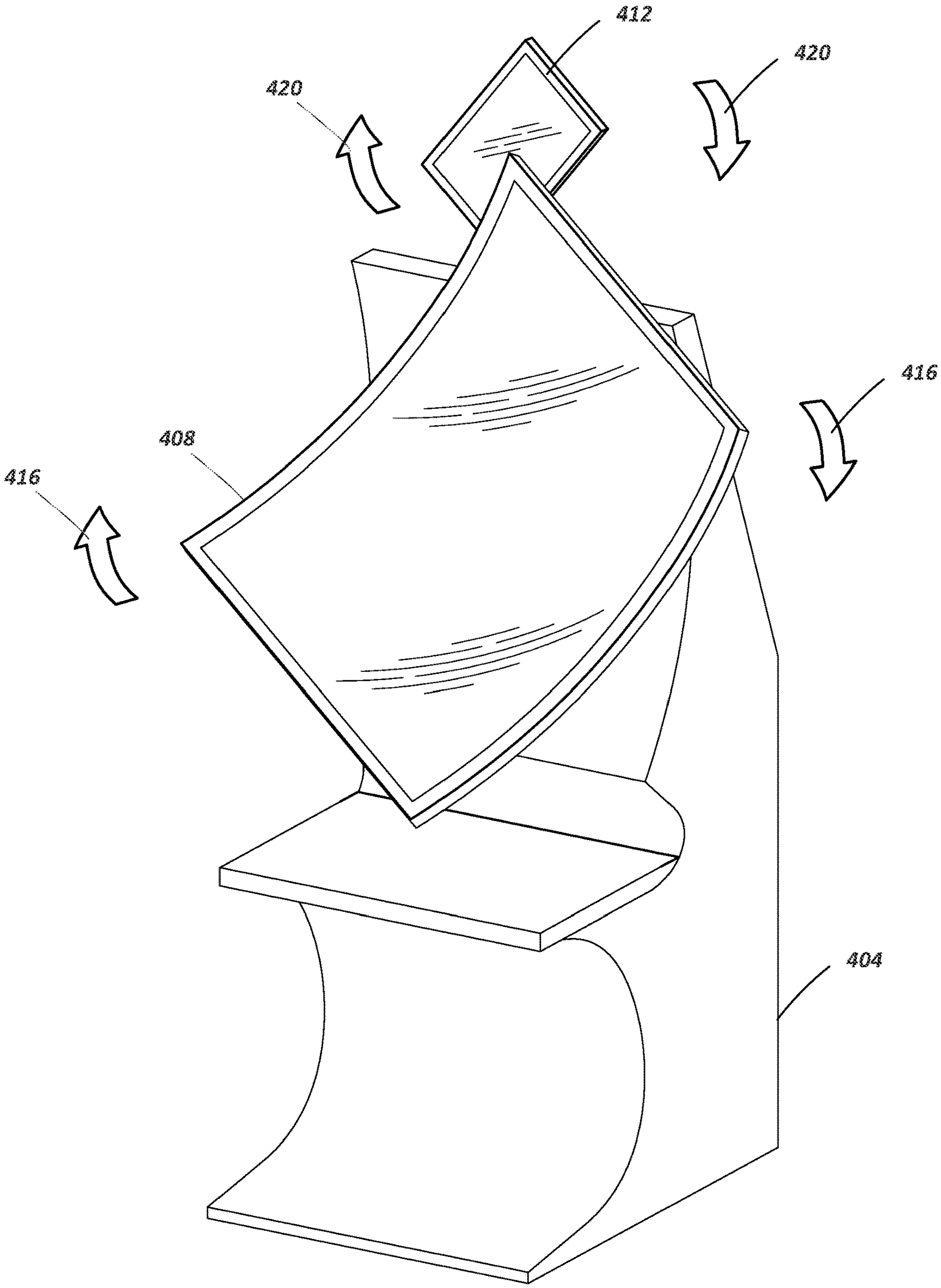
FIG. 4B illustrates the second gaming cabinet of FIG. 4A during a second movement process.

FIG. 4B illustrates the second gaming cabinet 404 of FIG. 4A during the movement of the curved, variable position display 408. The curved, variable position display 408 may translate away from the second gaming cabinet 404 and rotate (e.g., here, clockwise from a player's or user's viewpoint when looking at the screen for game play, as depicted by arrows 416) to orient the curved, variable position display 408 to a new orientation for game play. A display mount structure 450 (not shown in FIG. 4B), for example, may translate away from the second gaming cabinet 404 to provide clearance for further movements of the curved, variable position display 408 in relation to the second gaming cabinet 404. Also, a synchronous movement process moves both the curved, variable position display 408 and the top box display 412 in the same direction and at the same time, or in different directions or at different rates.

Figure 4C:
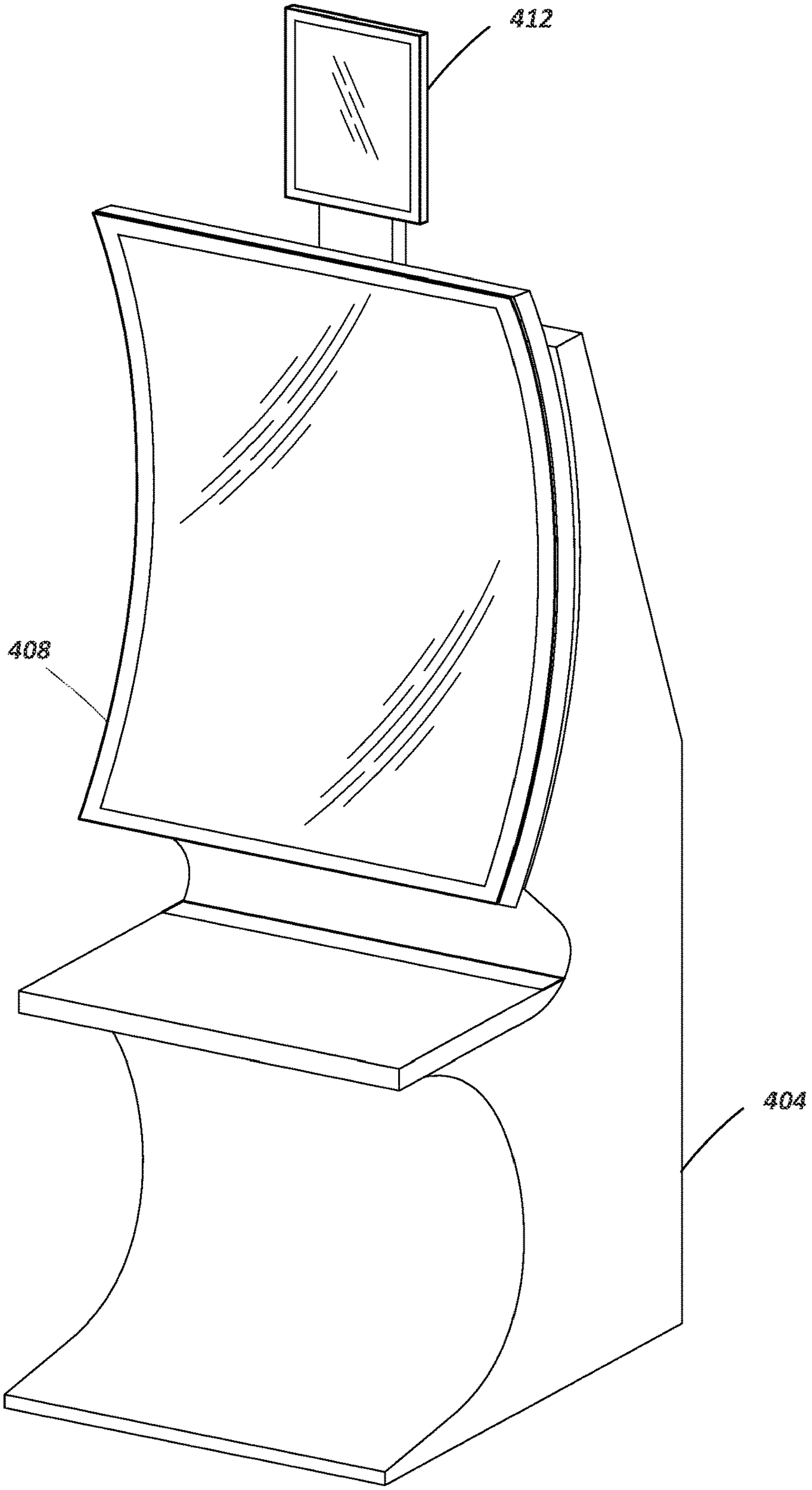
FIG. 4C illustrates the second gaming cabinet after the second movement process of FIG. 4B with both the curved, variable position display and the top box display in the second position.

FIG. 4C illustrates the second gaming cabinet 404 after the curved, variable position display 508 moves to a new position, e.g., a portrait view, and the top box display 412 moves to a new position, e.g., a portrait view, from which the play may conduct gaming activities.

Figure 4D:
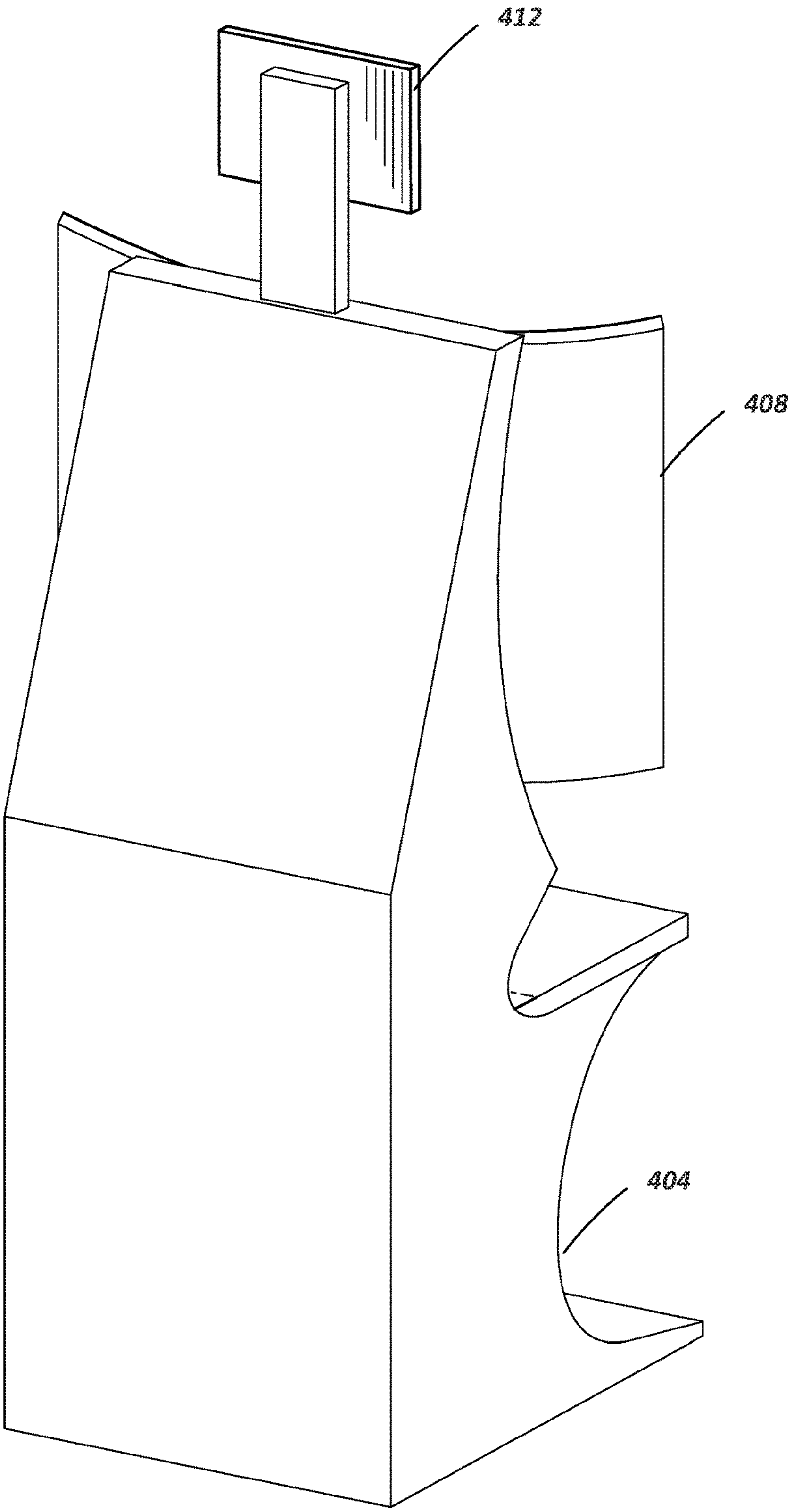
FIG. 4D illustrates a rear view of the second gaming cabinet of FIG. 4A.
Figure 4E:
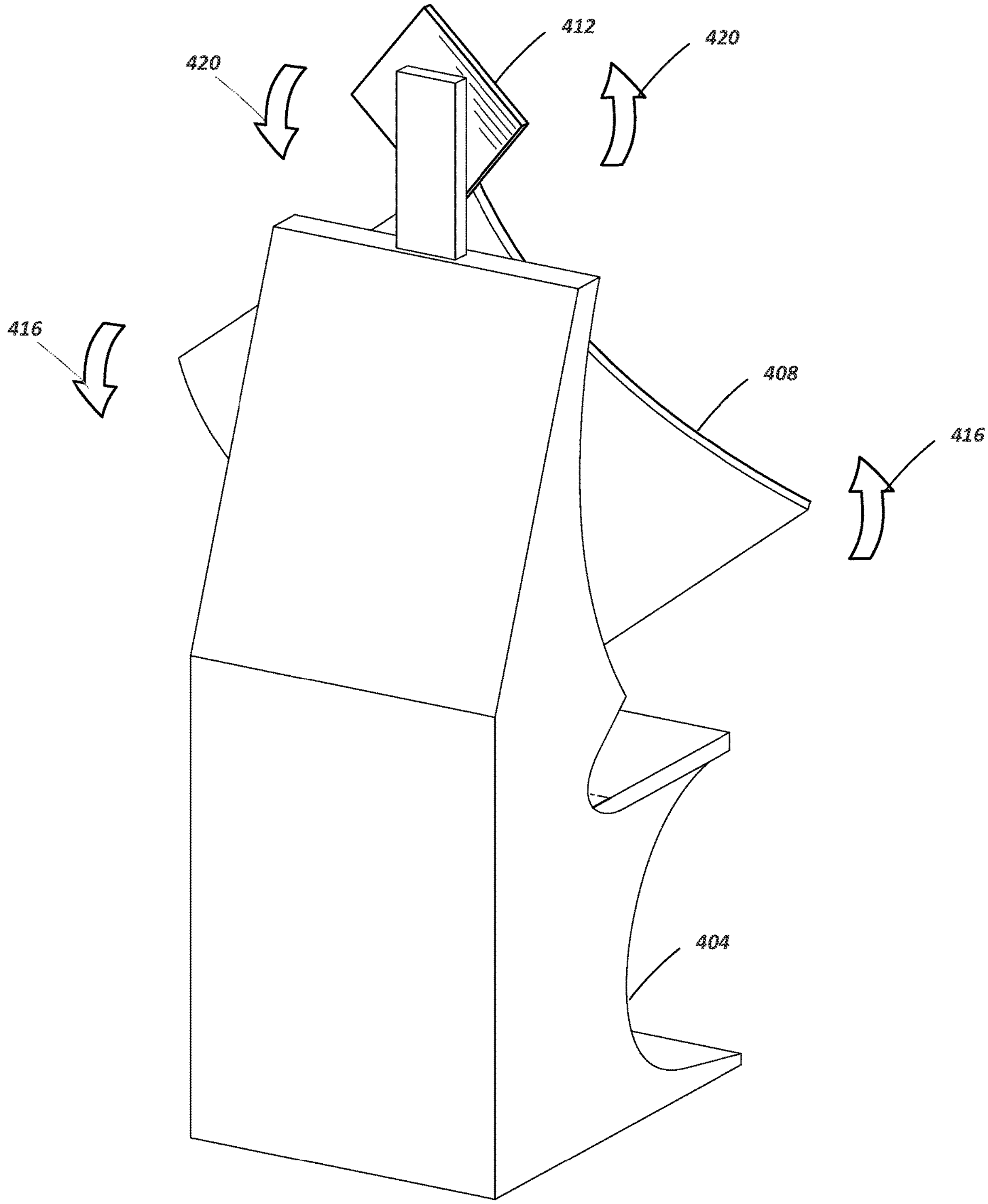
FIG. 4E illustrates a rear view of the second gaming cabinet during the second movement process of FIG. 4B.
Figure 4F:
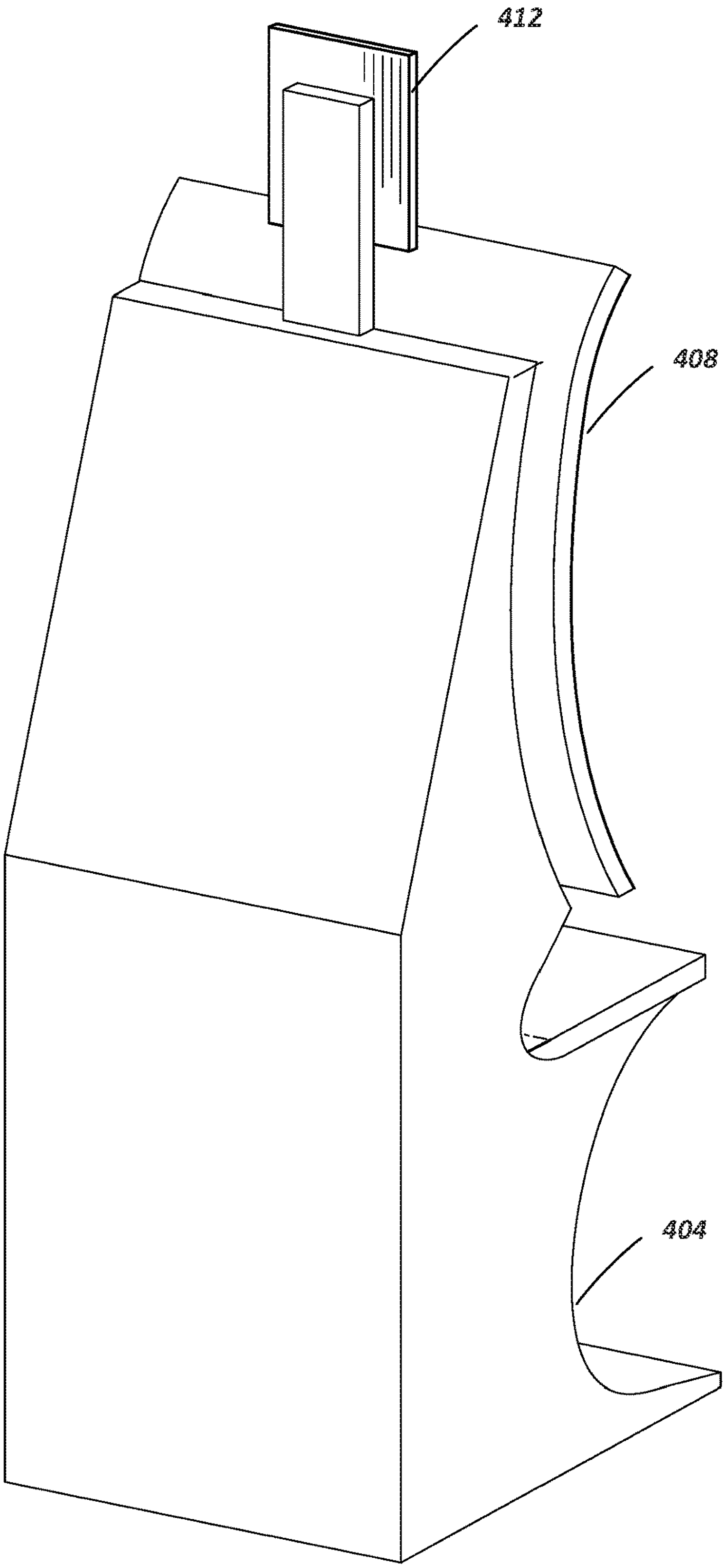
FIG. 4F illustrates a rear view of the second gaming cabinet after the second movement process of FIG. 4B with both the curved, variable position display and the top box display in the second position.

FIG. 4D illustrates a rear view of the second gaming cabinet 404 of FIG. 4A, prior to movement and orientation of the curved, variable position display 408 and the top box display 412. FIG. 4E illustrates a rear view of the second gaming cabinet 404 during movement of the first variable position display 408 with little or no interference with second gaming cabinet 404 (e.g., here, clockwise from a player's or user's viewpoint when looking at the screen for game play, as depicted by arrows 416). FIG. 4F illustrates a rear view of the second gaming cabinet 404 after movement of the curved, variable position display 408 illustrated from the starting position in FIG. 4A to an intermediate position in FIG. 4B to a final position in FIG. 4C to the portrait view with little or no interference with the second gaming cabinet 404.

Figure 5A:
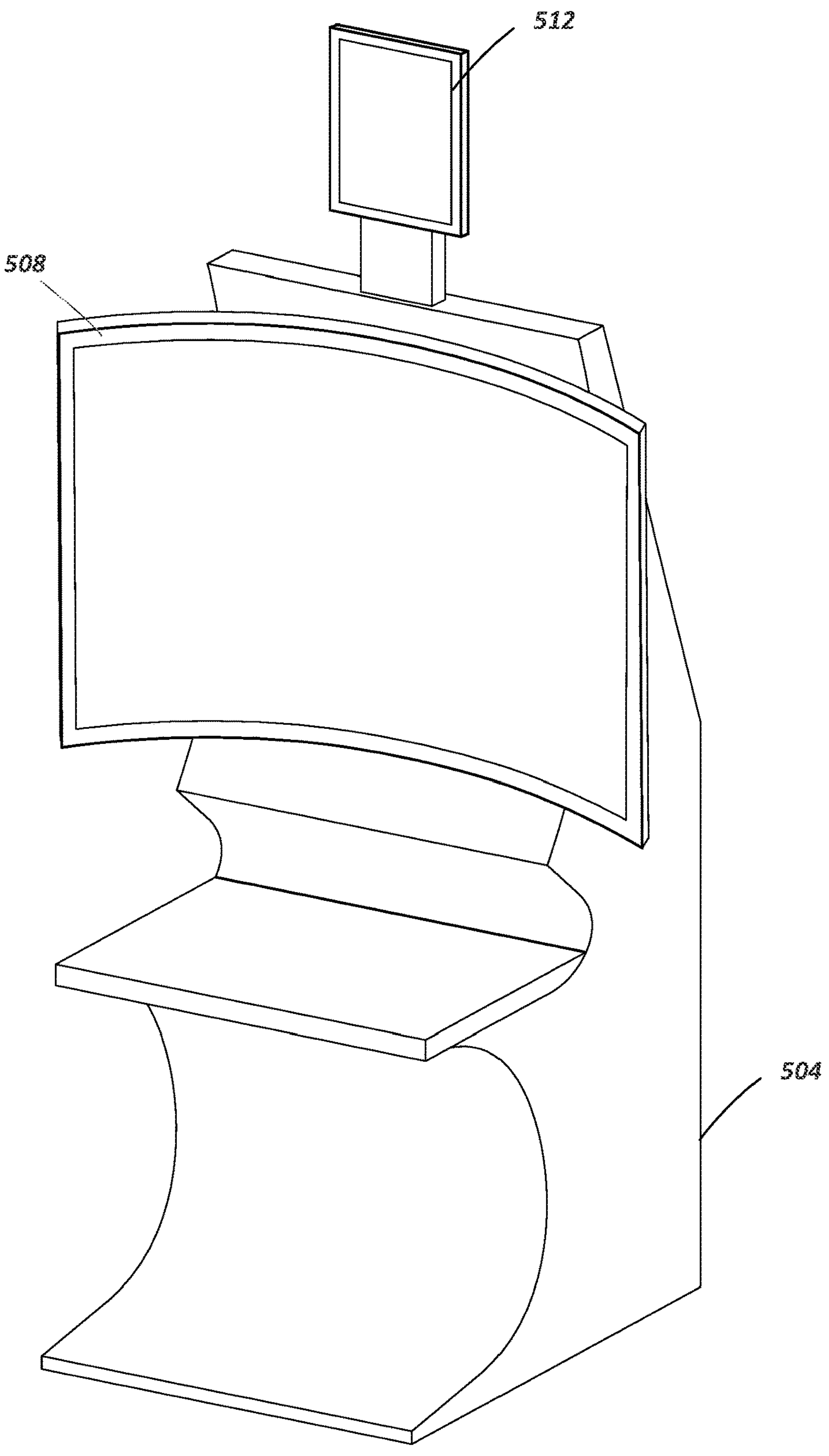
FIG. 5A illustrates an aspect of a third cabinet having a third curved, variable position display in a first position and a top box display in a first position different from the first position of third curved, variable position display.

FIG. 5A illustrates an aspect of a third gaming cabinet 504 having a curved, variable position display 508 in a landscape view and a top box display 512 in a portrait view. As shown, the curved, variable position display 508 and the top box display 512 are oriented differently. The third gaming cabinet 504 may be similar to gaming device 104B of FIG. 1, with the exception of the apparent respective depiction of gaming devices 104A-104C as fixed position displays. The curved, variable position display 508 is coupled to the third gaming cabinet 504 by a display mount structure 550 (not fully viewable in FIGS. 5A-5F) that is arranged to move, in response to detection of one or more gaming conditions, the curved, variable position display 508 via one or more of translation, rotation, tilting, panning or some combination of translation, rotation, tilting and panning, in relation to the third gaming cabinet 504 and the top box display 512.

One illustration of the display mount structure 550 is depicted as display mount structure 850 in the FIG. 8. Other configurations of the display mount structure 850 are contemplated as long as the movement of the variable position display 508 can be carried out relative to the first game cabinet 504 as contemplated herein. The movement and orientation of the first variable position display 508 may be manual, automatic or in some combination of manual or automatic. For example, the first variable position display 508 may move, in response to detection of one or more gaming conditions, manually by the player, e.g., for player game preferences or game parameters, or automatically, e.g., in response to player game preferences or game parameters.

The top box display 512 may be a fixed display, while the curved, variable position display 508 moves and may be oriented with respect to the third gaming cabinet 504. The top box display 512 may be coupled to the third gaming cabinet 504 by a topper display mount structure 560 (not fully viewable in FIGS. 5A-5F) that is arranged to move and orient the top box display 512 via one or more of translation, rotation, tilting, panning or some combination of translation, rotation, tilting and panning, in relation to the third gaming cabinet 504 or the top box display 512. One illustration of the topper display mount structure 560 for the top box display 512 is depicted in the FIG. 8 as the topper display mount structure 860 for top box display 812. The movement and orientation of the top box display 512 may be manual, automatic or in some combination of manual or automatic.

In some aspects, when the curved, variable position display 508 and the top box display 512 are both arranged to translate, rotate, tilt, pan or some combinations of translation, rotation, tilting and panning. The movement and/or orientation may stop anywhere in the range of motion permitted by the display mount structure 550 or topper display mount structure 560. The movement of the curved, variable position display 508 may be manual, automatic or in some combination of manual or automatic. For example, the curved, variable position display 508 may move, in response to detection of one or more gaming conditions, manually by the player, e.g., for player game preferences or game parameters, or automatically, e.g., in response to player game preferences or game parameters.

Like the second gaming cabinet 404 of FIG. 4A, an asynchronous movement process may include some combination of translation, rotation, tilting and panning, the curved, variable position display 508 and the top box display 512 differently with respect to either the third gaming cabinet 504, or with each other. For example, an asynchronous movement process may translate, rotate, tilt and pan the curved, variable position display 508 and the top box display 512 in different directions, at different rates or both. For another example, an asynchronous movement process may translate, rotate, tilt and pan the curved, variable position display 508 and the top box display 512 in the same direction, but the curved, variable position display 508 may be rotated before the top box display 512 is rotated. For another example, an asynchronous movement process may translate and rotate the curved, variable position display 508 and the top box display 512 in the same directions but at a different rate of rotation.

Conversely, the synchronous movement process may include translating, rotating, tilting and panning the curved, variable position display 508 and the top box display 512 synchronously. For example, a synchronous movement process may move the curved, variable position display 508 and the top box display 512 in the same direction. For another example, a synchronous movement process may rotate the curved, variable position display 508 and the top box display 512 in the same direction and at the same time.

Figure 5B:
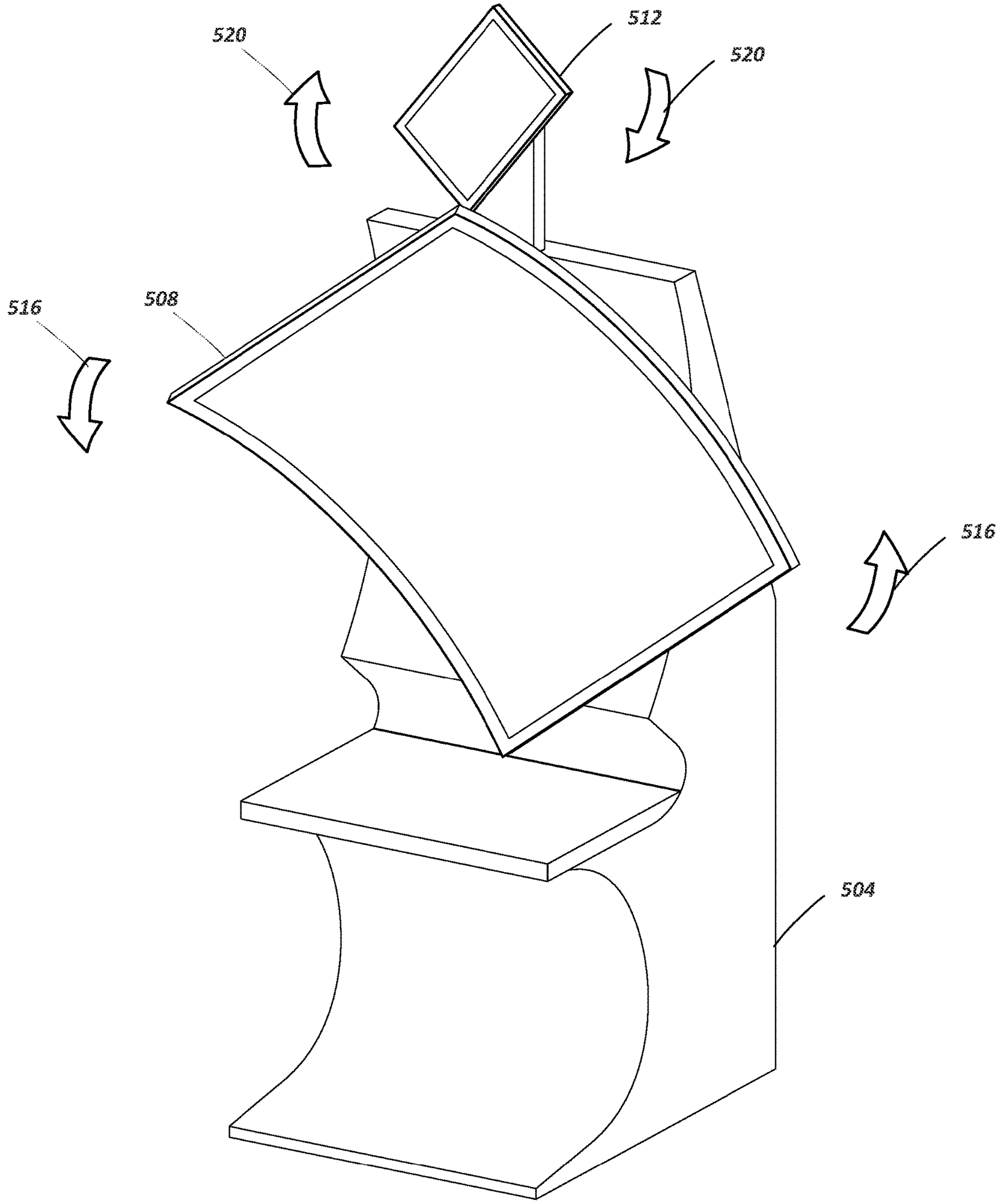
FIG. 5B illustrates the third gaming cabinet of FIG. 5A during a third movement process.

FIG. 5B illustrates the third gaming cabinet 504 of FIG. 5A during the movement and orientation of the curved, variable position display 508 and the top box display 51. In this aspect, the curved, variable position display 508 moves counterclockwise, shown by arrows 516. The top box display 512 moves clockwise, shown by arrows 520, with respect to the third gaming cabinet 504. This movement is directionally asynchronous and moves the curved, variable position display 508 and the top box display 512 in different directions with little or no interference of the third gaming cabinet 504. For example, a display mount structure 550, for example, may also translate the curved, variable position display 508 away from the third gaming cabinet 504 in such a way to provide clearance, if needed, for movements of the curved, variable position display 508 in relation to the third gaming cabinet 504 and top box display 512.

Figure 5C:
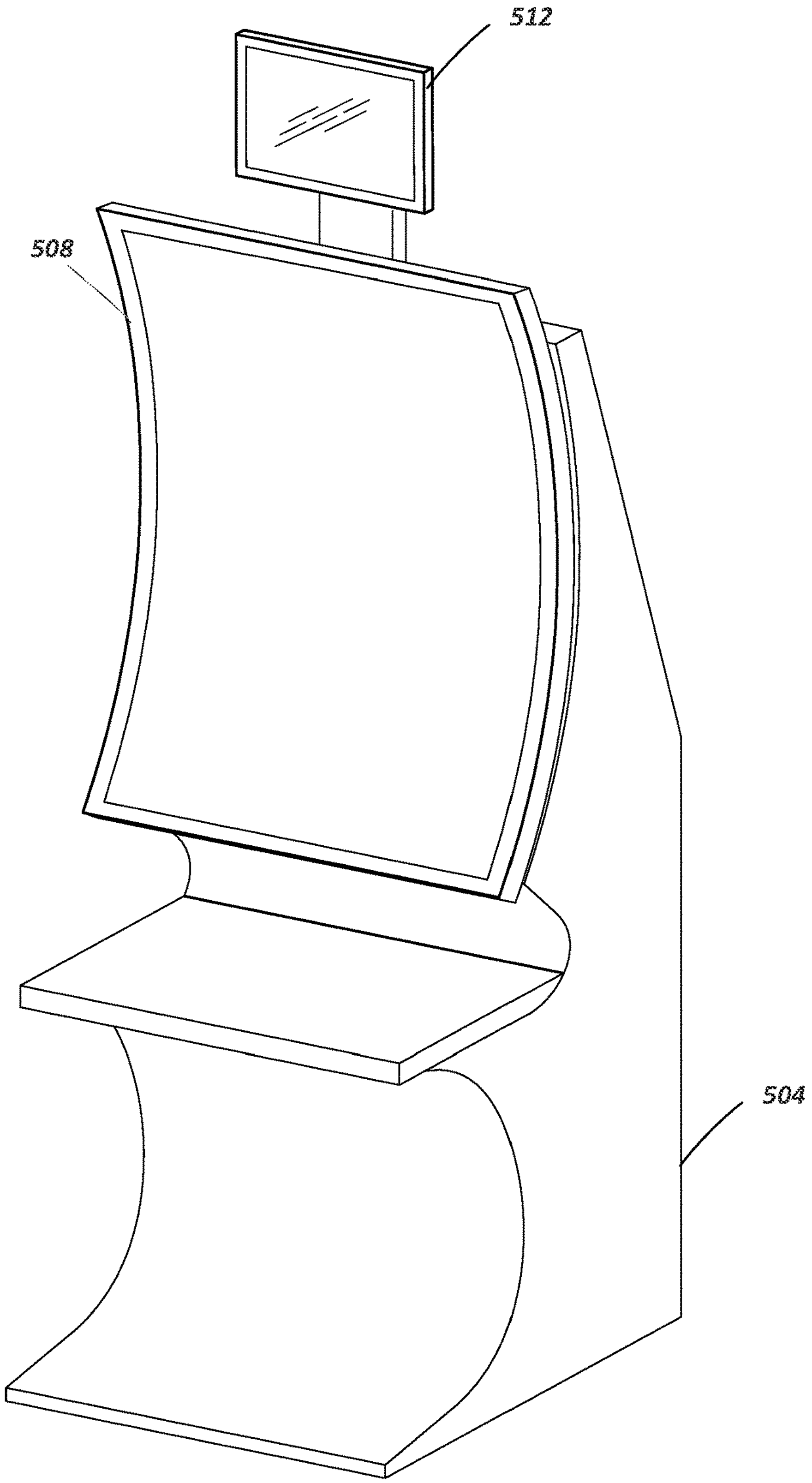
FIG. 5C illustrates the third gaming cabinet after the third movement process of FIG. 5B with the curved, variable position display in a second position and the top box display in a second position different from the second position of the third curved, variable position display.
Figure 5D:
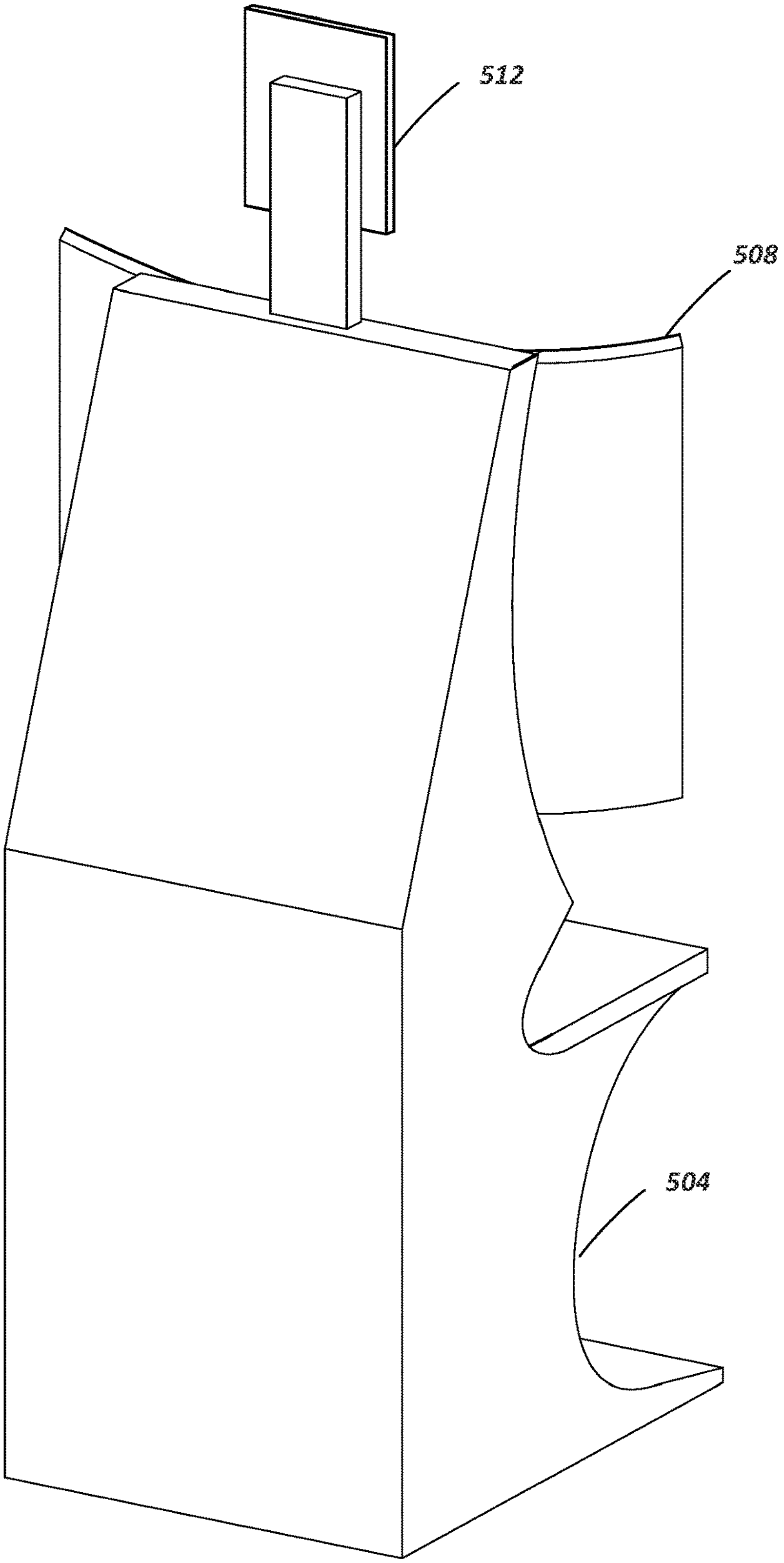
FIG. 5D illustrates a rear view of the third gaming cabinet of FIG. 5A.
Figure 5E:
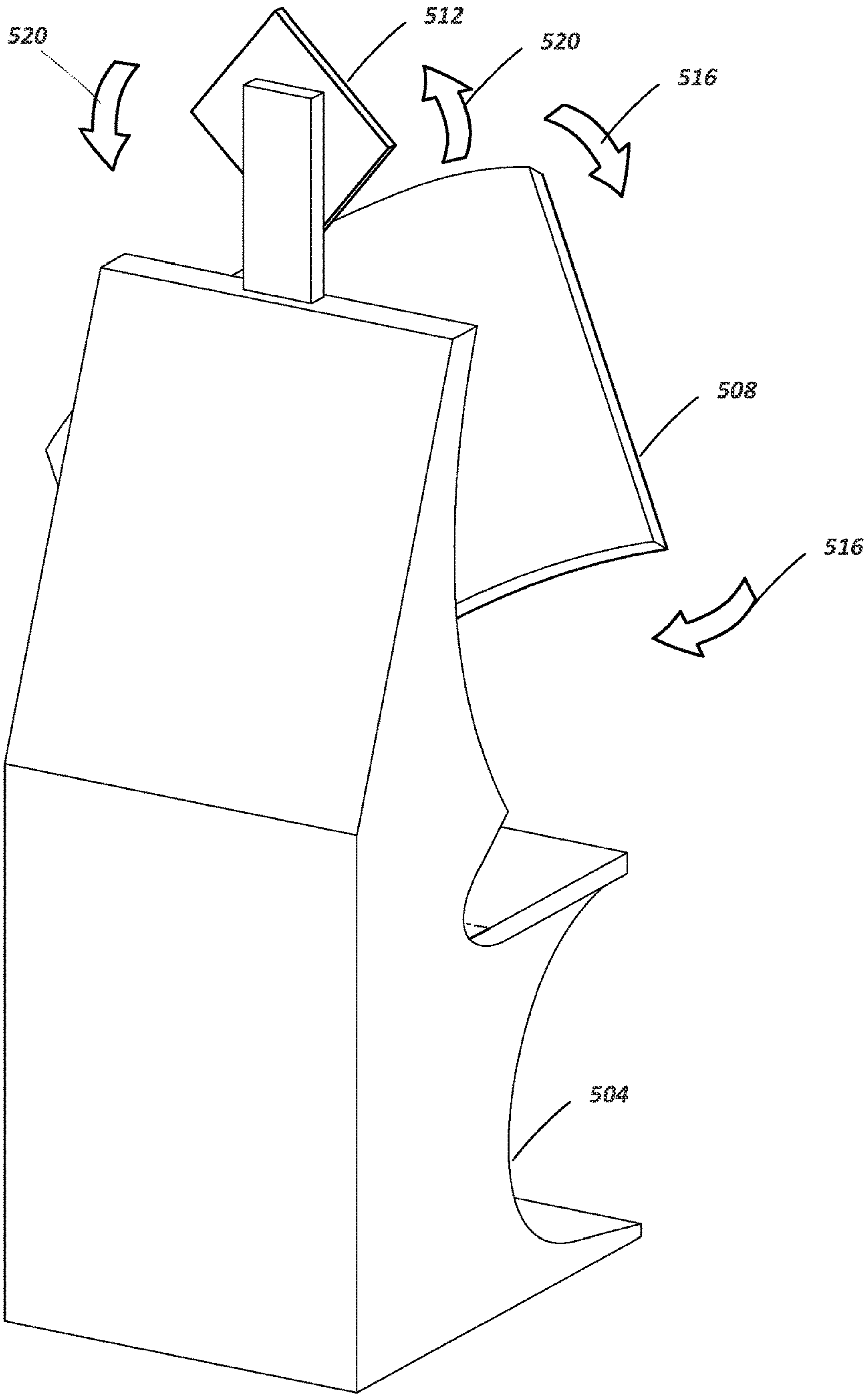
FIG. 5E illustrates a rear view of the third gaming cabinet during the third movement process of FIG. 5B.
Figure 5F:
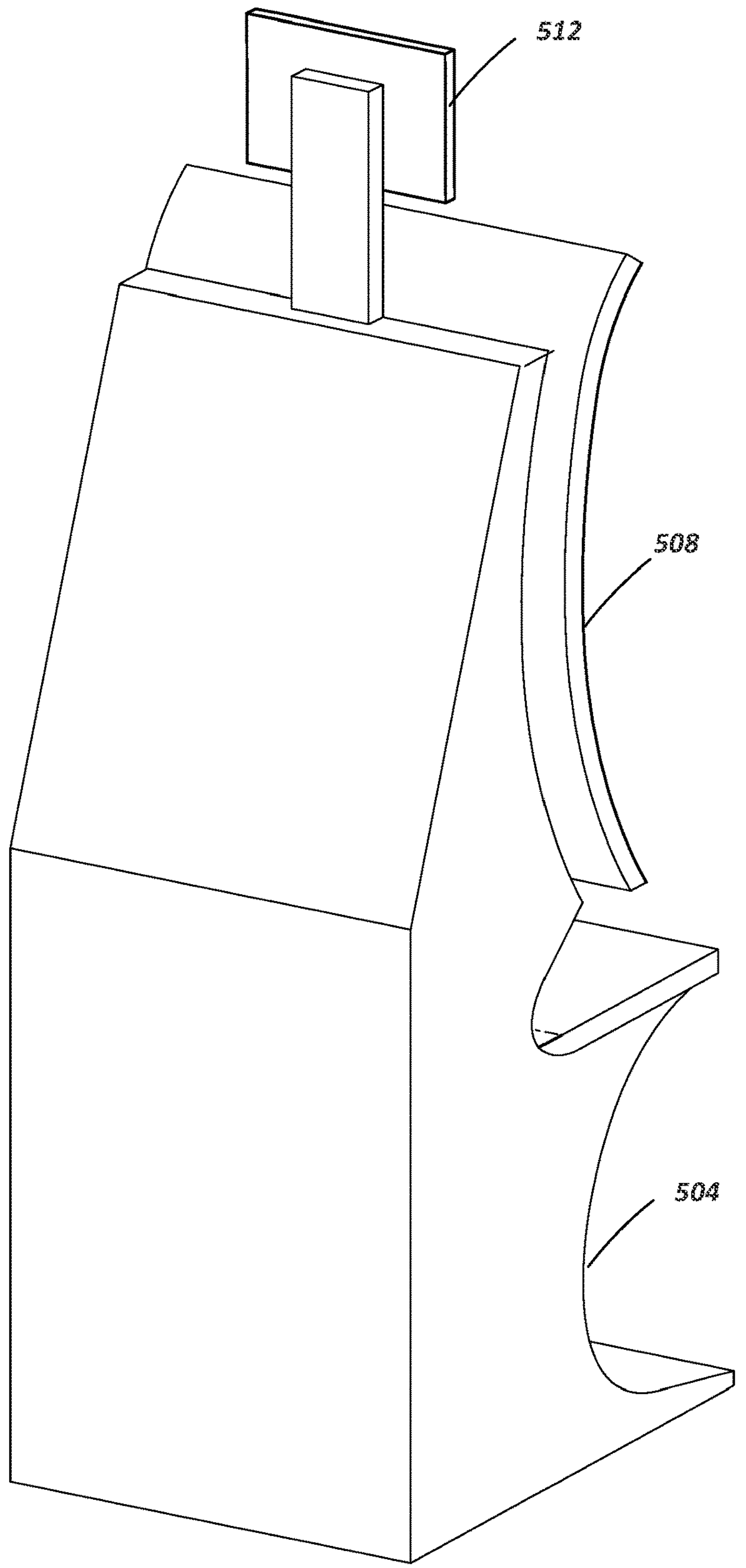
FIG. 5F illustrates a rear view of the third gaming cabinet after the third movement process of FIG. 5B with the curved, variable position display in a second position and the top box display in a second position different from the second position of the third curved, variable position display.

FIG. 5C illustrates the third gaming cabinet 504 after the curved, variable position display 508 moves and orients to a new position, e.g., a portrait view, and the top box display 512 moves and orients to a new position, e.g., a landscape view, from which the play may conduct gaming activities. FIG. 5D illustrates a rear view of the third gaming cabinet 504 of FIG. 5A, prior to movement and orientation of the curved, variable position display 508 and the top box display 512. FIG. 5E illustrates a rear view of the third gaming cabinet 504 during movement of the curved, variable position display 508 without third cabinet interference, e.g., showing a counterclockwise rotation (depicted by arrows 516) of the curved, variable position display 508 in of FIG. 5B. FIG. 5E illustrates a rear view of the third gaming cabinet 504 during movement of the top box display 512, showing a clockwise rotation (depicted by arrows 520) of the curved, variable position display 508 in of FIG. 5B. FIG. 5F after movement and orientation of the curved, variable position display 508 and the top box display 512. The curved, variable position display 508 is illustrated as moving and orienting from the starting position in FIG. 5A to an intermediate position in FIG. 5B to a final position in FIG. 5C to the portrait view without interfering with the third gaming cabinet 504. In a similar way, the top box display 512 is illustrated as moving and orienting from the starting position in FIG. 5A to an intermediate position in FIG. 5B to a final position in FIG. 5C to the landscape position, without interfering with the third gaming cabinet 504 or the curved, variable position display 508.

Figure 6A:
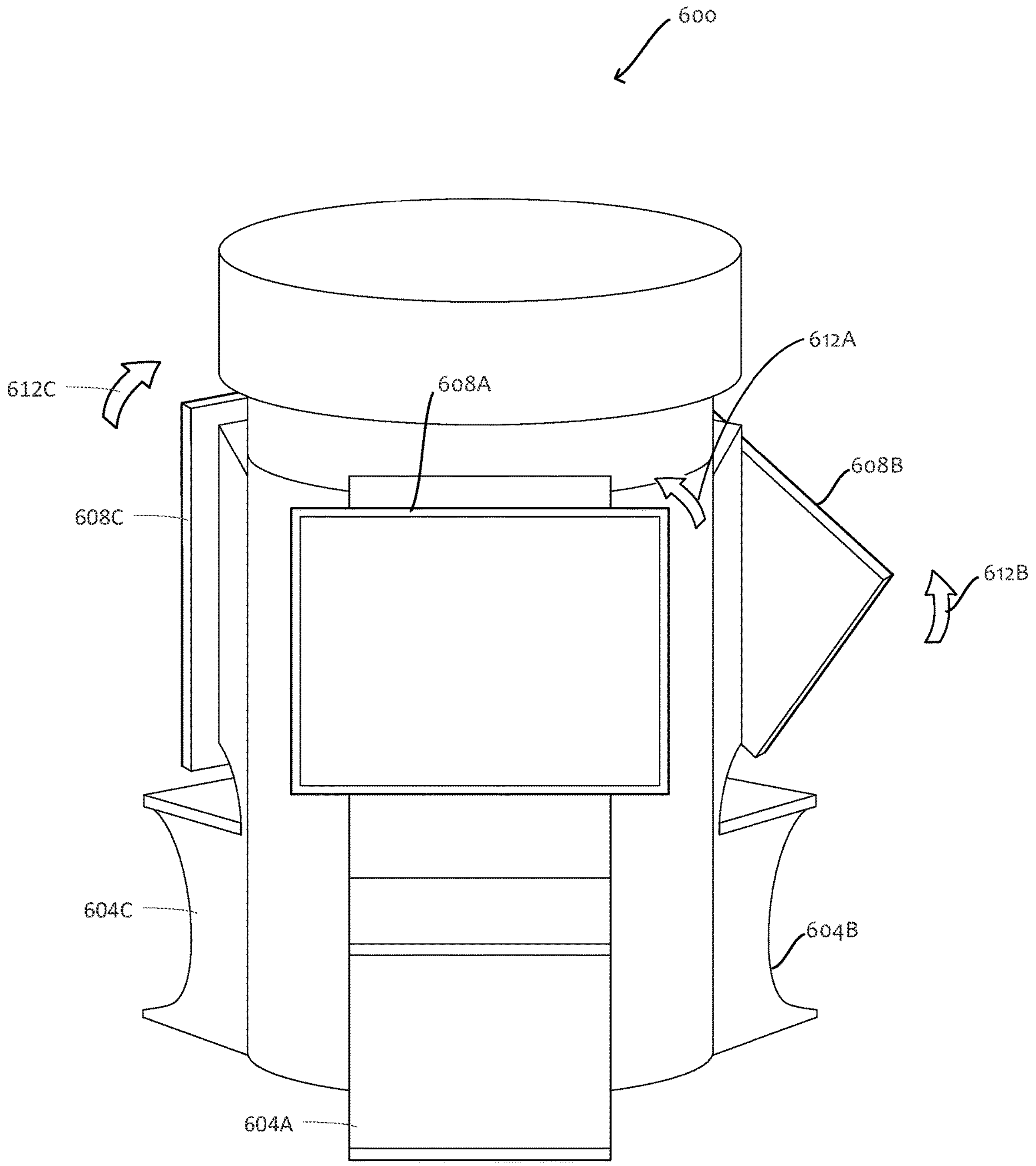
FIG. 6A illustrates a first bank of gaming cabinets having a plurality of gaming cabinets engaging in a fourth movement process.

FIG. 6A illustrates a first view of a first cluster or first bank 600 of gaming cabinets 604A-C, engaging in a movement and orientation process. As shown, the gaming cabinets 604A-C have variable position displays 608A-C, respectively. Variable position displays 608A-C are coupled to gaming cabinets 604A-C, respectively, by display mount structures 650A-C (not fully viewable in FIGS. 6A-6F) that are arranged to move and orient each of the variable position displays 608A-C via one or more of translation, rotation, tilting, panning or some combination of translation, rotation, tilting and panning, in relation to the gaming cabinets 604A-C, respectively.

One illustration of the display mount structures 650A-C is depicted as display mount structure 850 in the FIG. 8. The movement of the variable position displays 608A-C may be manual, automatic or in some combination of manual or automatic. For example, the variable position displays 608A-C may move or be oriented manually by the player for player game preferences or game parameters, or automatically in response to player game preferences or game parameters.

Also, as illustrated in FIG. 6A, the movement and orientation process, like other aspects that have been described above, may be an asynchronous process, in response to detection of one or more gaming conditions, that may include some combination of translation, rotation, tilting, panning, and rate of movement of the variable position displays 608A-C differently with respect to gaming cabinets 604A-C, or with each other. As another example, in response to detection of one or more gaming conditions, asynchronous movement process may translate, rotate, tilt and pan the variable position displays 608A-C in different directions. For another example, an asynchronous process may translate, rotate, tilt and pan the variable position displays 608A-C in the same direction, but the variable position displays 608A-C may be moved at different rates from one another. Conversely, in response to detection of one or more gaming conditions, a synchronous process may include translating, rotating, tilting and panning of the variable position displays 608A-C in the same direction or at the same rate. Like other aspects described, the gaming cabinets 604A-C may incorporate one or more topper box displays (not illustrated in FIG. 6A).

By way of a further example, during movement and with little or no interference with the gaming cabinets 604A-C, the variable position display 608A may translate away from the gaming cabinets 604A-C, and rotate counterclockwise (as indicated by arrow 612A) at a first rate from a landscape view into a portrait view, while the variable position display 608B may rotate clockwise (as indicated by arrow 612B) at a second rate with respect to the fifth gaming cabinet 604B and the variable position display 608C may rotate counterclockwise (as indicated by arrow 612C) at a third rate from a portrait view into a landscape mode. Of course, movement, orientation and rates of movement, can be the same, different or be variable.

In other aspects, the movement and rates of movement of variable position displays 608A-C may also be initiated when a triggering event in a game. For example, a triggering event may include an appearance of a special symbol during play on one or more variable position displays 608A-C. Other triggering events may include a win on one or more variable position displays 608A-C. Still other triggering events may include arrival of patron to the game (as sensed and communicated from a device (like a mobile device) possessed by the patron), time of day when the first bank 600 is played, an amount of wager placed at the first bank 600, a number of games played at the first bank 600, and the like. Movements, rates of movement or triggering events may add or eliminate players from a round of play. Movements, rates of movement or triggering events may change during game play.

Figure 6B:
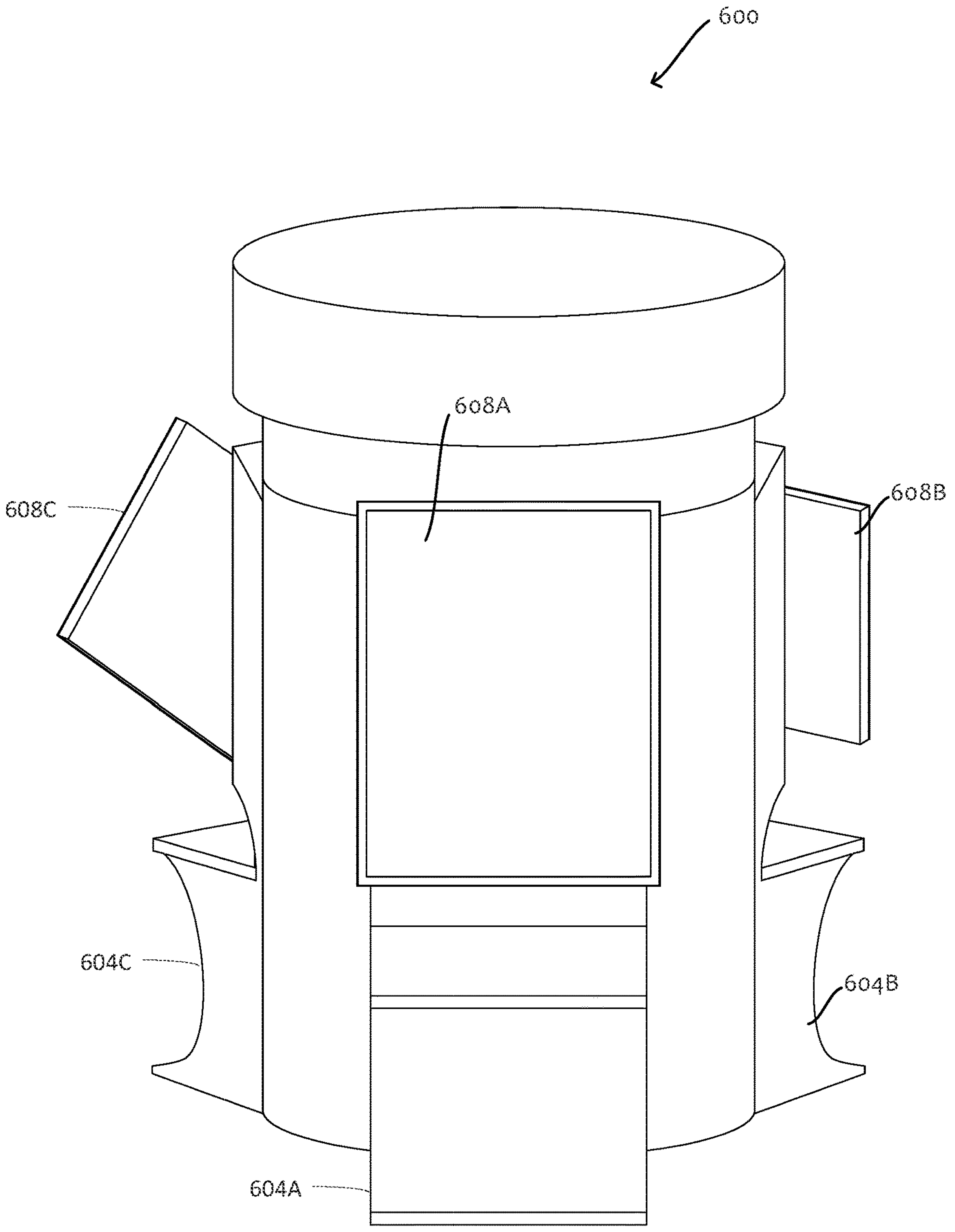
FIG. 6B illustrates the first bank of gaming cabinets continuing to engage in the fourth movement process of FIG. 6A.

FIG. 6B illustrates a second view of the first bank 600 of the gaming cabinets 604A-C continuing to engage in the movement process of FIG. 6A. As shown, the variable position displays 608A-C are depicted as in a portrait mode, in a landscape mode, and rotating counterclockwise from the portrait view, respectively, with respect to the gaming cabinets 604A-C.

Figure 6C:
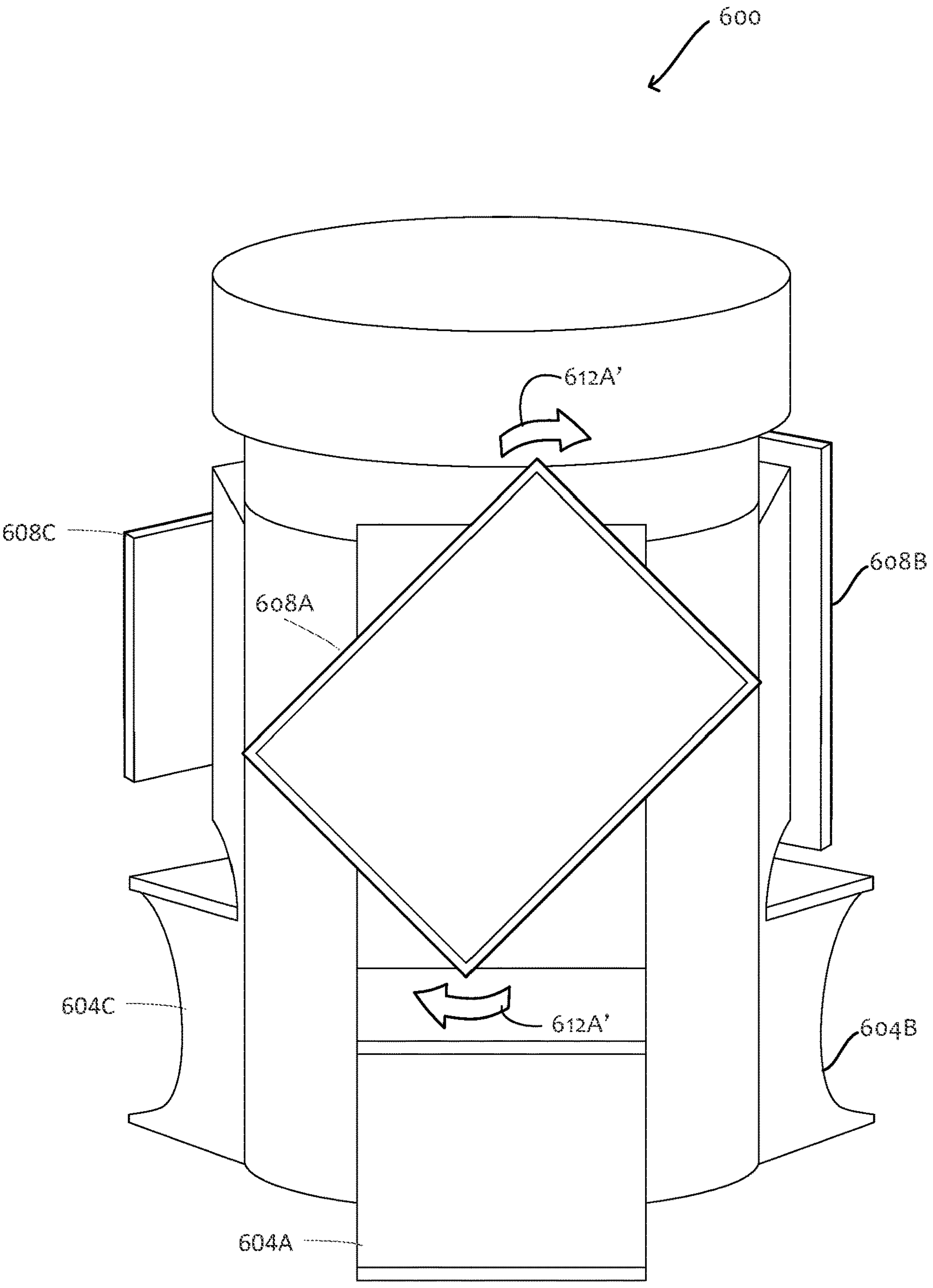
FIG. 6C illustrates the first bank of gaming cabinets continuing to engage in the fourth movement process of FIG. 6B.

FIG. 6C illustrates a third view of the first bank 600 of the gaming cabinets 604A-C continuing to engage in the movement process of FIG. 6B after a second triggering event. After the second triggering event occurs, the variable position display 608A rotates again (as indicated by arrows 612) but in the opposite direction as it originally did in FIG. 6A (indicated by arrow 612A in FIG. 6A), the variable position display 608B is shown as oriented at the time illustrated in a portrait view, and the variable position display 608C is shown as oriented at the snapshot in time illustrated in a landscape view.

Figure 6D:
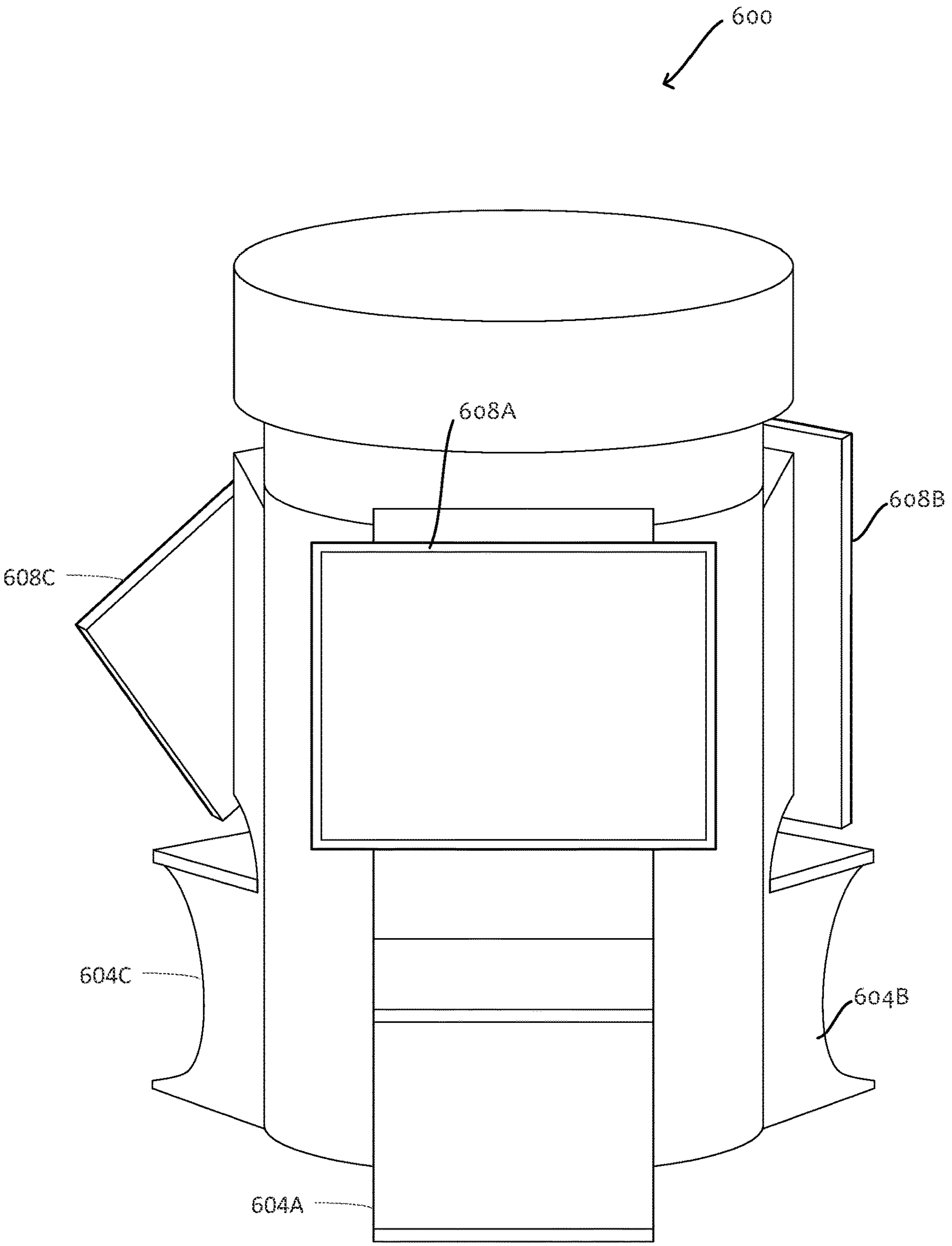
FIG. 6D illustrates the first bank of gaming cabinets after the fourth movement process of FIG. 6C.

FIG. 6D illustrates a fourth view of the first bank 600 of the gaming cabinets 604A-C continuing the movement process of FIG. 6C. As shown, the variable position display 608A is shown as oriented at the snapshot in time illustrated in the landscape view, the variable position display 608B is shown as oriented at the snapshot in time illustrated in the portrait view, and the variable position display 608C starting to rotate with respect to the gaming cabinet 604C.

Figure 6E:
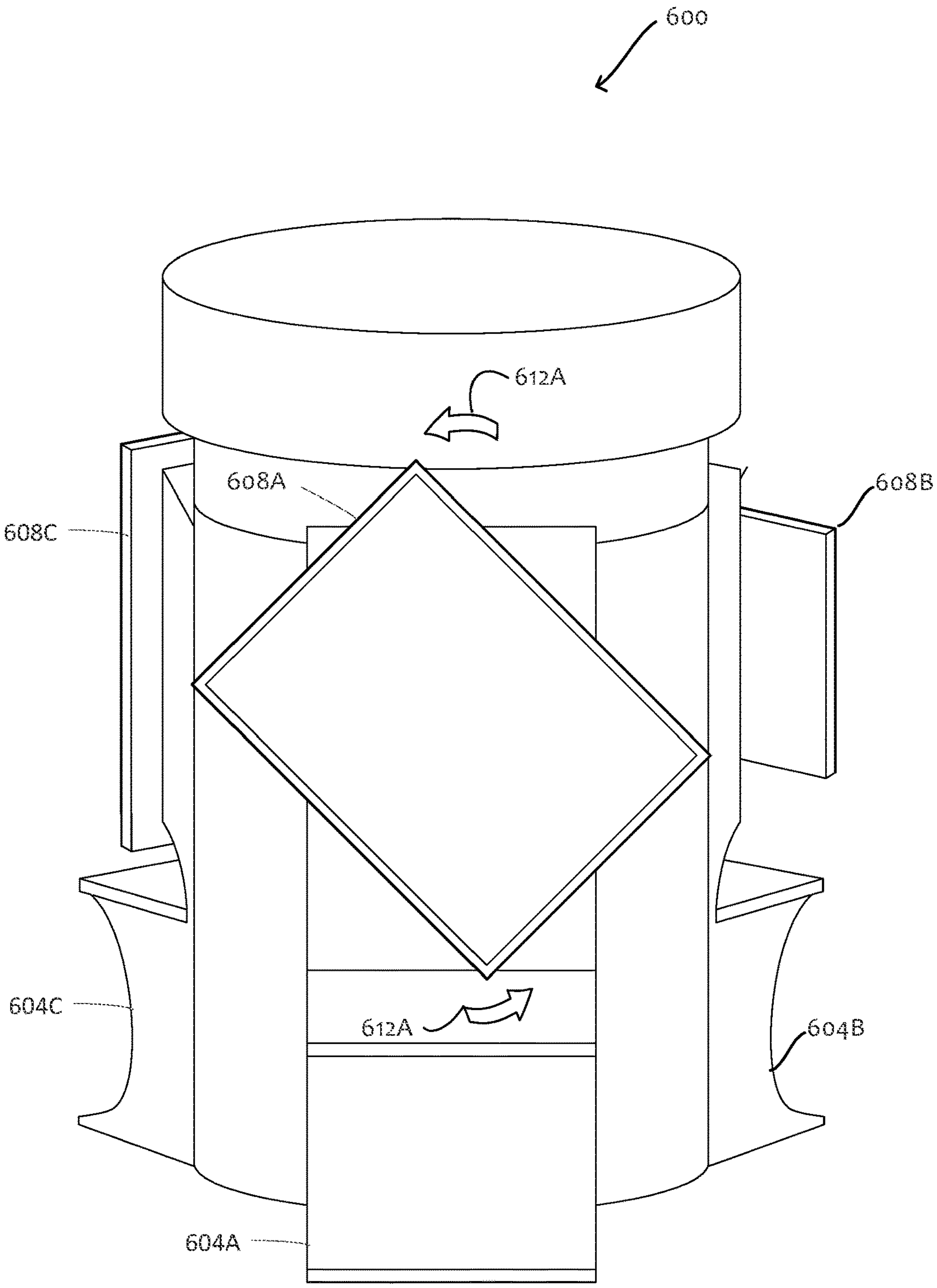
FIG. 6E illustrates the first bank of gaming cabinets engaging in the fourth movement process of FIG. 6D.
Figure 6F:
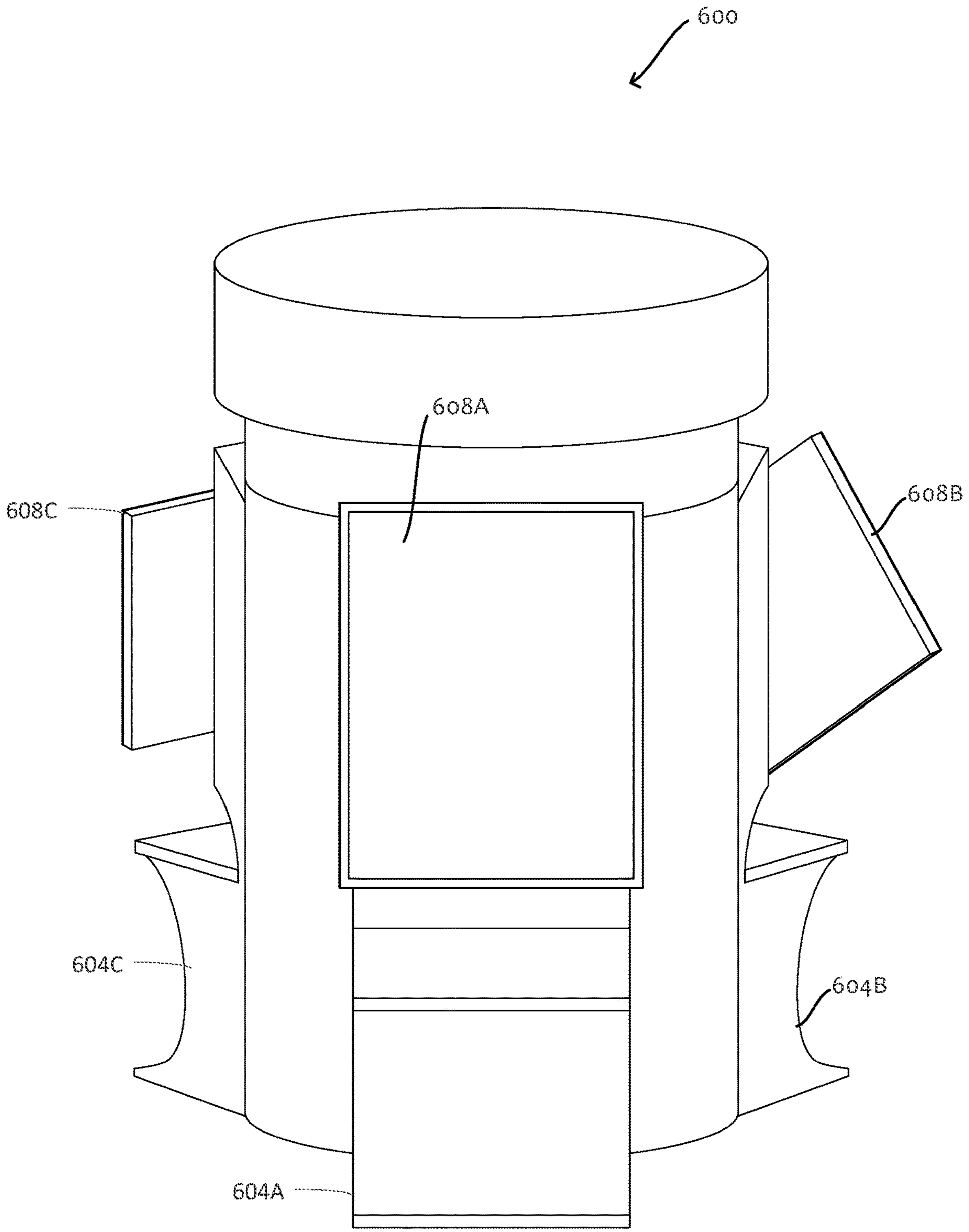
FIG. 6F illustrates the first bank of gaming cabinets after the fourth movement process of FIG. 6E.

FIG. 6E illustrates a fifth view of the first bank 600 of the gaming cabinets 604A-C continuing to engage in the movement process of FIG. 6D. However, the variable position display 608A reverses movement to rotate counterclockwise with respect to and with little or no interference with the fourth gaming cabinet 604A. FIG. 6F illustrates a sixth view of the first bank 600 of the gaming cabinets 604-C continuing to engage in a further movement process of FIG. 6E. In some aspects, the variable position displays 608A-C move in a sequence (e.g., in unison, or one after another) that appears to cartwheel spin the variable position displays 608A-C before, during or after the play of a game. The various views in FIGS. 6A-E may have varying gaming conditions that lead to the movements, rates of movements and triggers that may engage player differently.

Figure 7:
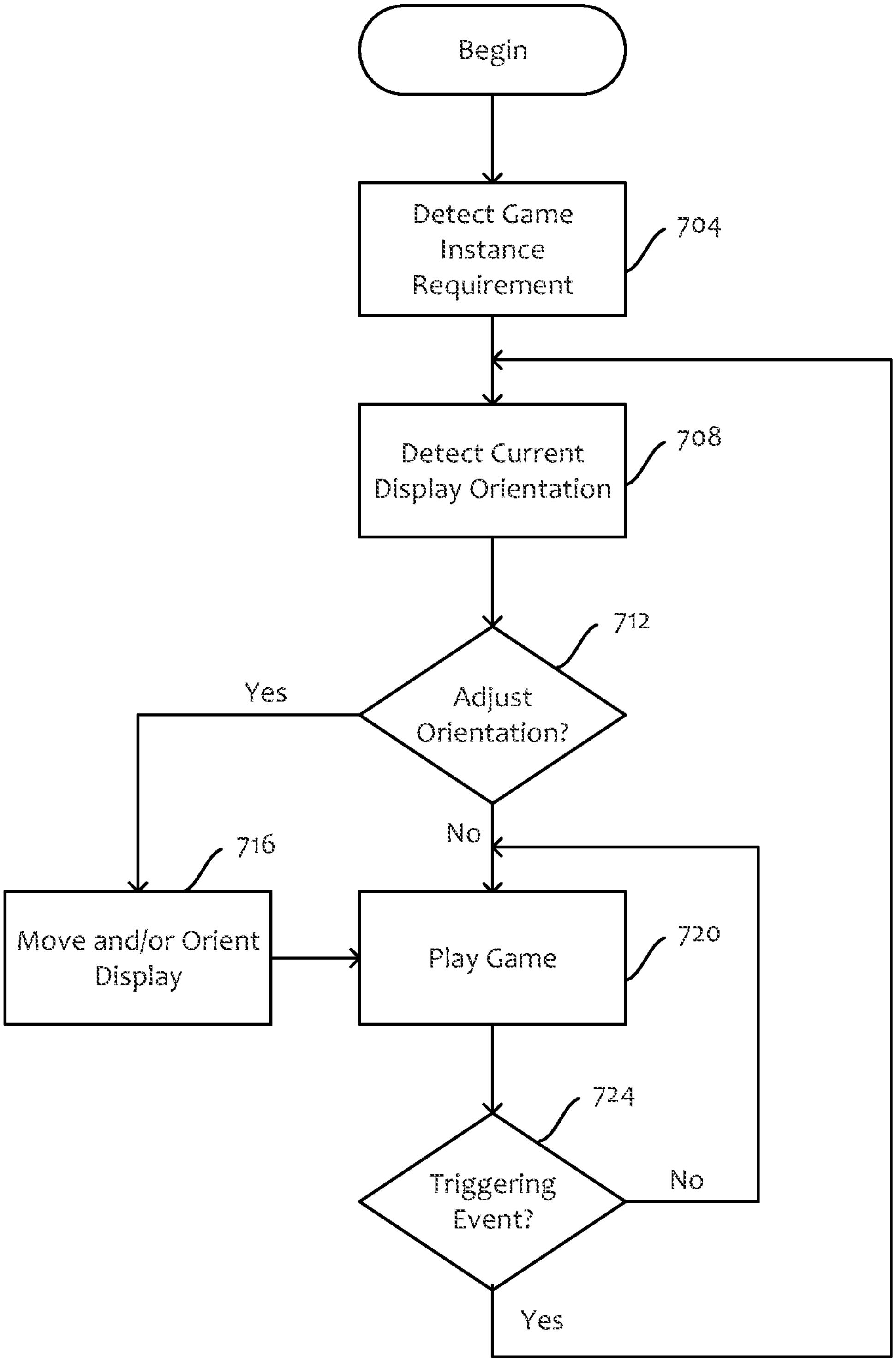
FIG. 7 illustrates a flowchart of an aspect of a movement process for transforming a gaming cabinet having a variable position display.

FIG. 7 illustrates a flowchart of an aspect of a movement process 700 during game play for transforming a gaming cabinet similar to gaming device 104B of FIG. 1 having a variable position display similar to the movement of the first variable position display 308 of FIG. 3A. At step 704, the movement process 700 determines or detects the game instance requirements, which may include an initial orientation of the variable position display for a game to be played on the gaming cabinet. Step 704 may include sensing player behavior (e.g., physical response), player choice or game requirements, for example.

At step 708, the movement process 700 determines or detects a current orientation of the variable position display. At step 712, the movement process 700 determines if there is a match between the current orientation of the variable position display as determined in step 708, and the orientation required by the game as determined in step 704. If the movement process 700 determines at step 712 that an adjustment of the current orientation is required, the movement process 700 proceeds to step 716 to move and orient display at a designated rate. If the movement process 700 determines at step 712 that an movement and adjustment of the current orientation is not required, the movement process 700 proceeds to step 720 to play the game. Alternatively, these movements can occur simultaneous with game play.

In some other aspects, the adjustment includes displaying a message on the variable position display to prompt a player or an operator to manually rotate the variable position display. In yet other aspects, the adjustment includes displaying a message on the variable position display that an automatic rotation of the variable position display is scheduled to begin.

At optional step 724, the movement process 700 determines a triggering event occurs during the game, for example, a win or entry into a feature or bonus game play. If the movement process 700 determines that a triggering event has occurred during the game, the movement process 700 may generate one or more movement adjustment signals and proceed to step 708 to determine the current orientation of the variable position display, and repeats step 712.

FIG. 8 illustrates a embodiment of a display mount structure 850. The display mount structure 850 may take any form that is capable of one or more of translation, rotation, tilting, panning or some combination of translation, rotation, tilting and panning of the variable position display in relation to the main cabinet. One such form is an articulating arm, like FIG. 9. Another form of a display mount structure is depicted in FIG. 8.

For example, display mount structure 850 in FIG. 8 comprises a mounting track 856, nested structural units 852, and a mounting plate 854. The mounting track 856 is connected to game cabinet 804 and, in turn, directly or indirectly, to the nested structural units 852. The mounting track 856 may fix the degrees of freedom of the nested structural units 852 in relation to the game cabinet 804 so that its movement is restricted to some degree, or it may permit one or more degrees of freedom of movement, e.g., translation or rotation of the nested structure units 852 in relation to the game cabinet 804. For example, the display mount structure 850 may permit the variable position display 808 to translate vertically up and down relative to game cabinet 804, which may enable the variable position display 808 to be specially positioned for specific game enhancements or needs, or player preferences. The mounting track 856 may be mounted at different portions of the game cabinet 804. The mounting track 856 may also be configured to hold two or more variable position displays, which, in turn, may move relative to each other.

The illustrated nested structural units 852 are shown as a nested telescoping structure. The nested structural units 852 may extend and retract in relation to the game cabinet 804. The nesting structural units 852 when fully retracted may position a variable position display 808 such that the position of the variable position display 808 appears like a conventionally configured display on a gaming machine. In this variation, the movement of the nested structural units 852 may be of a telescoping shell form that follows paths of constant curvature and torsion, and the telescoping motion may also have a screw-type motion. The telescoping shell form of the nested structural units 852 may take the form of a helical shell and permit one structural to fit within (or nest) in another structural unit when retracted. The nested structural units may also twist and bend, depending on the configuration selected, relative to the game cabinet 804 and the variable position display 808. Various degrees of freedom may be permitted at various points of extension or rotation. The display mount structure 850 can extend, retract, rotate or flex in various directions (e.g., up/down, side to side, backward and forward, rotational, diagonal) in relation to the game cabinet 804.

When the top box display 812 is not fixed, topper display mount structure 860 may take a form the same as or similar to display mount structure 850. The topper display mount structure 860 in FIG. 8 comprises a mounting track 866, nested structural units 862, and a mounting plate 864. The display mount structure 860 may provide similar movement capabilities as the display mount structure 850. The topper display mount structure 860 will be configured to provide sufficient strength, using, arms, internal brackets or ribbings that may be designed to strengthen certain portions of the topper display mount structure 860, as needed. The payload capability of the topper display mount structure 860 is at least capable to handle the weight of the variable position display 808 when fully extended.

The display mount structure 850, topper display mount structure 860, variable position display 808 and the top box display 812 may be moved manually or by a motor (not shown). The topper display mount structure 860 may be monitored by position and other sensors (not shown) that may detect player behavior and response to the game (e.g., in relation to a mobile phone, wearable, or another device), other game activity or established gaming conditions, and controlled by the game controller 202 or other discrete controllers (not shown) in response game parameters or position signal information.

Figure 9:
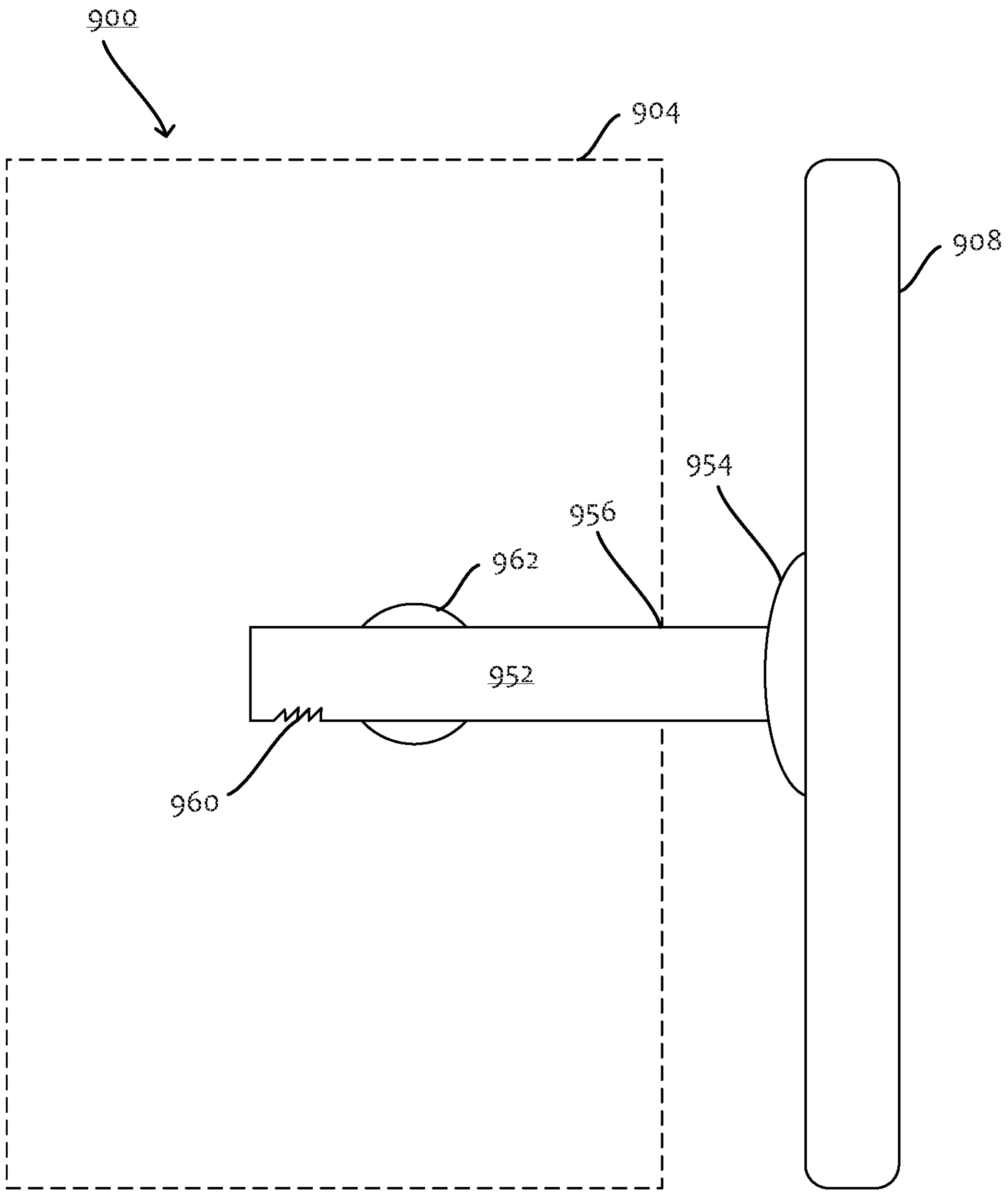
FIG. 9 illustrates another aspect of a display mount structure of a gaming cabinet having a variable position display.

FIG. 9 illustrates another aspect of a telescoping interface 900 of a seventh gaming cabinet 904 having a variable position display 908. In some aspects, the seventh gaming cabinet 904 is similar to the first gaming cabinet 304 of FIG. 3A, and the variable position display 908 is similar to the first variable position display 308 of FIG. 3A. The variable position display 908 is coupled to a mounting device 954 which is also fastened to a shaft 952 that is capable of extending, retracting, or rotating, or some combination thereof, in relation to the seventh gaming cabinet 904. The shaft 952 is generally inserted into seventh gaming cabinet 904 via a receptacle 956, and may, for example, be secured to the seventh gaming cabinet 904 via a series of retractable pins 962 and a series of securing gears 960.

In some aspects, the mounting device 954 may be manually operated to retract the series of retractable pins 962 such that the variable position display 908 may be moved in various ways. In other aspects, the series of retractable pins 962 may be automatically retracted when, for example, the movement process 700 determines that a one or more gaming conditions has occurred as determined in optional step 724. Although not shown, the telescoping interface 900 may also include a motor, e.g., a stepper motor, that is configured to extend, retract, or rotate, or some combination thereof, the shaft 952 and, in turn, the variable position display 908 when the series of retractable pins 962 have been retracted.

Figure 10A:
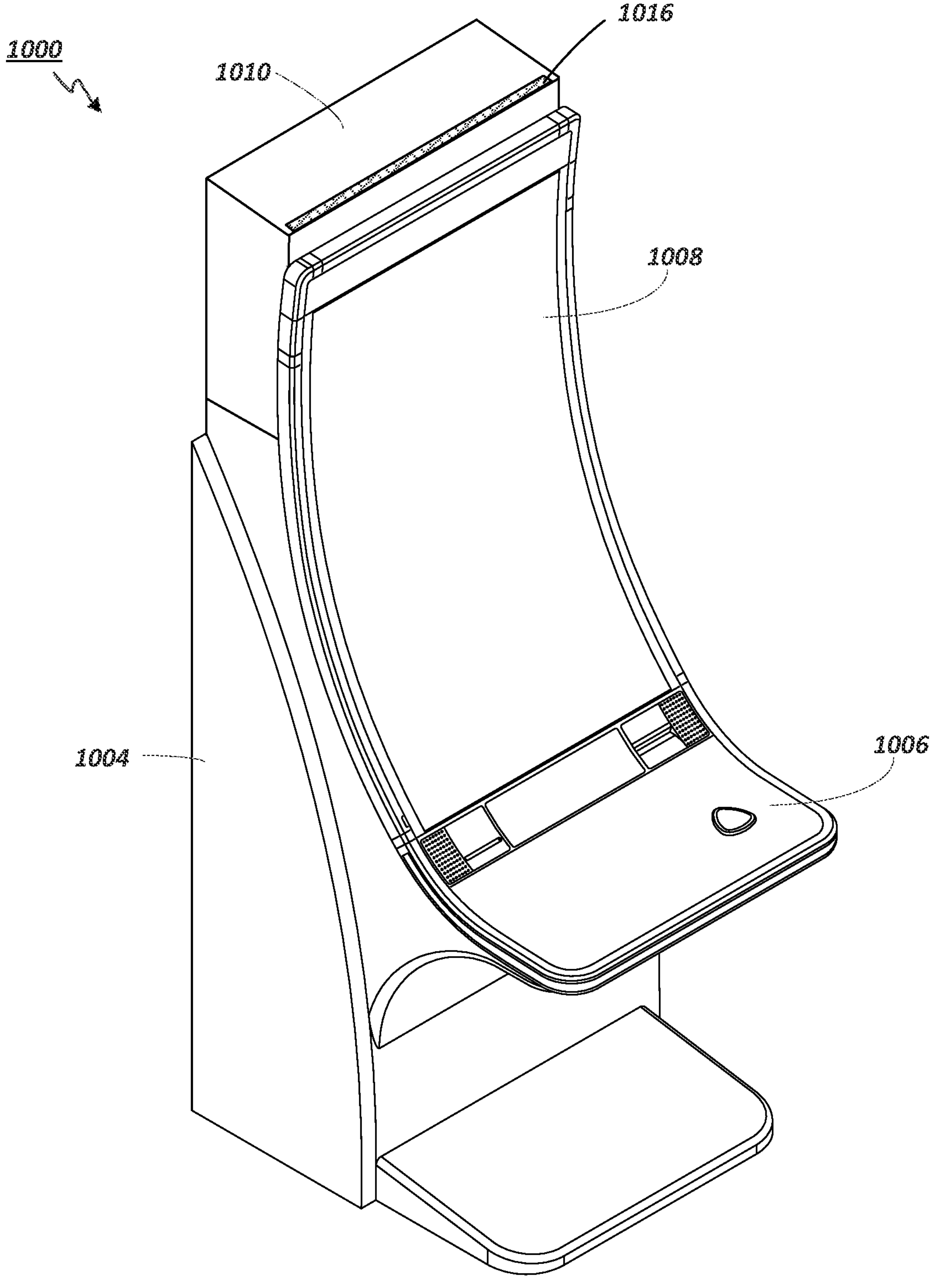
FIG. 10A illustrates a fourth gaming cabinet having an extendable screen housing.

FIG. 10A illustrates an aspect of a gaming machine 1000 (similar to gaming machine 104X of FIG. 1). The gaming machine 1000 comprises a fourth gaming cabinet 1004 (similar to main cabinet 116 of FIG. 1), which includes a button deck 1006 (similar to button deck 120 as shown in FIG. 1), a main display 1008 (similar to main display 128 of FIG. 1 or to variable position display 308 of FIG. 3), and an extendable screen housing 1010.

This embodiment can be employed with or without the variable position display. In an aspect, the extendable screen housing 1010 includes a top opening 1016 through which an extendable screen may at least protrude, project, extend or stick out, in whole or in part. In a normal mode, that is, during idle or regular game plays, the gaming machine 1000 maintains a low profile with respect to its overall potential height. However, in a special mode, the extendable screen may be unrolled in, or telescoped from, the extendable screen housing 1010, for example, in response to triggering or special events having occurred, or progressive features or bonuses being offered in a game.

Figure 10B:
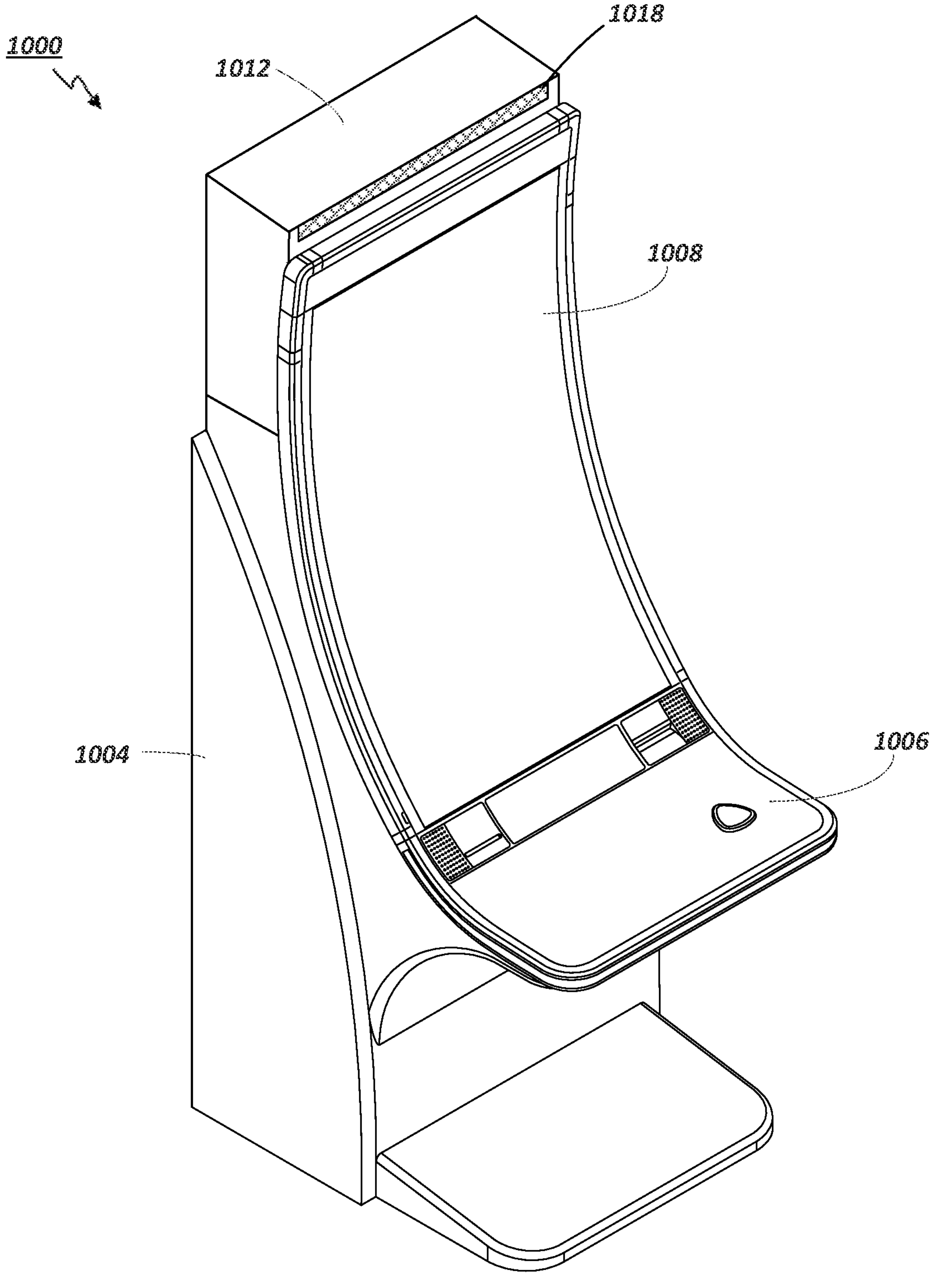
FIG. 10B illustrates the fourth gaming cabinet of FIG. 10A having a modified extendable screen housing.
Figure 10C:
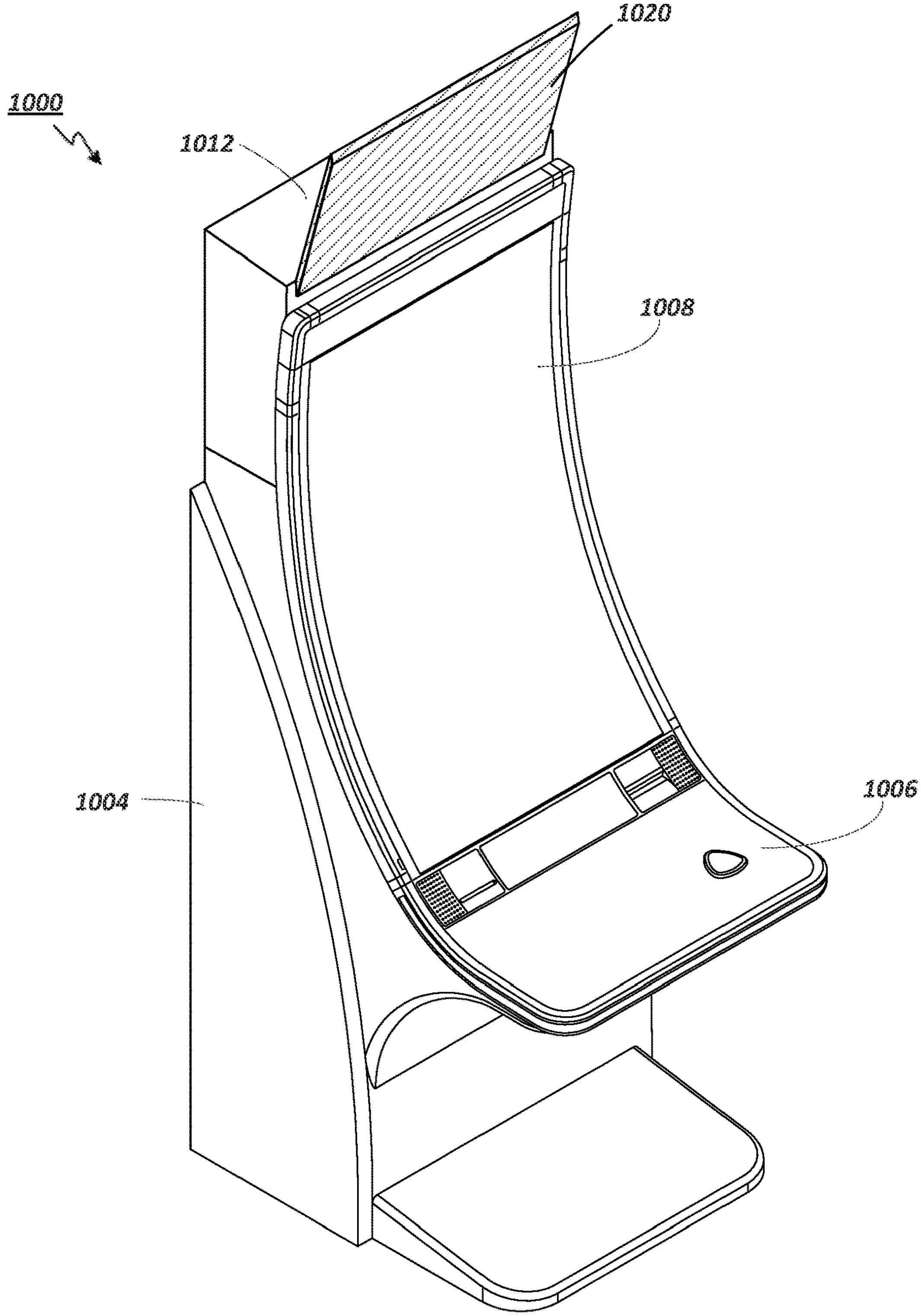
FIG. 10C illustrates the fourth gaming cabinet of FIG. 10B extending an extendable screen.

FIGS. 10B and 10C illustrate the fourth gaming cabinet 1004 with a modified extendable screen housing 1012. For example, as shown in FIG. 10B, the fourth gaming cabinet 1004 is in a first state in which the modified extendable screen housing 1012 is closed such that no screen is deployed from a front opening 1018. FIG. 10C illustrates the fourth gaming cabinet 1004 of FIG. 10B in a second or partial extended state with an extendable screen 1020 being extended from the modified extendable screen housing 1012 through the front opening 1018. In the partial extended state, the extendable screen 1020, which may be a roller screen, begins to expand the main display 1008 to display additional game contents, or to add feature game contents. In some embodiments, the extendable display screen is a flexible OLED, LCD, or fine pitched display that may be bent, rotated, or rolled up in a compact tube (like a rolled up carpet) and stored in the modified extendable screen housing 1012 so as not to obscure sight lines to surrounding structures in a gaming environment. To deploy the extendable screen 1020, the modified extendable screen housing 1012 may include a scissor lift structure. In other embodiments, the modified extendable screen housing 1012 may include other mechanisms, such as, gas, hydraulic, or linear actuators, to deploy the extendable screen 1020.

When being unrolled, the extendable screen 1020 may be deployed or extended upward from the top opening 1016. In other embodiments, e.g., in an attract mode, or when used as a welcome signage personalized for a particular player after the particular player has logged onto the gaming machine 1000, the extendable screen may be unrolled in, or telescoped from, the extendable screen housing 1010, and may be extended through the front opening 1018. After the extendable screen has been fully deployed or extended via the front opening 1018, the extendable screen 1020 increases the height and profile of the gaming machine 1000 of FIG. 10B. Thus, in this way, the gaming machine 1000 may maintain the lower profile without impacting or affecting sight lines of players during idle or regular game plays. Furthermore, varying the height may also enhance the awareness of a player being in a bonus, to welcome or attract a player, or provide advertising to potential patrons so at to deliver a unique gaming experience.

In a deploying state or as the extendable screen 1020 is deployed, the gaming machine 1000 may also control the extendable screen 1020 and/or the modified extendable screen housing 1012 to translate, rotate, tilt, pan, or some combinations of translation, rotation, tilting and panning, in relation to the fourth gaming cabinet 1004. For example, the modified extendable screen housing 1012 and/or the extendable screen 1020 may rotate through 360 or more degrees of rotation, and through smaller increments, e.g., 90 degrees, between at a first orientation and a second orientation with respect to the fourth gaming cabinet 1004. The modified extendable screen housing 1012 and/or the extendable screen 1020 may tilt toward or away from the fourth gaming cabinet 1004. Movements, screen shapes and/or orientations may incorporated and may stop anywhere in the range of motion permitted by the modified extendable screen housing 1012, the fourth gaming cabinet 1004, or the extendable screen 1020. In some embodiments, movements of the extendable screen 1020 may be moved into a deployed state, either manually or automatically. For example, the extendable screen 1020 may move, in response to detection of one or more gaming conditions, triggering or special events, manually by a player, e.g., for player game preferences or game parameters, or automatically, e.g., in response to player game preferences, game parameters, to device proximity to player or other devices (e.g., a mobile device) or other events (e.g., the player enters gaming area).

Although not shown, a number of thin horizontal supports may be attached to the extendable screen 1020 for added support and/or guiding structure. In a most common form, the support structure formed from the number of thin horizontal supports provides a rectangular-framed display with the flexible OLED screen. Alternatively, the extendable screen 1020 may also be attached to other different planar structures. For example, the extendable screen 1020 may also be supported or guided by an accordion structure that may allow the flexible OLED screen to provide some depth effects or three-dimensional effects. The extendable screen 1020 may also be supported by a curve structure to further extend a curved main display similar to the main display 128 of gaming device 104B in FIG. 1, as discussed below with respect to FIG. 13 below. Further, in some other embodiments, instead of having the modified extendable screen housing 1012 being mounted to the fourth gaming cabinet 1004 to project the extendable screen 1020 upward, the modified extendable screen housing 1012 may be supported by a mounting structure or a frame positioned above the fourth gaming cabinet 1004 such that the extendable screen 1020 may be deployed from the modified extendable screen housing 1012 downward toward the first button deck 1006 and/or the fourth gaming cabinet 1004 guided by the mounting structure or the frame.

Figure 11:
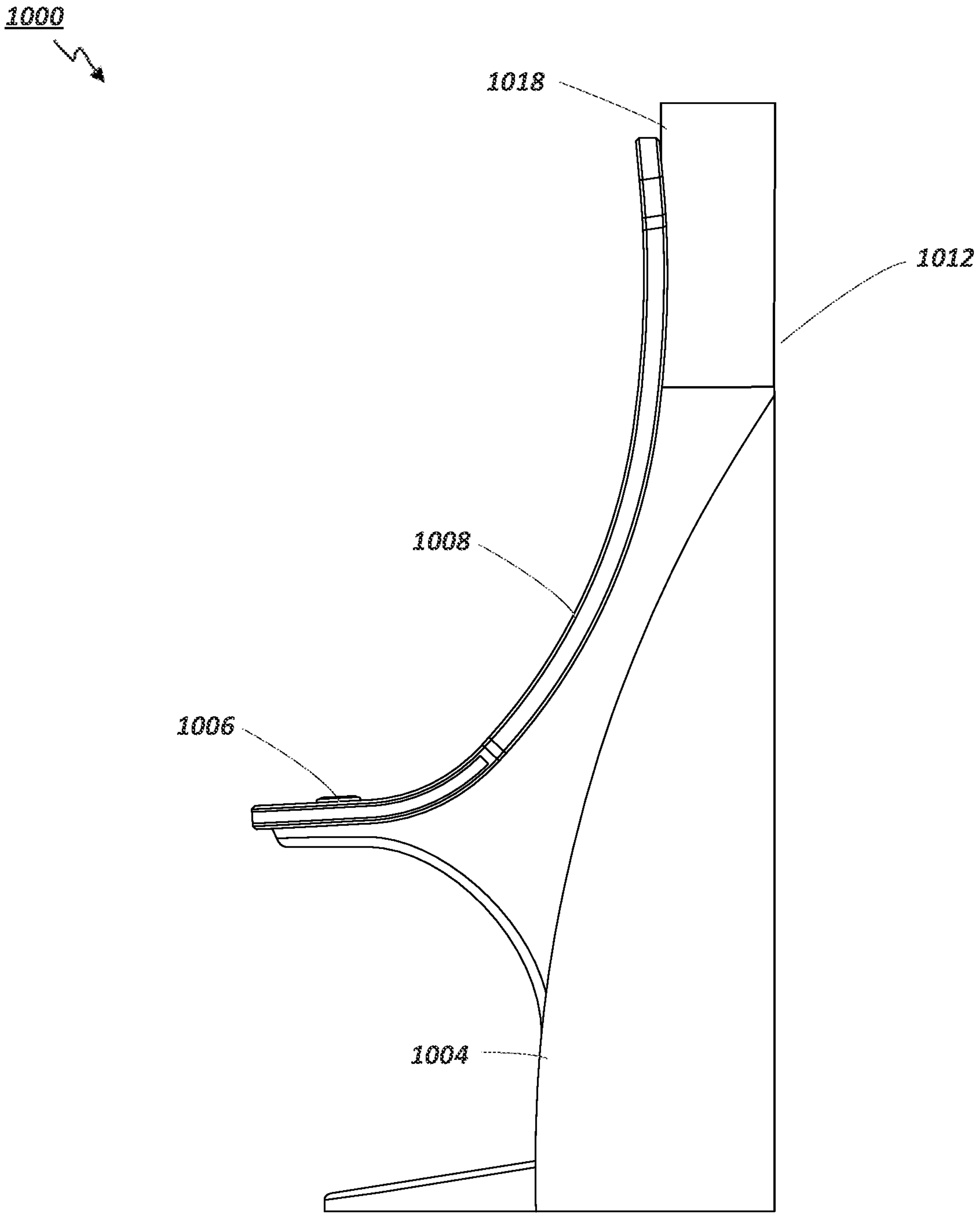
FIG. 11 illustrates a side view of the fourth gaming cabinet of FIG. 10B with the modified extendable screen housing.

FIG. 11 illustrates a side view of the fourth gaming cabinet 1004 of FIG. 10B with the modified extendable screen housing 1012. For example, as shown in FIG. 11, the fourth gaming cabinet 1004 is in the first undeployed state in which the modified extendable screen housing 1012 is closed such that the extendable screen 1020 has not been extended out of the modified extendable screen housing 1012 via the front opening 1018.

Figure 12A:
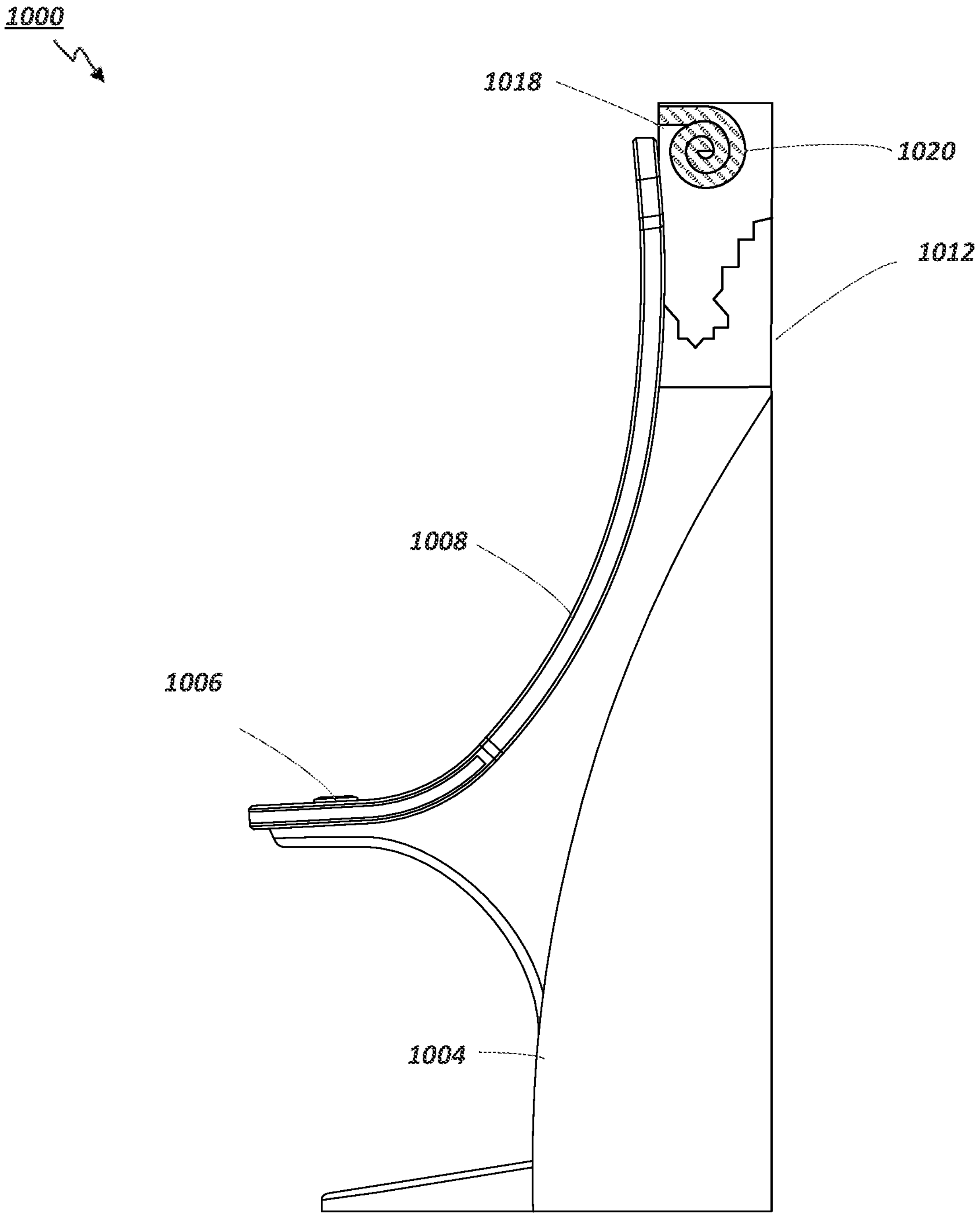
FIG. 12A illustrates the fourth gaming cabinet of FIG. 11 with a partially cutaway view of the modified extendable screen housing in a closed state.

FIG. 12A illustrates the fourth gaming cabinet 1004 of FIG. 11 with a partially cutaway view of the modified extendable screen housing 1012 in the closed state. For example, as shown in FIG. 12A, the fourth gaming cabinet 1004 is in the closed state in which the extendable screen 1020 is entirely rolled up behind the front opening 1018 in the modified extendable screen housing 1012.

Figure 12B:
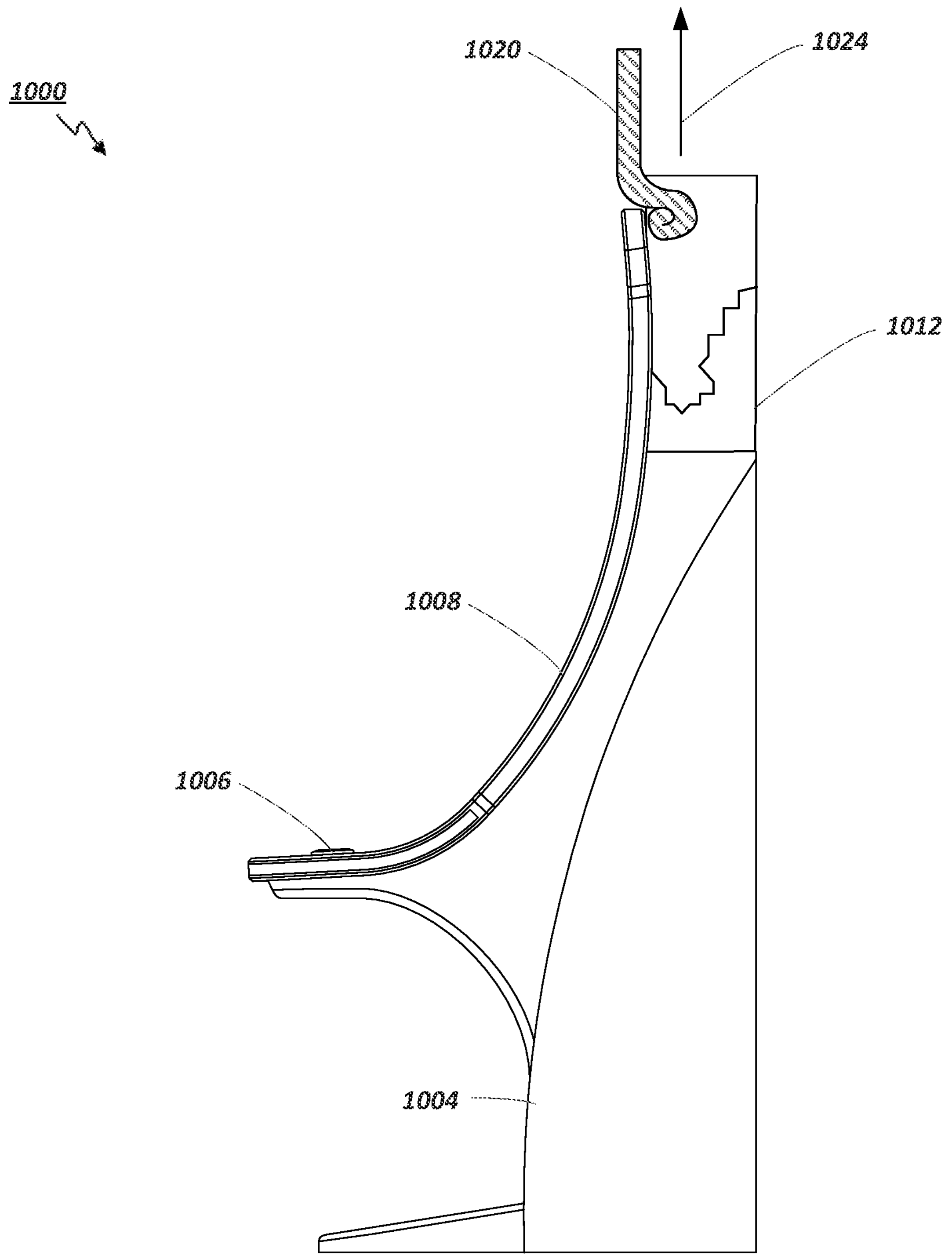
FIG. 12B illustrates the fourth gaming cabinet of FIG. 12A with the partially cutaway view of the modified extendable screen housing in a partial extended state.

FIG. 12B illustrates a partially cutaway view of the modified extendable screen housing 1012 mounted on the fourth gaming cabinet 1004 of FIG. 12A in a second or partial extended state. In the partial extended state, the extendable screen 1020 is extending in a horizontal direction initially from the modified extendable screen housing 1012 followed by an upward direction indicated by arrow 1024. As shown, a portion of the extendable screen 1020 is illustrated as being unrolled or unwound in the modified extendable screen housing 1012. In the partial rollup state, the extendable screen 1020, which may be a roller screen, expands the main display 1008 to display additional game contents, or to add feature game contents. As the portion of the extendable screen 1020 is being unrolled or unwound in the modified extendable screen housing 1012, the modified extendable screen housing 1012 initially moves an extended portion of the extendable screen 1020 toward the front horizontally and above the main display 1008 upwardly to give an appearance of continuity of both the main display 1008 and the extendable screen 1020. In some embodiments, unrolling the extendable screen 1020 horizontally then upwardly may be accompanied by extending and/or retracting one or more support structures or frame structures (not shown) that shape the extendable screen 1020, and rolling the extendable screen 1020 about one or more rollers (not shown). For example, as the extendable screen 1020 is unrolled horizontally toward the front, one or more rollers may be used to bend the extendable screen 1020 based on its flexibility by a number of predetermined degrees such that the extendable screen 1020 may appear to extend vertically as the extendable screen 1020 extends upwardly. As the extendable screen 1020 extends upwardly, one or more of the support structures may frame the extendable screen 1020 in any desirable shapes, for example, vertically, or with a curvature (e.g., gaming machine 1300 of FIG. 13 discussed below). However, as discussed with respect to other embodiments, as the portion of the extendable screen 1020 is being unrolled or unwound from the modified extendable screen housing 1012, the modified extendable screen housing 1012 may continue to move the extended portion of the extendable screen 1020 toward the front and above the main display 1008 with a visible gap between the main display 1008 and the extendable screen 1020.

Figure 12C:
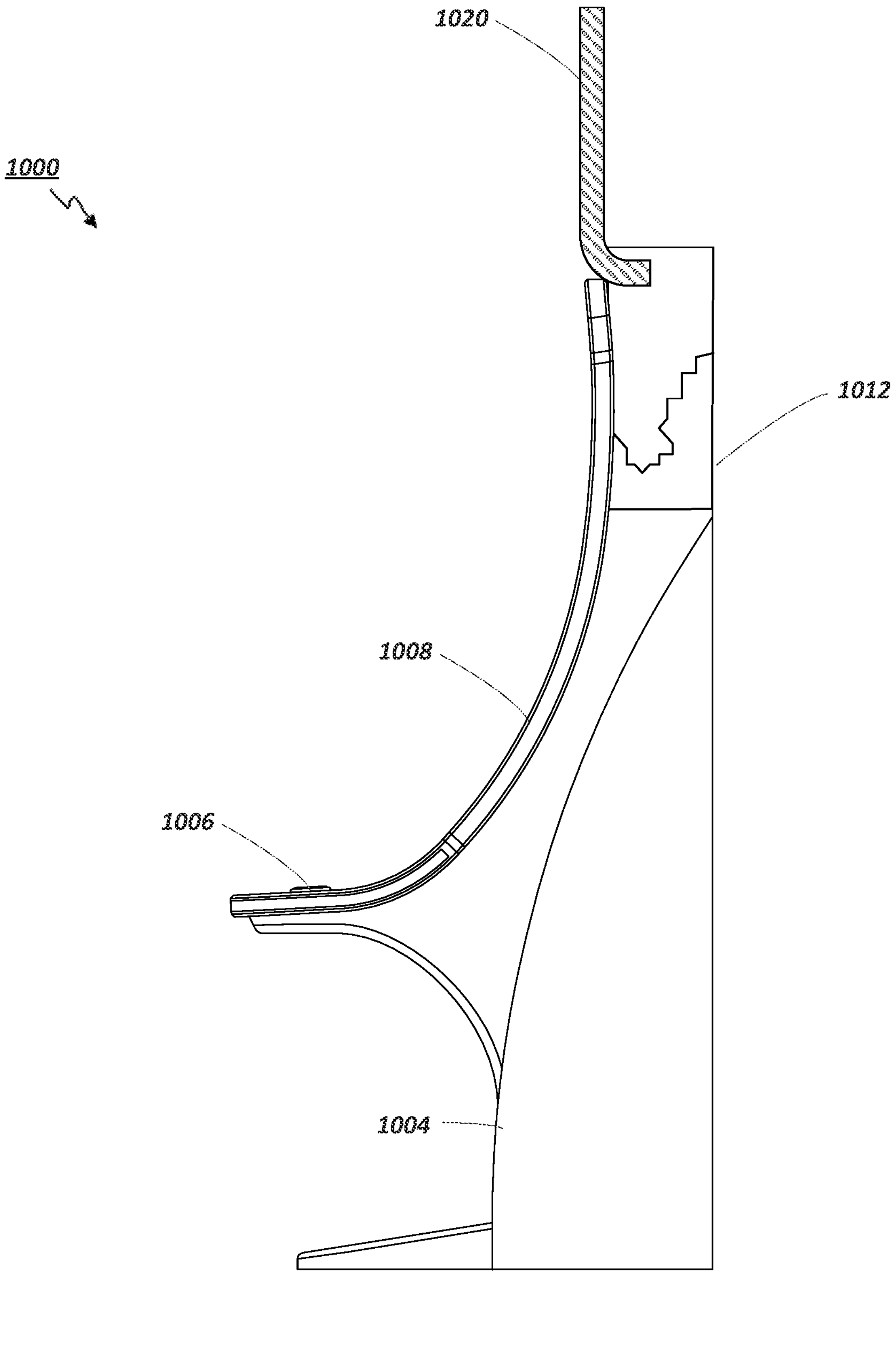
FIG. 12C illustrates the fourth gaming cabinet of FIG. 12A with the partially cutaway view of the modified extendable screen housing in a fully extended state.

FIG. 12C illustrates a partially cutaway view of the modified extendable screen housing 1012 mounted on the fourth gaming cabinet 1004 of FIG. 12A in a fully unrolled state in which the extendable screen 1020 has been fully extended from the modified extendable screen housing 1012. In the fully rolled out state, the extendable screen 1020 may fully expand the main display 1008 such that a full feature game space may be utilized. In some embodiments, the extendable screen 1020 and the main display 1008 form a unified or substantially continuous screen with a minimized or seamless junction. However, in other embodiments, the extendable screen 1020 and the main display 1008 may be separated by a visible gap. Also as shown, the rolled up screen as shown in FIG. 12A has been unrolled entirely.

Figure 12D:
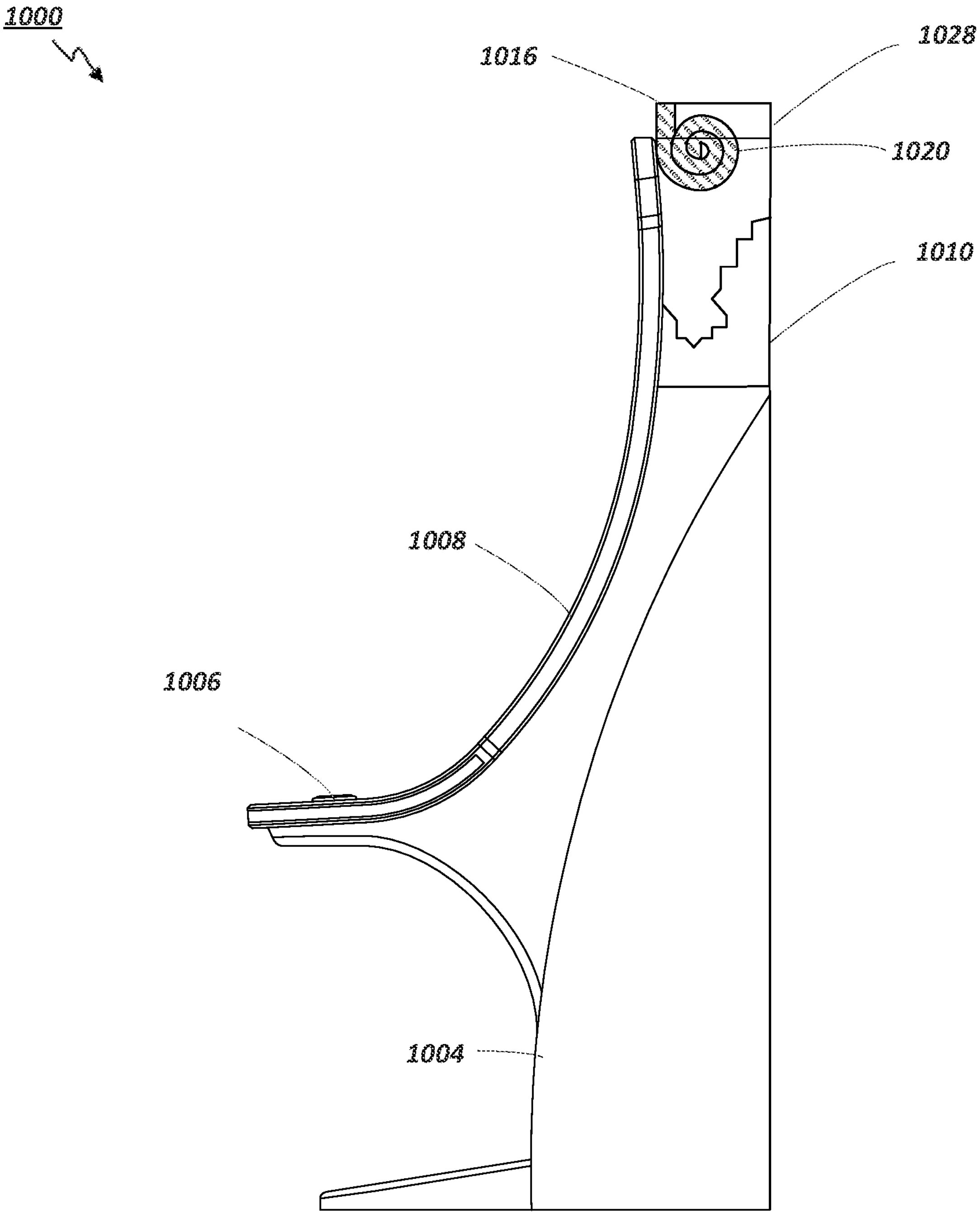
FIG. 12D illustrates the fourth gaming cabinet of FIG. 10A with a partially cutaway view of the modified extendable screen housing in a closed state.

FIG. 12D illustrates the fourth gaming cabinet 1004 of FIG. 10A with a partially cutaway view of the extendable screen housing 1010 in the closed state. For example, as shown in FIG. 12D, the fourth gaming cabinet 1004 is in the closed state in which the extendable screen 1020 is entirely rolled up behind the top opening 1016 in the extendable screen housing 1010. In some embodiments, the extendable screen housing 1010 also includes an optional slidable member 1028 that slides the extendable screen 1020 towards and back with respect to a player viewing the main display 1008, with extension mechanics similar to those discussed with respect to FIGS. 8 and 9, or sliding mechanics similar to those of drawer slides controlled by the extendable screen housing 1010.

Figure 12E:
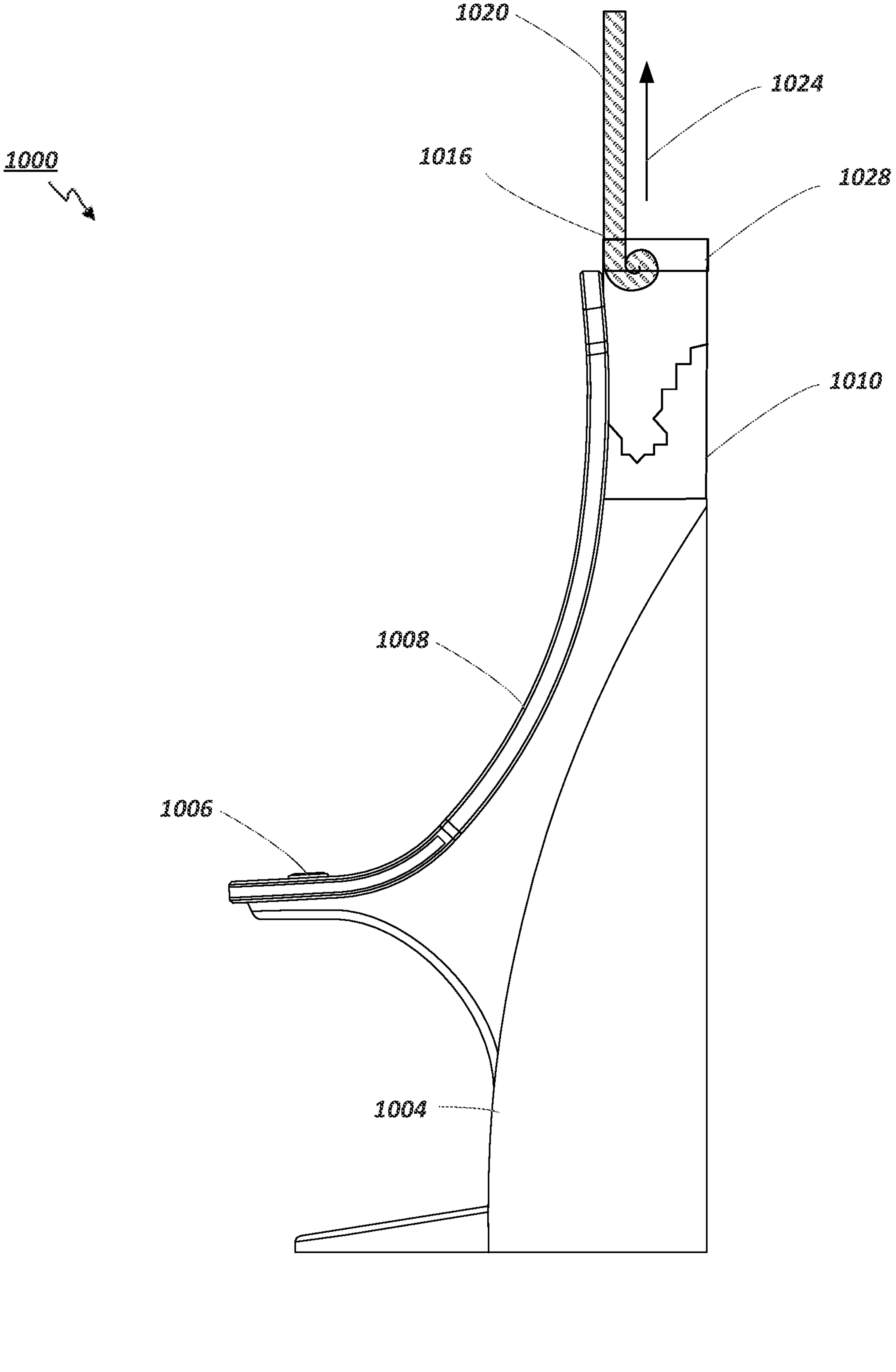
FIG. 12E illustrates the fourth gaming cabinet of FIG. 12D with the partially cutaway view of the modified extendable screen housing in a partial extended state.

FIG. 12E illustrates a partially cutaway view of the extendable screen housing 1010 mounted on the fourth gaming cabinet 1004 of FIG. 12A in a partial extended state. In the partial extended state, the extendable screen 1020 is extending in an upward direction indicated by arrow 1024. As shown, a portion of the extendable screen 1020 is illustrated as being unrolled or unwound in the extendable screen housing 1010. In the partial rollup state, the extendable screen 1020 expands the main display 1008 to display additional game contents, or to add feature game contents. As the portion of the extendable screen 1020 is being unrolled or unwound in the extendable screen housing 1010, the extendable screen housing 1010 moves an extended portion of the extendable screen 1020 toward upward and above the main display 1008 to give an appearance of continuity of both the main display 1008 and the extendable screen 1020. However, as discussed with respect to other embodiments, as the portion of the extendable screen 1020 is being unrolled or unwound in the extendable screen housing 1010, the extendable screen housing 1010 may continue to move the extended portion of the extendable screen 1020 upward and above the main display 1008 with a visible gap between the main display 1008 and the extendable screen 1020.

Figure 12F:
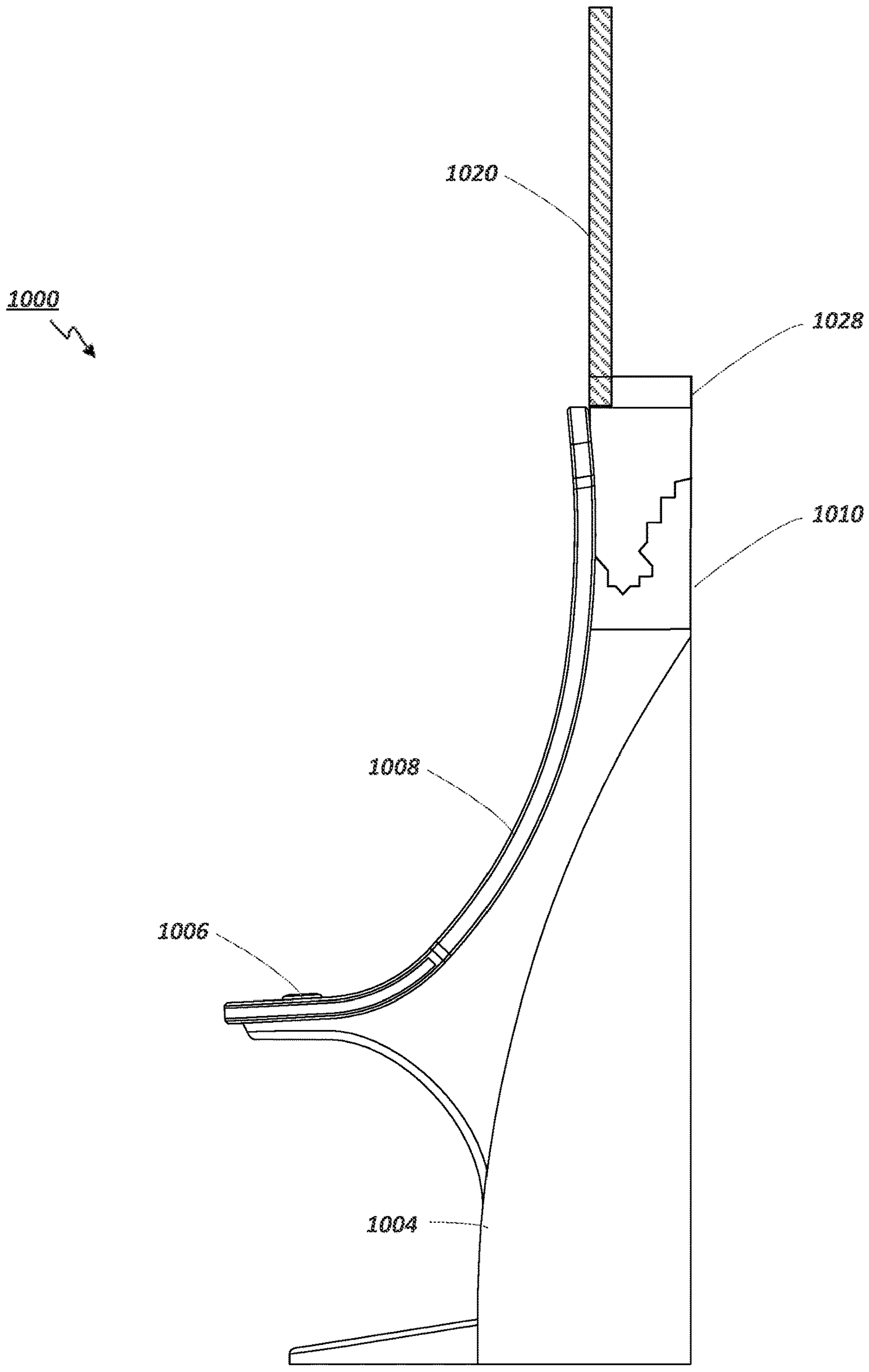
FIG. 12F illustrates the fourth gaming cabinet of FIG. 12D with the partially cutaway view of the modified extendable screen housing in a fully extended state.
Figure 12G:
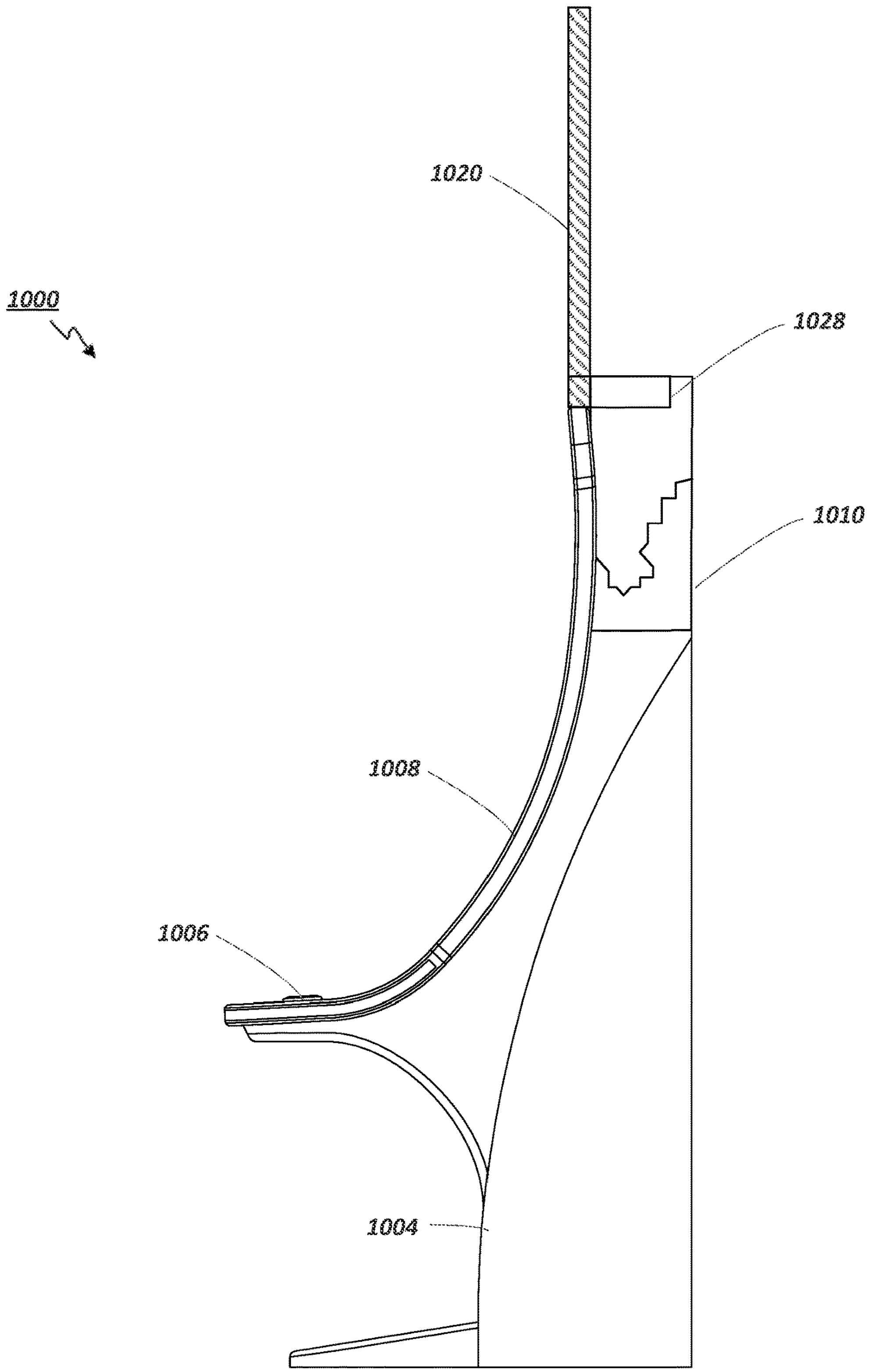
FIG. 12G illustrates the fourth gaming cabinet of FIG. 12D with the partially cutaway view of the modified extendable screen housing in a fully extended state forming a seamless display with a main display.

FIG. 12F illustrates a partially cutaway view of the extendable screen housing 1010 mounted on the fourth gaming cabinet 1004 of FIG. 12D in a fully unrolled state in which the extendable screen 1020 has been fully extended from the extendable screen housing 1010. In the fully rolled out state, the extendable screen 1020 may fully expand the main display 1008 such that a full feature game space may be utilized. As shown, similar to other embodiments, a visible gap may exist between the extendable screen 1020 and the main display 1008. As such, in some embodiments, such as shown in FIG. 12G, the slidable member 1028 slides or is driven forward from the extendable screen housing 1010 such that the extendable screen 1020 and the main display 1008 form a unified or substantially continuous screen with a minimized or seamless junction after the extendable screen 1020 has been fully extended, or while the extendable screen 1020 is extending. In some embodiments, the slidable member 1028 may not be visible from the player's perspective, except for the extendable screen 1020 that has been extended therefrom. In other embodiments, the slidable member 1028 may be visible as an extending tray extended from the extendable screen housing 1010.

Referring back to FIG. 10C, the extendable screen 1020 is in a portrait orientation. In other embodiments, the extendable screen 1020 may be extended out of the modified extendable screen housing 1012 in a landscape orientation. In still other embodiments, the extendable screen 1020 may be rotated from the portrait orientation to a landscape orientation, for example, in response to different gaming events after the extendable screen 1020 has been extended out of the modified extendable screen housing 1012 in the portrait orientation.

Further, although the extendable screen 1020 is shown to be extending upward from the extendable screen housing 1010 or the modified extendable screen housing 1012 in this embodiment, the extendable screen 1020 may instead be extending sideways from the extendable screen housing 1012 in other embodiments. In still other embodiments, multiple extendable screens may be housed in the modified extendable screen housing 1012 or the extendable screen housing 1010 in respective rollup positions. In such cases, depending on the triggering or special events, one or more of the multiple extendable screens may be extended from the modified extendable screen housing 1012 in different directions, for example, upwardly and sideways, simultaneously, concurrently, or in some predetermined orders. Still furthermore, although the modified extendable screen housing 1012 is shown as a rectangular apparatus, the modified extendable screen housing 1012 may have other geometrical shapes to house a number of extendable screens of different shapes and/or sizes. That is, in addition to rolling out the extendable screens horizontally and/or vertically, the modified extendable screen housing 1012 with different geometrical shapes may roll out a number of extendable screens in different directions. For example, if the modified extendable screen housing 1012 is a five-legged-star-shaped apparatus, the modified extendable screen housing 1012 may house five extendable screens that can be extended or rolled out in five different directions to form a five-legged-star-shaped display. In addition to being a topper display, a star-shaped extendable screen housing may also be used as an overhead display above a gaming machine.

Figure 13:
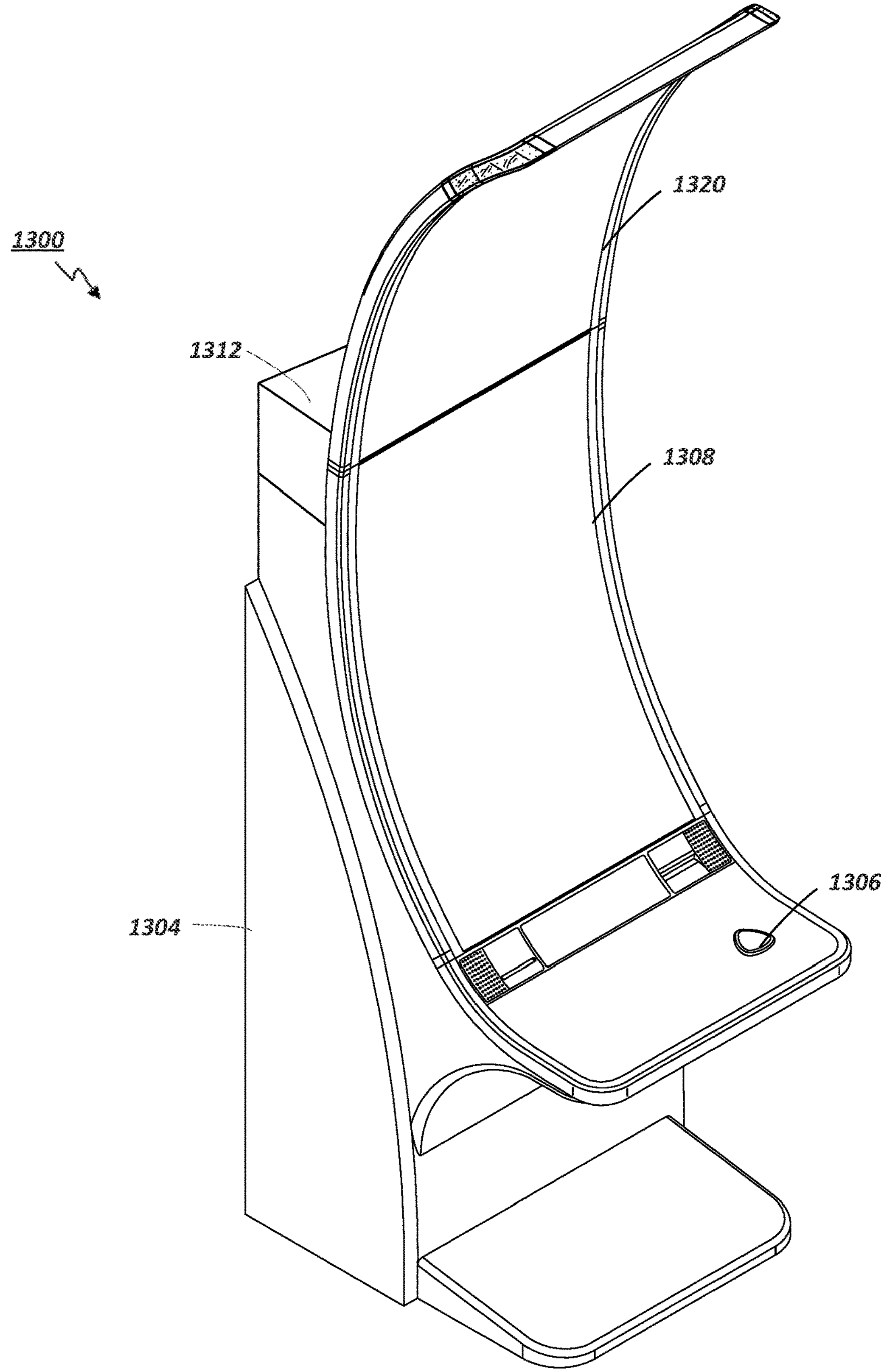
FIG. 13 illustrates a fifth gaming cabinet having an extendable screen housing.

FIG. 13 illustrates an aspect of a gaming machine 1300 with a fifth gaming cabinet 1304 having a button deck, a main display 1308 and an extendable screen housing 1312. As shown, an extendable screen 1320 has been fully extended from the extendable screen housing 1312. However, unlike the gaming machine 1000 of FIG. 10B in which the extendable screen 1020 extends upwardly relative to the modified extendable screen housing 1012, the extendable screen 1320 and the main display 1308 form an enlarged or continuous curve screen with a minimized or seamless junction when the extendable screen 1320 has been fully extended. The enlarged or continuous curve screen provides a uniform game experience for the player. As discussed above, in some other embodiments, the extendable screen 1320 and the main display 1308 may have a visible gap.

Figure 14:
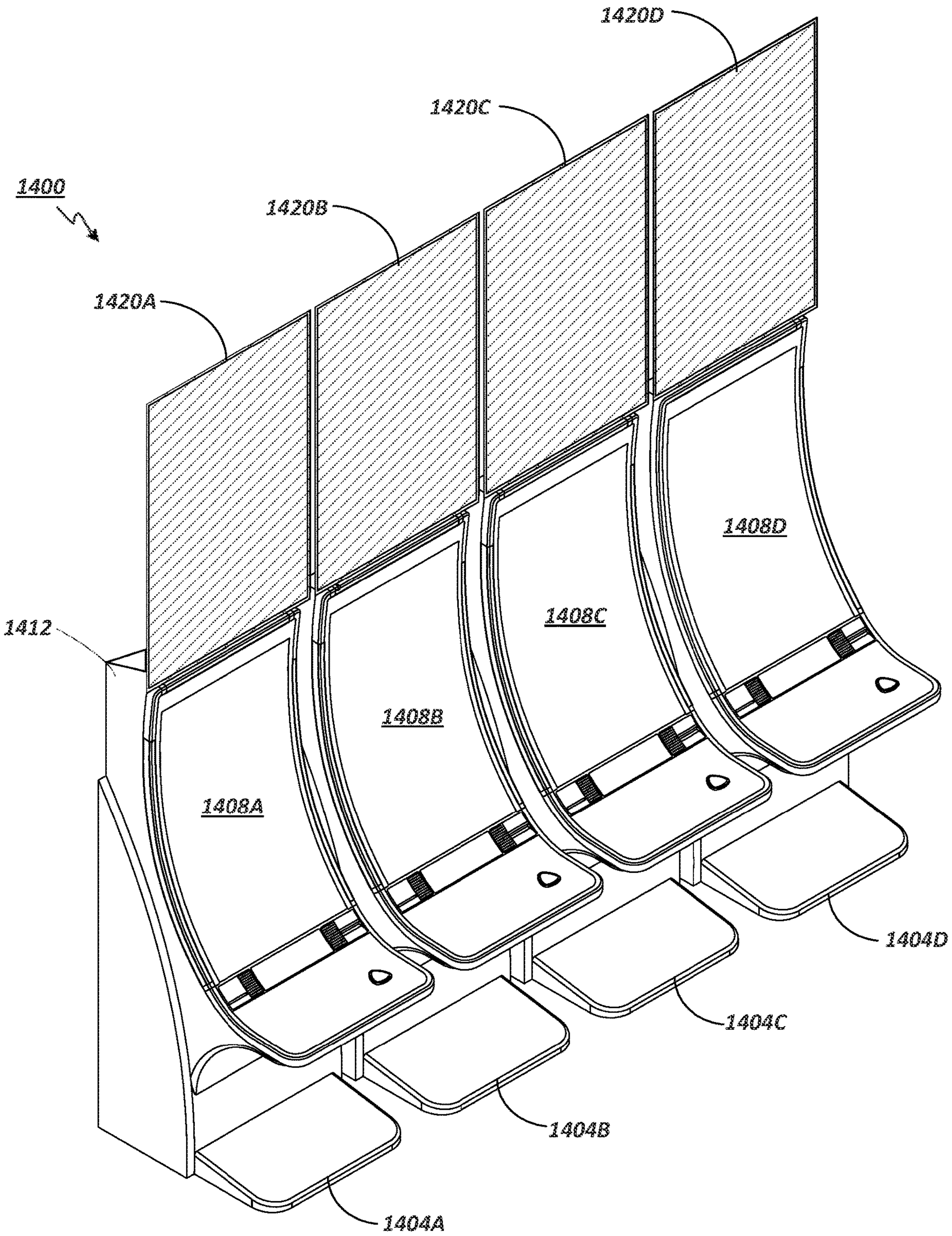
FIG. 14 illustrates a second bank of gaming machines with extendable displays.

FIG. 14 illustrates an aspect of a second bank of gaming machines 1400 having extendable displays. As shown, the second bank of gaming machines 1400 includes a gaming cabinets 1404A-D having bank displays 1408A-D, respectively. The second bank of gaming machines 1400 includes an extendable screen housing 1412 that controls extendable screens 1420A-D.

In some embodiments, the extendable screen housing 1412 may be configured to control each of the extendable screens 1420A-D individually. In this way, different game contents may be presented based on game designs on the extendable screens 1420A-D. Further, the extendable screens 1420A-D may also have different heights. For example, extendable screens 1420A and 1420C may be fully extended, while extendable screen 1420C is only partially rolled up and extendable screen 1420D remains rolled up in the extendable screen housing 1412, when a triggering event occurs in the game. Factors that may affect the heights of the extendable screens 1420A-D may include wagers placed, quantities of games played, amounts of time the base game has been played, or the like. In other embodiments, the extendable screen housing 1412 may control the extendable screens 1420A-D collectively as a group. Thus, for example, the extendable screens 1420A-D will be fully extended when a triggering event occurs in a base game.

Figure 15:
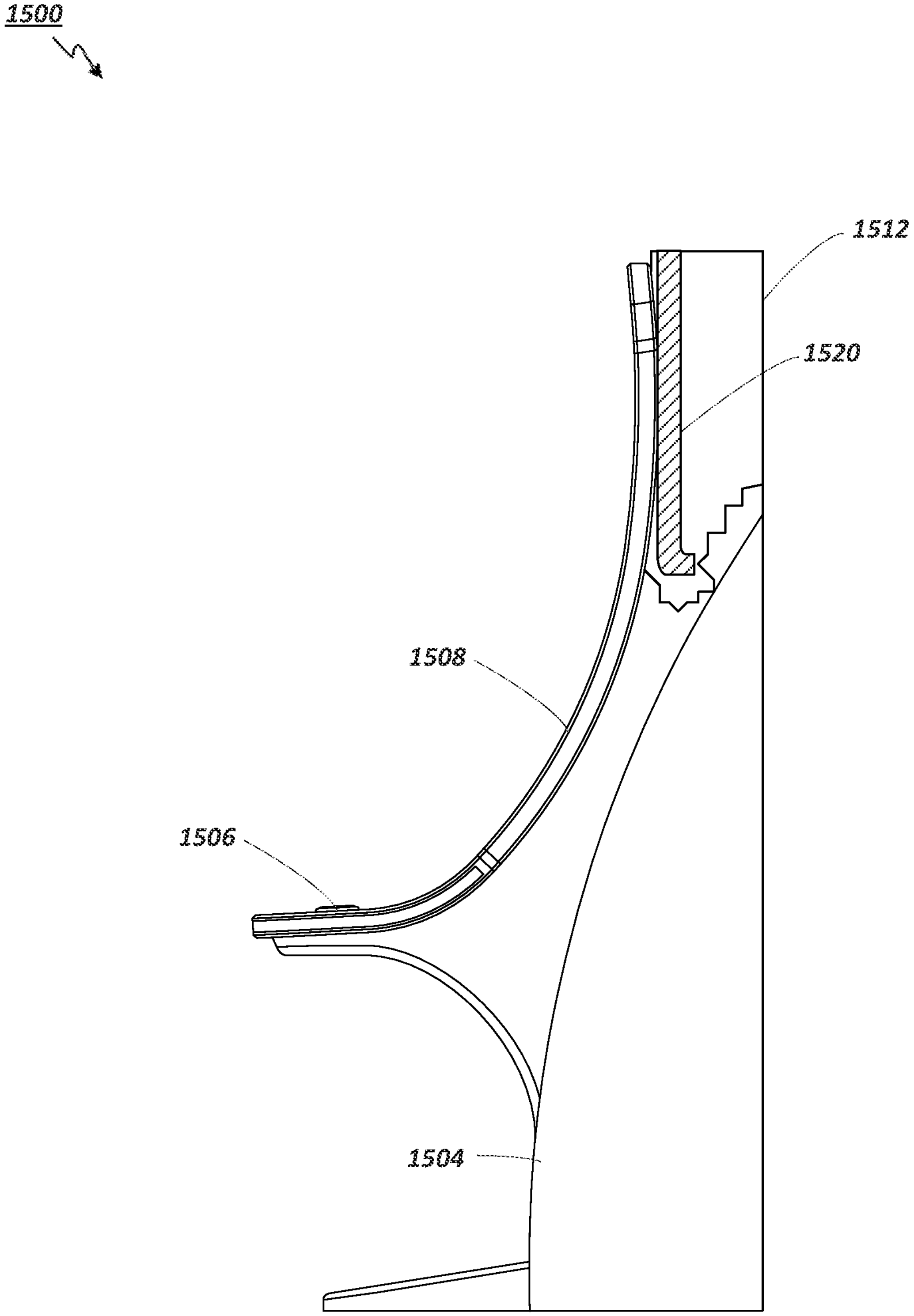
FIG. 15 illustrates a sixth gaming cabinet having an extendable screen.

FIG. 15 illustrates an aspect of a gaming machine 1500 having a sixth gaming cabinet 1504, a button deck 1506, a main display 1508, and an extendable screen housing 1512. The extendable screen housing 1512, which is shown partially exposed, houses a telescoping screen 1520 in a closed state. That is, the telescoping screen 1520 has not been extended from the extendable screen housing 1512. Unlike the extendable screen 1020 (of FIG. 10A), which is a rollup screen, the telescoping screen 1520 is a telescoping display. In response to triggering or special events, the extendable screen housing 1512 is configured to extend the telescoping screen 1520 upward and out of the extendable screen housing 1512.

Figure 16:
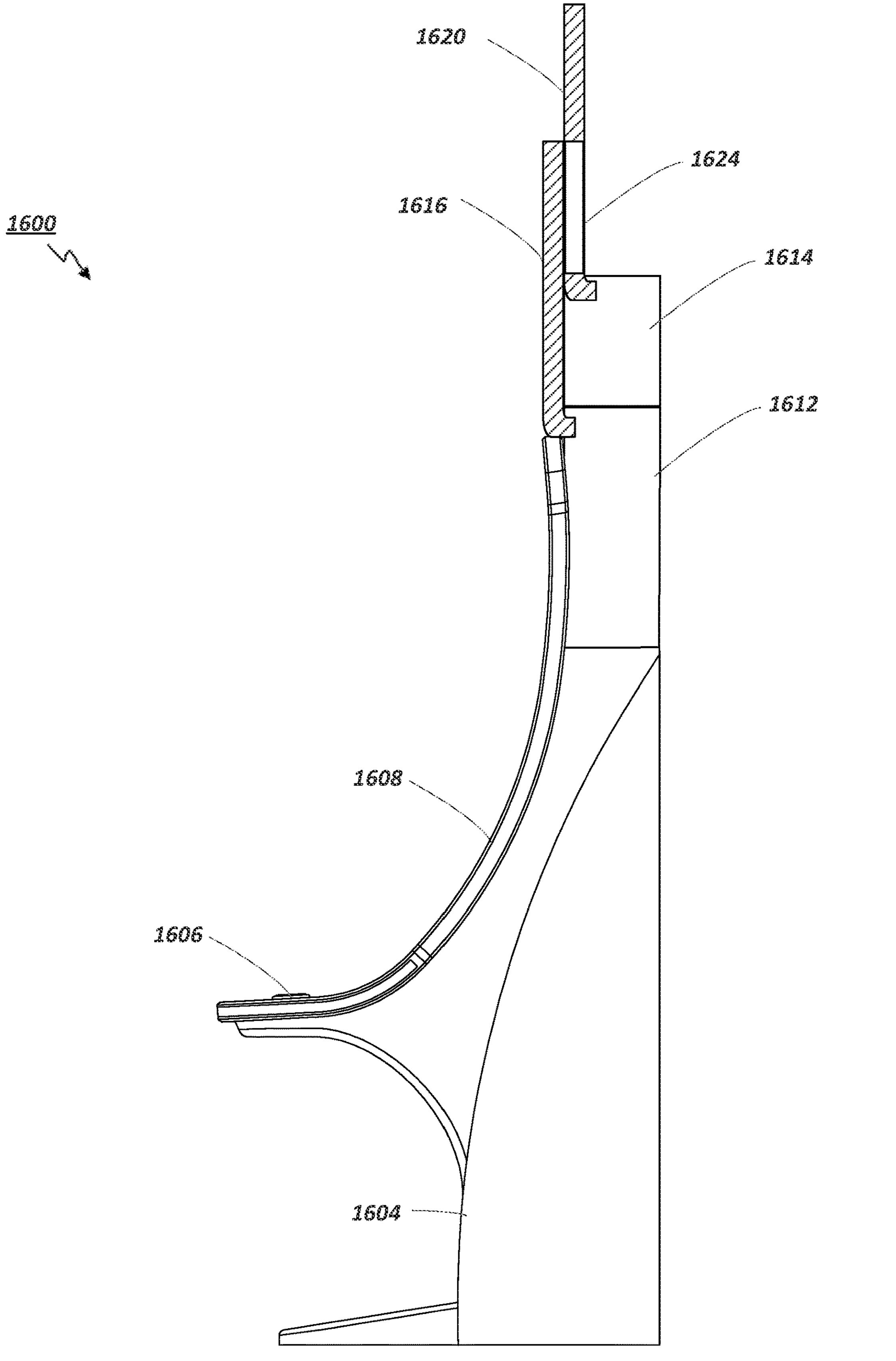
FIG. 16 illustrates a seventh gaming cabinet having an extendable screen housing and a plurality of nested screens.

FIG. 16 illustrates an aspect of a gaming machine 1600 having a seventh gaming cabinet 1604, a button deck 1606, and a main display 1608, a first nested screen housing 1612 and a second nested screen housing 1614. As shown, a first nested screen 1616 and a second nested screen 1620 have been extended from the first nested screen housing 1612 and the second nested screen housing 1614, respectively. In some embodiments, the first nested screen 1616 and the second nested screen 1620 may be operated as a topper screen, a feature game screen, or the like. The second nested screen 1620 is supported by a supporting structure 1624. In some embodiments, the supporting structure 1624 may be a dead screen, which may only function as a support or when first nested screen 1616 obstructs a portion of second nested screen 1620. In other embodiments, the supporting structure 1624 may be an active screen that may cooperate with the first nested screen 1616 to display certain game effects. As discussed above, both the first nested screen 1616 and the second nested screen 1620 are typically rollup screens. However, one or both of the first nested screen 1616 and the second nested screen 1620 may be telescoping screens. Further, although only two nested screens are shown with respect to the seventh gaming cabinet 1604 in this embodiment, other numbers of nested screens may be used.

Figure 17:
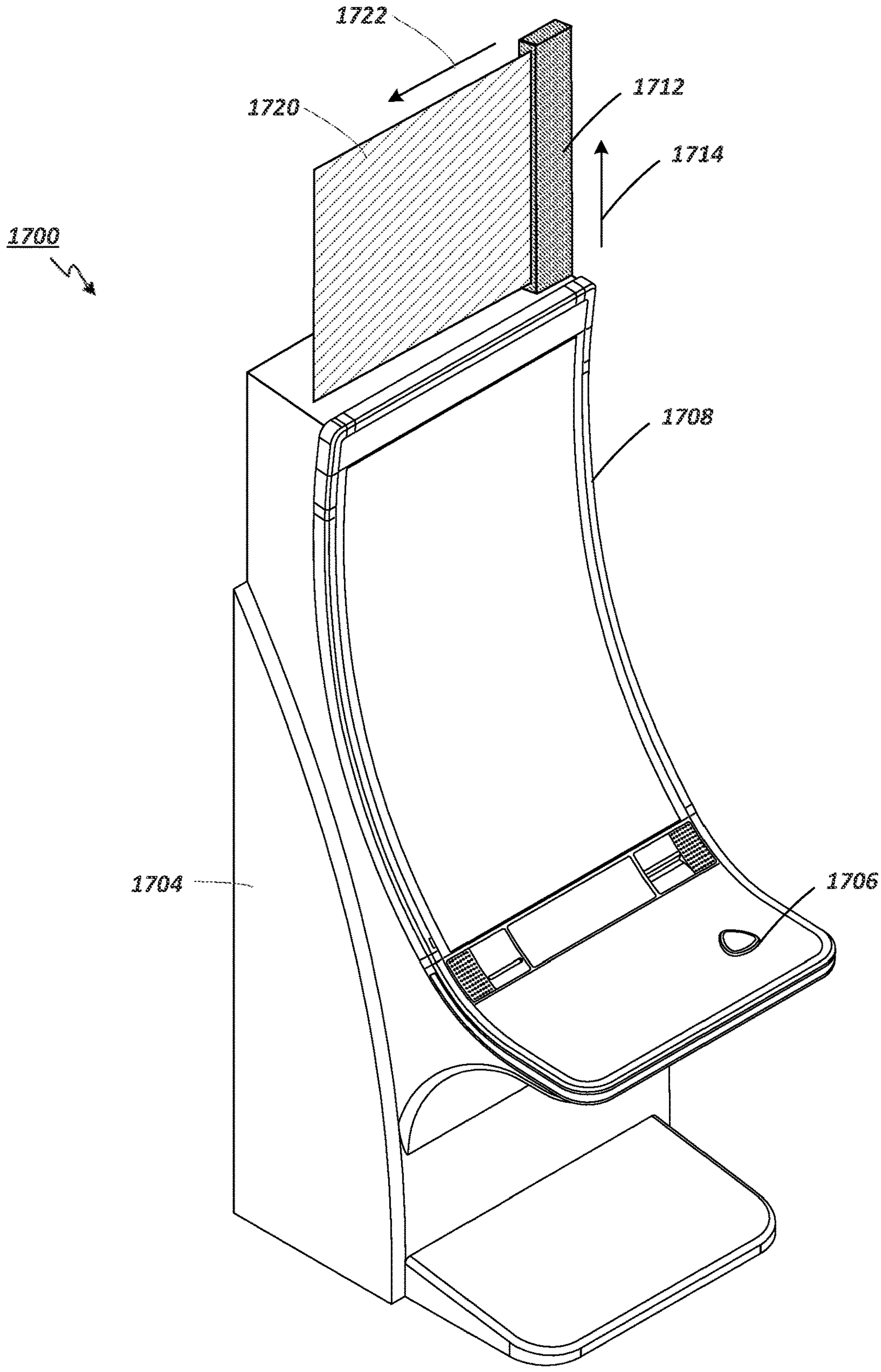
FIG. 17 illustrates an eighth gaming cabinet having an extendable screen housing and an extendable screen.

FIG. 17 illustrates an aspect of a gaming machine 1700 having an eighth gaming cabinet 1704. Similar to the gaming machines shown above, the eighth gaming cabinet 1704 includes, among other things, a button deck 1706 and a main display 1708. The eighth gaming cabinet 1704 includes an extendable screen housing 1712 and an extendable screen 1720 extending from the extendable screen housing 1712. As shown, the extendable screen housing 1712 may be extended from the eighth gaming cabinet 1704 prior to unrolling or extending the extendable screen 1720 in an upward or vertical direction as indicated by arrow 1714. In addition to vertical translation, extendible screen housing 1712 may also be capable of one or more of other translations, rotation, tilting, panning or some combinations of translation, rotation, tilting and panning. In such a case, the extendable screen 1720 may be extending from the extendable screen housing 1712 in a sideway or horizontal direction as indicated by arrow 1722, after the extendable screen housing 1712 has been extended from the eighth gaming cabinet 1704. In other embodiments, the extendable screen housing 1712 may be fixedly positioned on top of the gaming machine 1700. In such a case, the extendable screen 1720 may be extending from the extendable screen housing 1712 in a sideway or horizontal direction as indicated by arrow 1722 when triggering or special events occur as discussed above. Similar to the supporting structure 1624 of FIG. 16 that may be an active screen, the extendable screen housing 1712 may also include an active screen. Similar to the extendable screen 1020 of FIG. 12B, the extendable screen 1720, the extendable screen housing 1712, and the main display 1708 may form a seamless (and thus enlarged) display based on game contents.

Although not shown, in other embodiments, the gaming machine 1700 may include a remote extendable screen housing and an extendable screen that can be extended from the remote extendable screen housing. In some embodiments, the remote extendable screen housing may be an overhead signage housing that is positioned remotely relative to the gaming machine 1700, and may be wirelessly coupled to the eighth gaming cabinet 1704. In other embodiments, the remote extendable screen housing may be physically coupled to the eighth gaming cabinet 1704 via a conduit or other structures. In such cases, the extendable screen may be extending from the remote extendable screen housing in a downward (or vertically downward) direction. As discussed above, in response to triggering or special events occurring, a controller (similar to game controller 202 of FIG. 2A) may initiate a movement sequence causing the gaming machine 1700 to extend from the remote extendable screen housing. Once extended, or during extension during the movement sequence, the extendable screen may display contents associated with the game or the remote extendable screen housing.

Figure 18A:
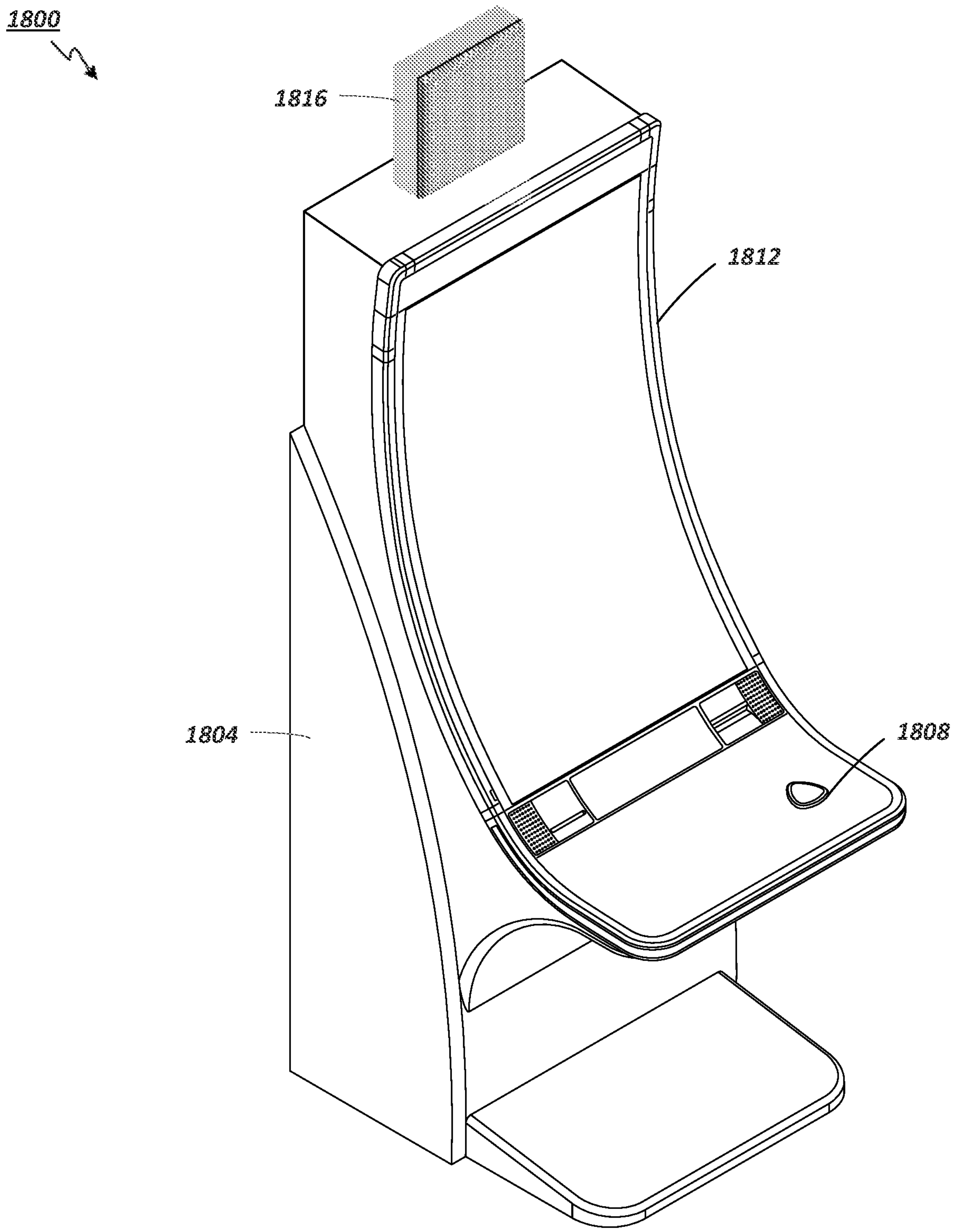
FIG. 18A illustrates a ninth gaming cabinet.
Figure 18B:
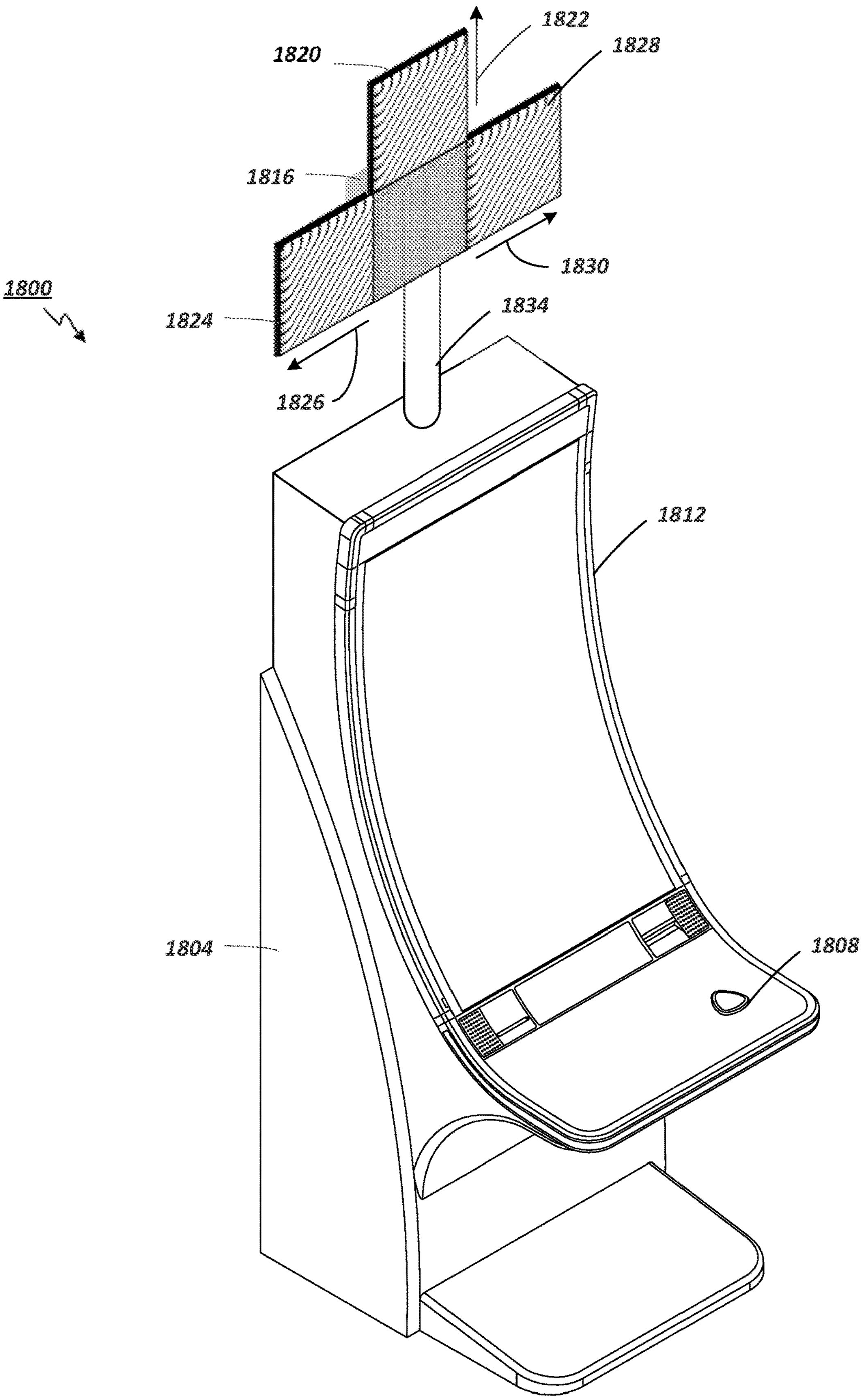
FIG. 18B illustrates the ninth gaming cabinet of FIG. 18A having an extended topper display.

FIG. 18A illustrates a gaming machine 1800 having a ninth gaming cabinet 1804. Similar to the gaming machines shown above, the ninth gaming cabinet 1804 includes, among other things, a button deck 1808, and a main display 1812. However, unlike the gaming machines discussed above, the ninth gaming cabinet 1804 also includes a topper display 1816 mounted on the ninth gaming cabinet 1804. In other embodiments, the topper display 1816 may be extended from the ninth gaming cabinet 1804 through an opening (not shown) on the ninth gaming cabinet 1804. In the embodiment as shown in FIG. 18A, the topper display 1816 houses a number of extendable screens. As shown in FIG. 18B, the topper display 1816 includes a first extendable screen 1820 extending from the topper display 1816 in a vertical direction indicated by a first arrow 1822, a second extendable screen 1824 extending from the topper display 1816 in a first horizontal direction indicated by a second arrow 1826, and a third extendable screen 1828 extending from the topper display 1816 in a second horizontal direction indicated by a third arrow 1830. An extendable structure 1834 supports and raises the topper display 1816 from the ninth gaming cabinet 1804. For example, in response to triggering or special events occurring, a controller (similar to game controller 202 of FIG. 2A) may initiate a movement sequence causing the extendable structure 1834 to raise the topper display 1816 from the ninth gaming cabinet 1804. Once extended, or during extension during the movement sequence, the controller may also unroll the first extendable screen 1820, the second extendable screen 1824, and the third extendable screen 1828, either simultaneously, consecutively, randomly, or based on a predetermined game or event pattern. Furthermore, in other embodiments, the controller may also unroll one, two or all of the first extendable screen 1820, the second extendable screen 1824, and the third extendable screen 1828, completely or partially, either simultaneously, consecutively, randomly, or based on a predetermined game or event pattern.

Figure 19A:
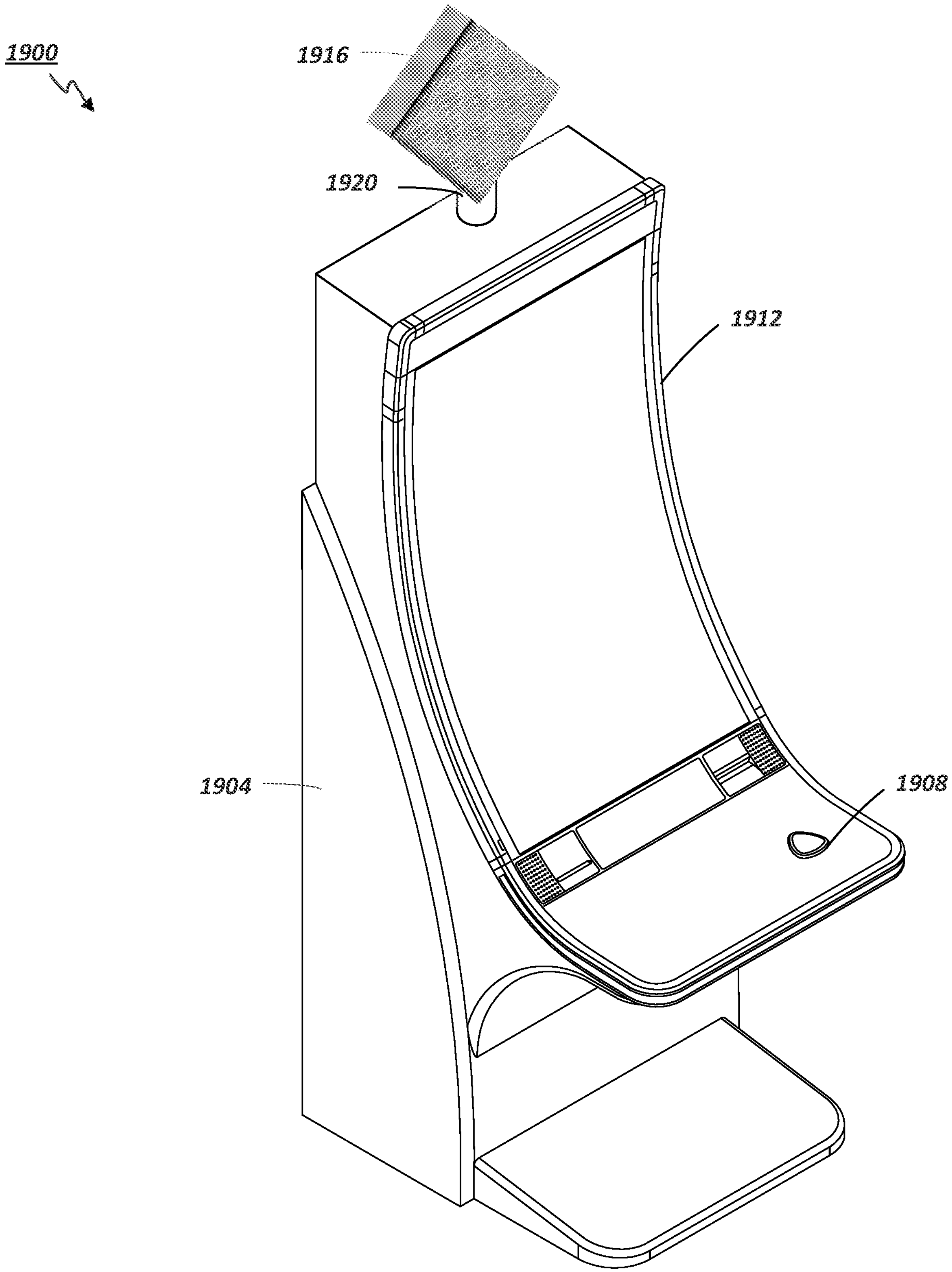
FIG. 19A illustrates a tenth gaming cabinet.

Similar to FIG. 18A, FIG. 19A illustrates a gaming machine 1900 having a tenth gaming cabinet 1904. The tenth gaming cabinet 1904 includes, among other things, a button deck 1908, a main display 1912, and a topper display 1916 supported by an extendable structure 1920 on the tenth gaming cabinet 1904. In other embodiments, the extendable structure 1920 may be extended, and thus visible, from the tenth gaming cabinet 1904 when, for example, a triggering or special event occurs. As shown, the topper display 1916 has a diamond-shaped housing capable of storing a number of extendable screens.

Figure 19B:
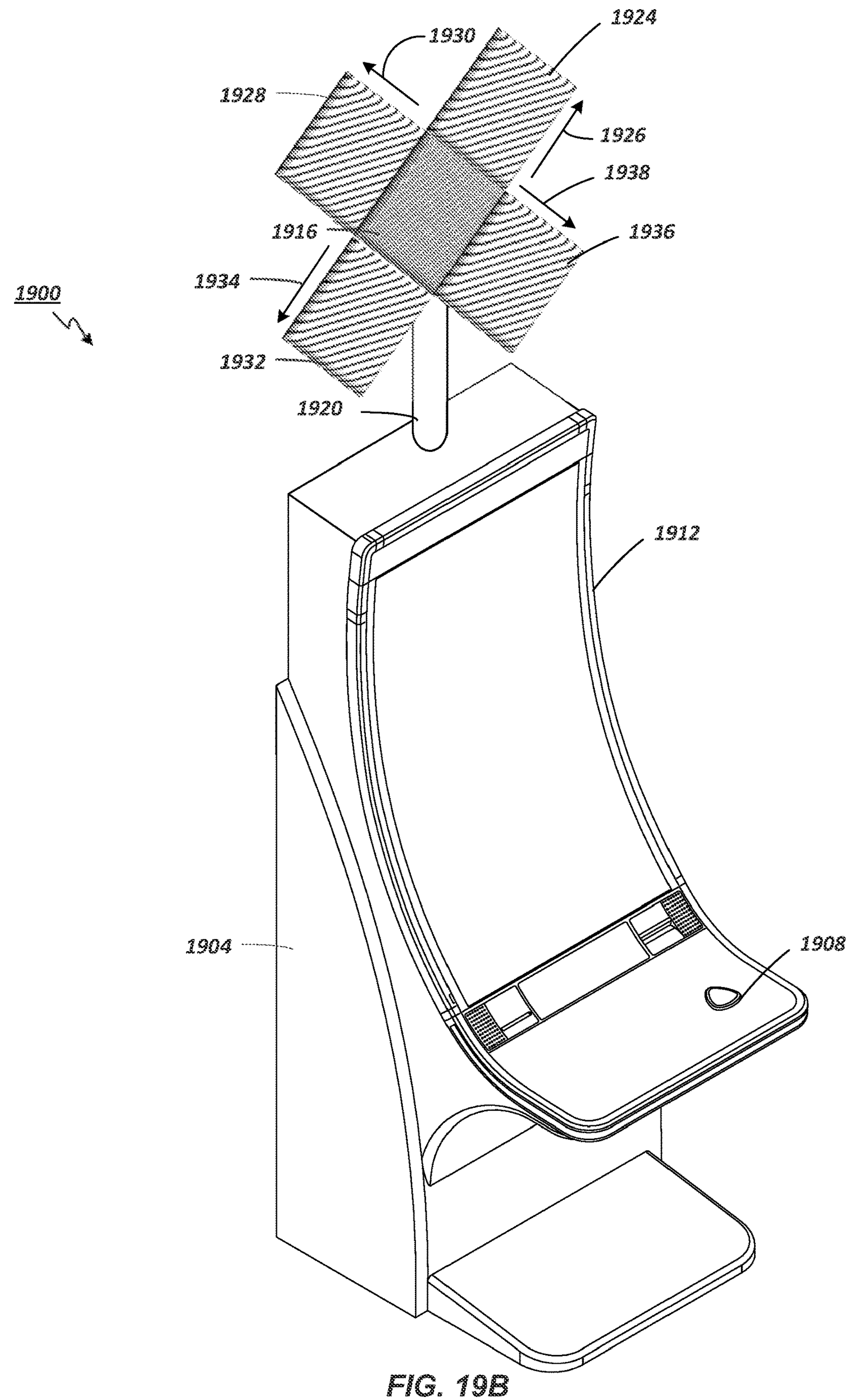
FIG. 19B illustrates the tenth gaming cabinet of FIG. 19A having an extended topper display.

As shown in FIG. 19B, the topper display 1916 includes a first extendable screen 1924 extending from the topper display 1916 in a first direction indicated by a first arrow 1926, a second extendable screen 1928 extending from the topper display 1916 in a second direction indicated by a second arrow 1930, a third extendable screen 1932 extending from the topper display 1916 in a third direction indicated by a third arrow 1934, and a fourth extendable screen 1936 extending from the topper display 1916 in a fourth direction indicated by a fourth arrow 1938.

In response to triggering or special events occurring, a controller (similar to game controller 202 of FIG. 2A) may initiate a movement sequence causing the extendable structure 1920 to raise the topper display 1916 from the tenth gaming cabinet 1904. Once extended, or during extension during the movement sequence, the controller may also unroll the first extendable screen 1924, the second extendable screen 1928, the third extendable screen 1932, and the fourth extendable screen 1936, either simultaneously, consecutively, randomly, or based on a predetermined game or event pattern. Furthermore, in other embodiments, the controller may also unroll one, two or all of the first extendable screen 1924, the second extendable screen 1928, the third extendable screen 1932, and the fourth extendable screen 1936, completely or partially, either simultaneously, consecutively, randomly, or based on a predetermined game or event pattern.

Figure 20:
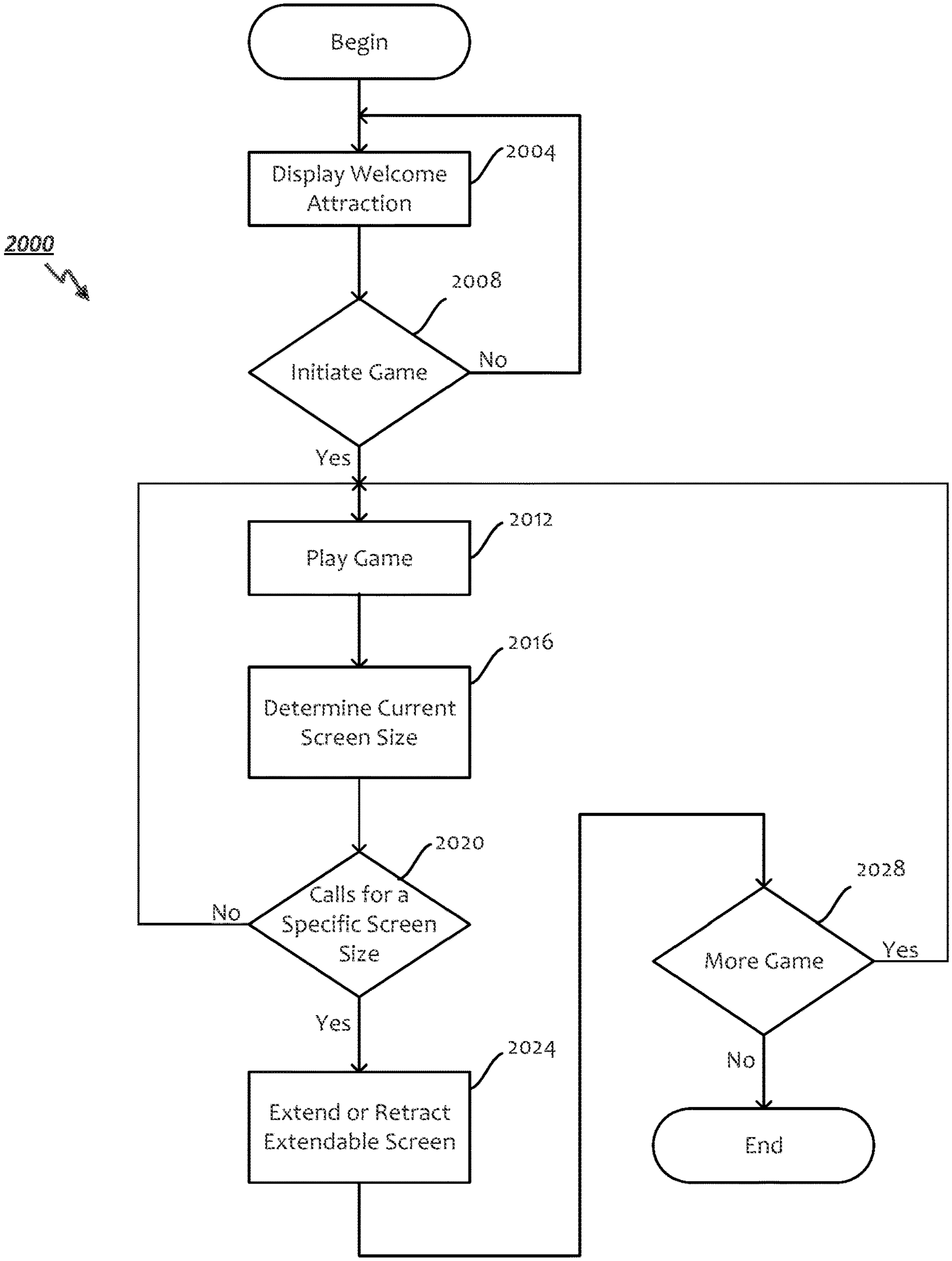
FIG. 20 illustrates a flowchart of a movement process for extending and retracting an additional display in a gaming cabinet.

FIG. 20 illustrates a flowchart of an extension/retraction process 2000 for extending or retracting a display or extendable screen in a gaming cabinet. Variations of extension/retraction process 2000 may be combined with other gaming processes, including, for example, movement process 700. Referring to FIG. 20, the extension/retraction process 2000 begins with displaying a welcome attraction signage, at step 2004. If the extension/retraction process 2000 determines if a game has been initiated in step 2008, the extension/retraction process 2000 proceeds to play the game in step 2012. At step 2016, the extension/retraction process 2000 determines the current size of the extendable screen. In response to triggering or special events occurring, or progressive features or bonuses being offered in the game, that specifies a particular screen size, as determined at step 2020, the extension/retraction process 2000 extends or retracts the extendable screen to meet the specified screen size at step 2024. For example, when the current size of the extendable size is zero, that is, the extendable screen has not been extended, and when the triggering or special events occurring, or progressive features or bonuses being offered in the game, specifies a particular screen size for the extendable screen, the extension/retraction process 2000 opens a corresponding extendable screen housing and unrolls the extendable screen. For another example, when the current size of the extendable size is maximum, that is, the extendable screen has been fully extended, and when the triggering or special events occurring, or progressive features or bonuses being offered in the game, specifies a smaller screen size for the extendable screen, the extension/retraction process 2000 opens the corresponding extendable screen housing and rolls up or retracts the extendable screen. In step 2024, the extension/retraction process 2000 proceeds to determine if more games are to be played and/or more game contents are to be displayed for the current game, or to end the game.

Figure 21:
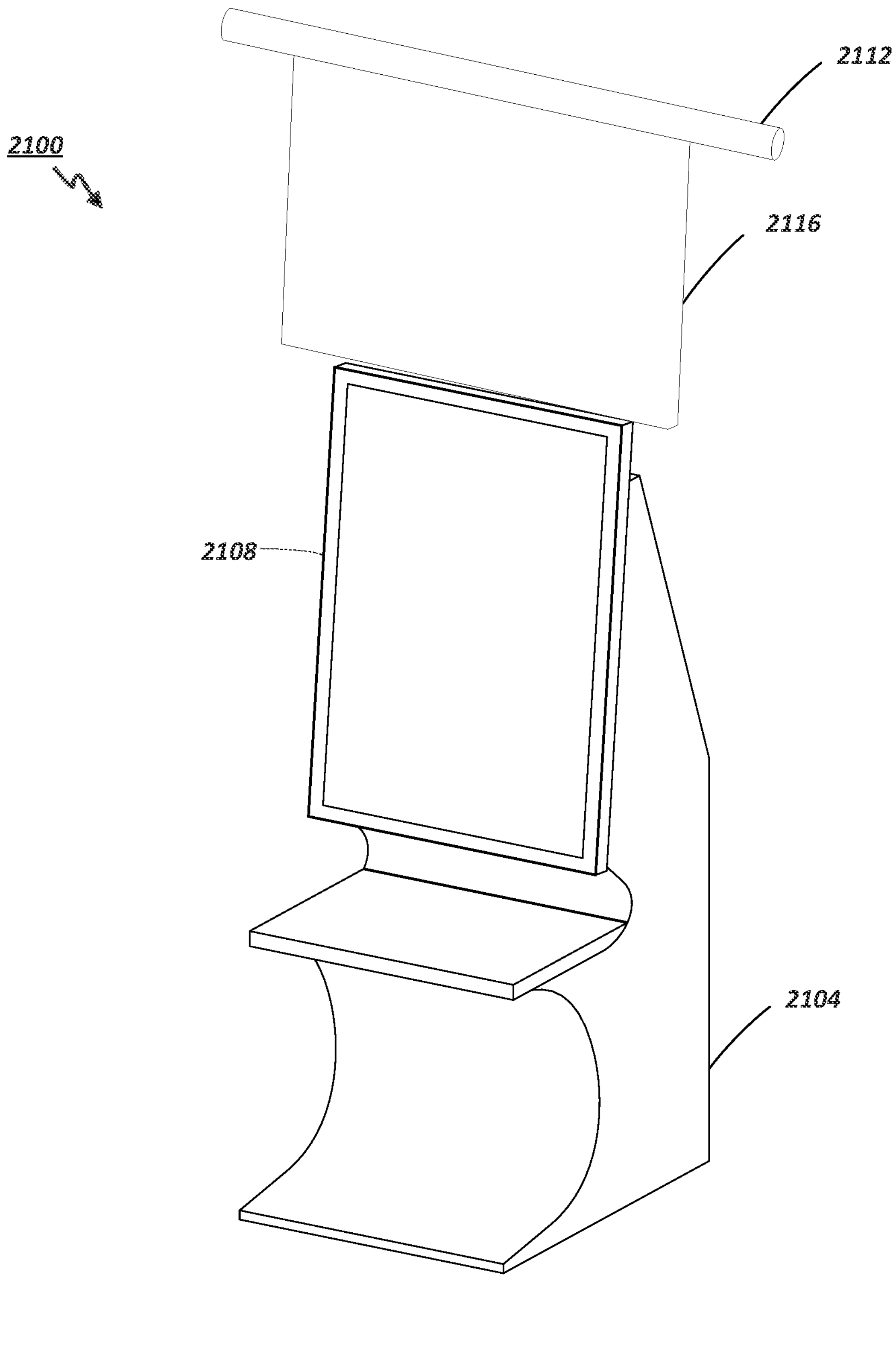
FIG. 21 illustrates a gaming system with a display screen aligned above the gaming system.

As shown in FIG. 21, in conjunction with having a variable position display, such as, for example, the first variable position display 308 of FIG. 3A, the curved, variable position display 408 of FIG. 4A, the curved, variable position display 508 and/or the top box display 512 of FIG. 5A, that may rotate in response to at least one or more predefined gaming conditions, a gaming system 2100 may also include a display screen 2116 aligned to the top of a variable position display 2108. The gaming system also includes a gaming cabinet 2104 and a display screen housing 2112 that houses the display screen 2116. In some embodiments, the display screen 2116 may be similar to the extendable screen 1020 of FIG. 10C, except that the display screen 2116 extends downward from the display screen housing. The display screen 2116 may be extended from the display screen housing 2112 in response to one or more gaming conditions occurring, for example, on the variable position display 2108. The display screen 2116 may roll down or roll up from the display screen housing 2112. The display screen 2116 may be an OLED display or a projector screen. In instances where the display screen 2116 is a projector screen, a throw projector may be used to generate an image on the display screen 2116.

Figure 22:
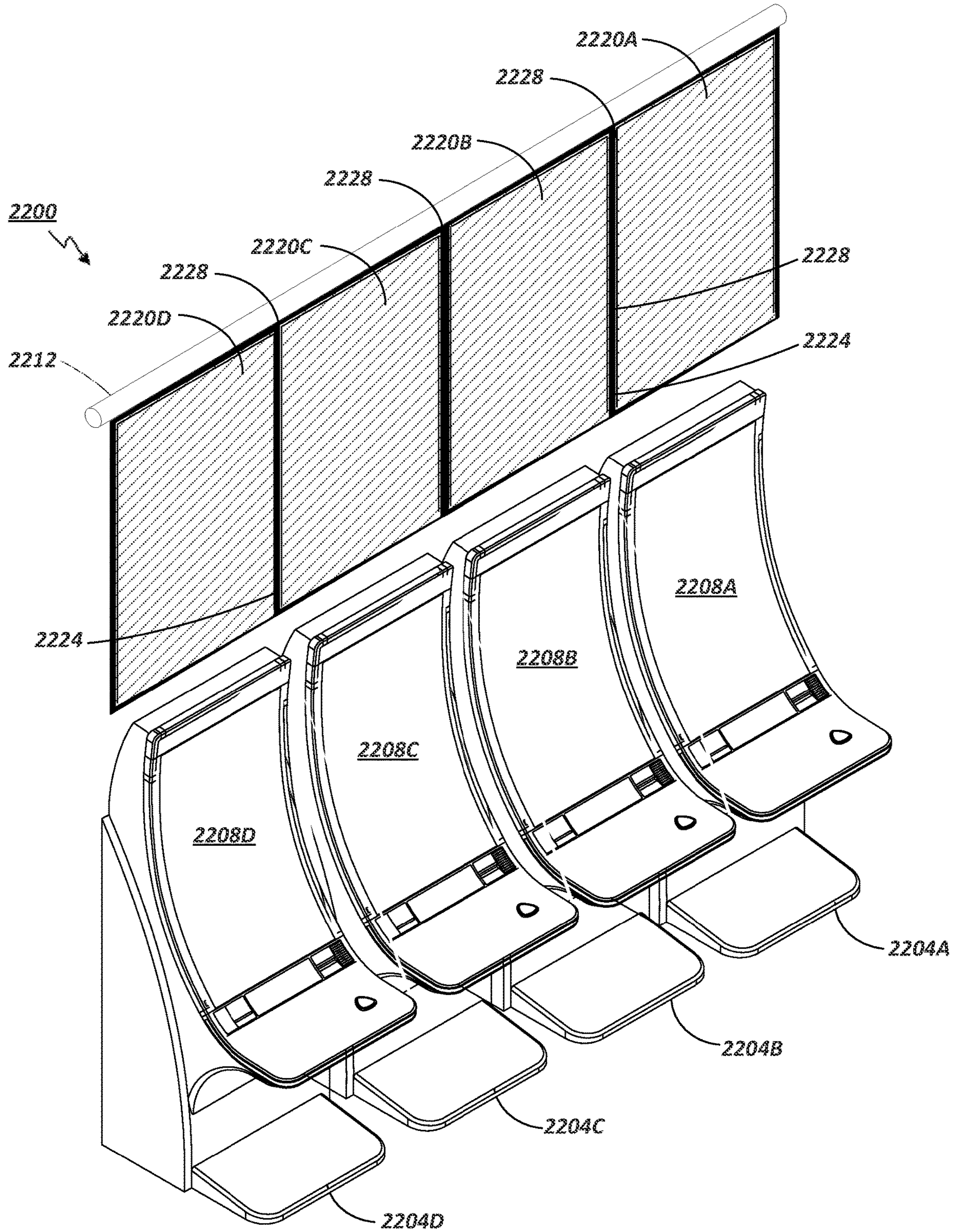
FIG. 22 illustrates an example of four separate display screens that are lowered/raised together.

FIG. 22 illustrates an example of four separate display screens that are lowered/raised together, or alternatively, in some other sequence. Similar to the second bank of gaming machines 1400 of FIG. 14, FIG. 22 shows a third bank of gaming machines 2200 having extendable displays. The third bank of gaming machines 2200 includes a first gaming cabinet 2204A having a first bank display 2208A, a second gaming cabinet 2204B having a second bank display 2208B, a third gaming cabinet 2204C having a third bank display 2208C, and a fourth gaming cabinet 2204D having a fourth bank display 2208D. The third bank of gaming machines 2200 includes a third extendable screen housing 2212 that controls, or receives signals from a game machine or game server to control, a first bank of extendable screens 2220A, 2220B, 2220C, 2220D. As shown, the third bank of gaming machines 2200 is arranged in a bank configuration such that the extendable screens 2220A, 2220B, 2220C, 2220D may be lowered or raised or extended downward from the third extendable screen housing 2212 simultaneously to create a video wall. In other embodiments, the extendable screens 2220A, 2220B, 2220C, 2220D may be lowered or raised individually, simultaneously, synchronously, or asynchronously, for example, to display additional game contents. Alternatively, rather than having four extendable screens, a single display screen can be lowered or raised and aligns with the third bank of gaming machines 2200.

In some embodiments, the third extendable screen housing 2212 may be configured to control each extendable screen of the third bank of extendable screens 2220A, 2220B, 2220C, 2220D such that varying game contents may be presented based on game designs or outcomes occurring on the third bank of gaming machines 2200. For example, when a trigger condition is met in one or more of the gaming machines in the third bank of gaming machines 2200, the third extendable screen housing 2212 may be controlled to initiate an extension or lowering of the third bank of extendable screens 2220A, 2220B, 2220C, 2220D individually, simultaneously, synchronously, or asynchronously, for example, to display additional game contents.

In some embodiments, the extendable screens 2220A, 2220B, 2220C, 2220D may also have substantially the same lengths or heights. In other embodiments, however, extendable screens 2220A, 2220B, 2220C, 2220D may have different sizes, and may be fully or partially extended individually or collectively, when a triggering event occurs in the game. Factors that may affect the sizes of the extendable screens 2220A, 2220B, 2220C, 2220D may include wagers placed, quantities of games played, amounts of time the base game has been played, certain player selections, or the like. In other embodiments, the third extendable screen housing 2212 may control, or receive signals from a game machine or game server to control, the third bank of extendable screens 2220A, 2220B, 2220C, 2220D collectively as a group. Thus, for example, the third bank of extendable screens 2220A, 2220B, 2220C, 2220D will be fully extended when a triggering event occurs in a base game.

In some embodiments, after the extension or lowering of the third bank of extendable screens 2220A, 2220B, 2220C, 2220D, the additional game contents may further cause the extendable screens 2220A, 2220B, 2220C, 2220D to rotate with respect to the third bank of gaming machines 2200, similar to the rotations discussed with respect to FIG. 3B, FIG. 4B, and FIG. 5B. For example, when the additional game contents depict an object, for example, a graphical user interface with an elephant displayed as rushing toward one direction, the third bank of extendable screens 2220A, 2220B, 2220C, 2220D may synchronously or asynchronously tilt or rotate toward the same direction. To dramatize the rushing effect, the third bank of extendable screens 2220A, 2220B, 2220C, 2220D may tilt or rotate consecutively toward the same direction, as if the elephant is knocking one of the third bank of extendable screens 2220A, 2220B, 2220C, 2220D at a time.

Concurrently or alternatively, after the extension or lowering of the third bank of extendable screens 2220A, 2220B, 2220C, 2220D, the additional game contents may also further extend the third bank of extendable screens 2220A, 2220B, 2220C, 2220D, similar to the extensions discussed with respect to FIG. 18B and FIG. 19B. For example, in some embodiments, each of the third bank of extendable screens 2220A, 2220B, 2220C, 2220D may initially be separated from an adjacent extendable screen by a predetermined minimum distance 2224. The predetermined minimum distance may be filled when each of the third bank of extendable screens 2220A, 2220B, 2220C, 2220D extends sideways with one or more secondary extendable displays 2228. Spacing can be configured to accommodate safety and hygiene issues, including partitions, disinfecting devices, and the like. Additionally, or alternatively, some combination of the display screen 2208A, 2208B, 2208C, 2208D and rotating one or more of the third bank of extendable screens 2220A, 2220B, 2220C, 2220D may be controlled by a rotatable button.

Figure 23:
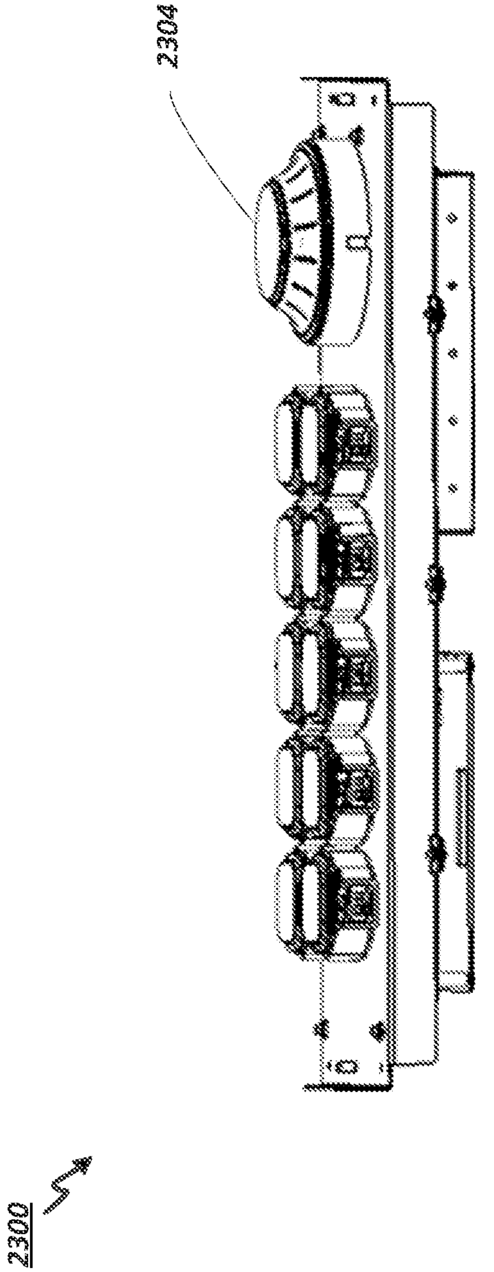
FIG. 23 illustrates a button panel for extending and/or rotating an additional display in a gaming cabinet.

FIG. 23 illustrates a button panel 2300 for extending and/or rotating an additional display in a gaming cabinet, such as, for example, the first gaming cabinet 304 of FIG. 3A, the second gaming cabinet 404 of FIG. 4A, the third gaming cabinet 504 of FIG. 5A, the gaming cabinets 604A-C of FIG. 6A, the fourth gaming cabinet 1004 of FIG. 10A, the fifth gaming cabinet 1304 of FIG. 13, one or more gaming machines of the second bank of gaming machines 1400 of FIG. 14, the sixth gaming cabinet 1504 of FIG. 15, the seventh gaming cabinet 1604 of FIG. 16, the eighth gaming cabinet 1704 of FIG. 17, the ninth gaming cabinet 1804 of FIG. 18A, the tenth gaming cabinet 1904 of FIG. 19A, the gaming system 2100 of FIG. 21, and one or more gaming machines of the third bank of gaming machines 2200 of FIG. 22. As shown, the button panel 2300 comprises a dial 2304. When turned, the dial 2304 may initiate rotation and/or extension of one or more of the third bank of extendable screens 2220A, 2220B, 2220C, 2220D. In a similar way, when pulled or pushed, the dial 2304 may initiate rotation and/or extension of one or more of the third bank of extendable screens 2220A, 2220B, 2220C, 2220D. The turning, pulling or pushing of the dial 2304 may have various, sometimes overlapping, functions.

Figures 24, 24A, 24B, 24C, 24D:
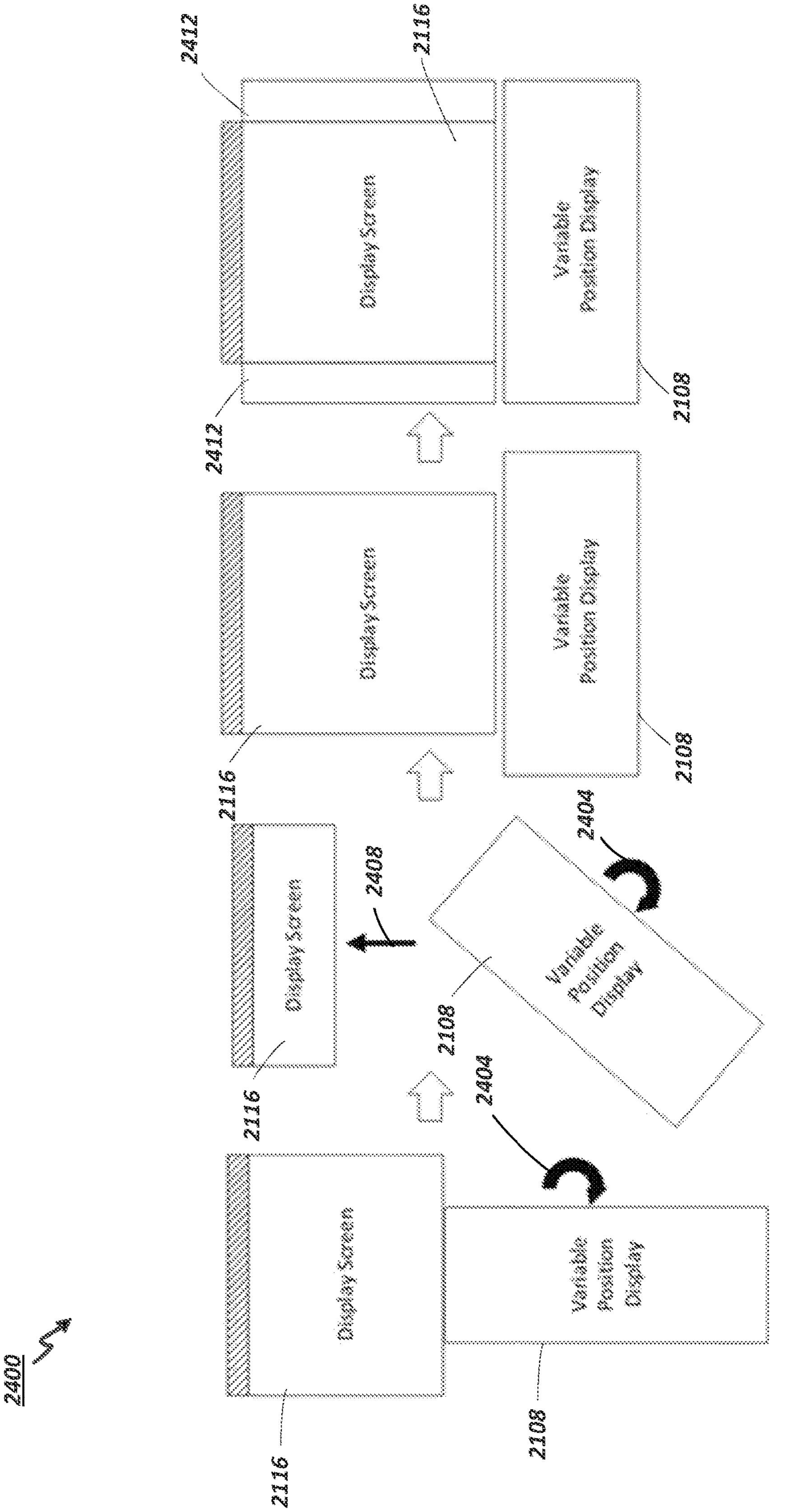
FIG. 24 including
FIG. 24A, FIG. 24B, FIG. 24C, and FIG. 24D illustrate an extension and rotating sequence for a variable position display in conjunction with a display screen.
Figure 25:
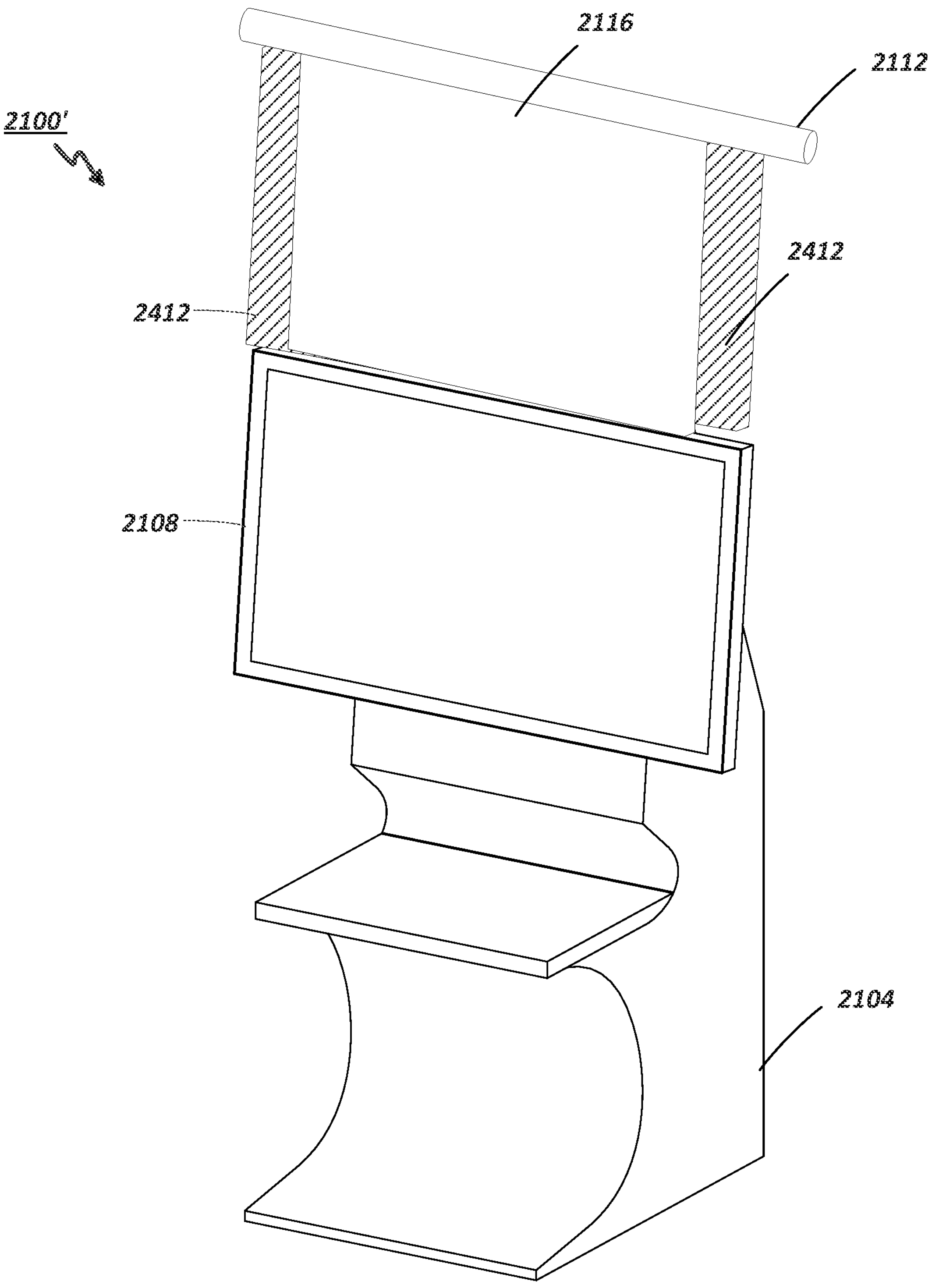
FIG. 25 illustrates a resulting gaming system after the rotations and extensions.

FIG. 24 including FIG. 24A, FIG. 24B, FIG. 24C, and FIG. 24D illustrate an extension and rotating sequence 2400 for the variable position display 2108 in conjunction with the extendable display screen 2116 in the gaming cabinet 2104 (of FIG. 21). As shown in FIGS. 24A and 24B, the variable position display 2108 is in a portrait position with the extendable display screen 2116 in an extended or down position. As the variable position display 2108 transitions (shown with arrows 2404) to a landscape position, the extendable display screen 2116 may roll up or retract (shown with arrow 2408) to allow room for the variable position display 2108 to rotate. Once in a horizontal position as shown in FIG. 24C, the extendable display screen 2116 may be extended back down. As shown in FIG. 24C, the extendable display screen 2116 be extended out to a lower position so as to meet the variable position display 2108 in the landscape mode when compared to the portrait mode. In some embodiments, though not shown, the extendable display screen 2116 may join the variable position display 2108 seamlessly. In some instances, as shown in FIG. 24D, the display screen 2116 may be further extended sideways to align with edges of the variable position display 2108. Specifically, as shown, the display screen 2116 may open a plurality of side extension screens 2412, one side extension per side. Once extended, the display screen 2116 and the side extension screens 2412 align flush with edges of the variable position display 2108. In some embodiments, the side extension screens 2412 may be nested extensions embedded in a nested screen housing (not shown), similar to the first nested screen housing 1612 of FIG. 16. In other embodiments, the side extension screens 2412 may be extended from the extendable display screen housing 2112, similar to the topper display 1816 of FIG. 18A. FIG. 25 illustrates a resulting gaming system 2100' after designated rotations by variable position display 2108 and extensions of extendable display screen housing 2112 and/or side extension screens 2412.

It is to be understood that, if any prior art is referred to herein, such reference does not constitute an admission that the prior art forms a part of the common general knowledge in the art in any country.

In the claims which follow and in the preceding description, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the disclosure.

While many preferred aspects and best views for carrying out the present invention have been described, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

a gaming cabinet;

a first display mounted to the gaming cabinet, operable to display a game, and having a first edge having a first dimension and a second edge having a second dimension;

a second display being extendable and meeting the first edge of the first display; and a controller comprising a processor and memory storing a plurality of instructions, which, when executed, cause the processor to at least:

initiate a retraction of the second display away from the first edge resulting in a retracted second display thereby permitting a rotation of the first display with respect to the gaming cabinet from a first orientation associated with the first edge toward a second orientation associated with the second edge, in response to the first display reaching the second orientation, initiate an extension of the retracted second display in a first direction parallel to the second edge, and stop the extension of the retracted second display resulting in an extended second display, when the extended second display has an extended horizontal dimension that matches the second dimension.

2. The electronic gaming system of claim 1, wherein the extension is a first extension, and wherein the instructions, when executed, further cause the processor to simultaneously initiate both the first extension and a second extension of the retracted second display in a second direction opposite the first direction.

3. The electronic gaming system of claim 1, wherein the instructions, when executed, cause the processor to form a seamless enlarged display from the first display and the extended second display when the extended horizontal dimension matches the second dimension.

4. The electronic gaming system of claim 1, wherein the second display comprises a topper display and at least one side extension screen that extends in the extension.

5. The electronic gaming system of claim 1, wherein the instructions, when executed, cause the processor to detect a game instance, and drive the second display to translate, rotate, tilt, or a combination of the rotation, translation, or tilting, based on one or more gaming conditions.

6. The electronic gaming system of claim 1, wherein the instructions, when executed, cause the processor to detect a game instance, and drive the first display to translate, rotate, tilt, or a combination of the rotation, translation, or tilting, based on one or more gaming conditions.

7. The electronic gaming system of claim 1, wherein the first display comprises a variable position display, and wherein the instructions, when executed, cause the processor to rotate the variable position display and extend the second display asynchronously.

8. A method of controlling an electronic gaming system comprising a processor and memory having instructions, which, when executed, cause the processor to activate a motor, and a gaming cabinet, a first display mounted to the gaming cabinet and having a first edge having a first dimension and a second edge having a second dimension, and a second display being extendable and meeting the first edge of the first display, the method comprising:

controlling the motor to retract the second display from the first edge thereby allowing the first display to rotate with respect to the gaming cabinet from a first orientation associated with the first edge toward a second orientation associated with the second edge;

controlling the motor to extend at least one portion of the second display in a first direction parallel to the second edge when the first display rotates toward the second orientation;

and in response to detecting that the first display has reached the second orientation, controlling the motor to extend the at least one portion of the second display until the second display having an extended horizontal dimension matches the second dimension.

9. The method of claim 8, wherein the at least one portion of the second display is a first portion, further comprising simultaneously extending both the first portion and a second portion of the second display in a second direction opposite the first direction.

10. The method of claim 8, further comprising forming a seamless enlarged display from the first display and the second display when the extended horizontal dimension matches the second dimension.

11. The method of claim 8, wherein the second display further comprises a topper display, and the at least one portion of the second display includes an extension screen that extends from the topper display.

12. The method of claim 8, further comprising driving the second display to translate, rotate, tilt, or a combination of rotation, translation, or tilting, based on one or more gaming conditions.

13. The method of claim 8, further comprising driving the first display to translate, rotate, tilt, or a combination of rotation, translation, or tilting, based on one or more gaming conditions.

14. The method of claim 8, wherein the first display comprises a variable position display, and further comprising rotating the variable position display and extending the at least one portion of the second display asynchronously.

15. A non-transitory computer-readable medium comprising a plurality of instructions for controlling an electronic gaming system comprising a gaming cabinet, a first display mounted to the gaming cabinet and having a first edge having a first dimension and a second edge having a second dimension, a second display being extendable and meeting the first edge of the first display, and a controller comprising a processor, and wherein the instructions, which, when executed, cause the processor to perform the steps of:

controlling the second display to retract from the first edge and the first display to rotate with respect to the gaming cabinet from a first orientation associated with the first edge toward a second orientation associated with the second edge;

controlling the second display to extend an extension screen when the first display rotate toward the second orientation; and when the first display has reached the second orientation, controlling the extension screen to extend until the second display having an extended horizontal dimension matches the second dimension.

16. The non-transitory computer-readable medium of claim 15, wherein the extension screen is a first extension screen, and wherein the instructions, when executed, further cause the processor to perform the step of simultaneously extending the first extension screen and a second extension screen of the second display in opposite directions.

17. The non-transitory computer-readable medium of claim 15, wherein the instructions, when executed, cause the processor to perform the step of forming a seamless enlarged display from the first display and the second display when the extended horizontal dimension matches the second dimension.

18. The non-transitory computer-readable medium of claim 15, wherein the second display further comprises a topper display, and wherein the instructions, when executed, cause the processor to perform the step of extending the extension screen from the topper display.

19. The non-transitory computer-readable medium of claim 15, wherein the instructions, when executed, cause the processor to perform the step of driving the second display to translate, rotate, tilt, or a combination of rotation, translation, or tilting, based on one or more gaming conditions.

20. The non-transitory computer-readable medium of claim 15, wherein the first display comprises a variable position display, and wherein the instructions, when executed, cause the processor to perform the step of rotating the variable position display and extending the extension screen asynchronously.

* * * * *